United States Patent [19]

Romano

[11] Patent Number: 4,996,871
[45] Date of Patent: Mar. 5, 1991

[54] CORIOLIS DENSIMETER HAVING SUBSTANTIALLY INCREASED NOISE IMMUNITY

[75] Inventor: Paul Romano, Boulder, Colo.

[73] Assignee: Micro Motion, Inc., Boulder, Colo.

[21] Appl. No.: 490,099

[22] Filed: Mar. 9, 1990

Related U.S. Application Data

[62] Division of Ser. No. 361,000, Jun. 2, 1989.

[51] Int. Cl.$^5$ .................................. G01N 9/00
[52] U.S. Cl. ..................................... 73/32 A
[58] Field of Search ............ 73/861.38, 32 A, 861.37

[56] References Cited

U.S. PATENT DOCUMENTS

| Re. 31,450 | 11/1983 | Smith | 73/861.38 |
|---|---|---|---|
| Re. 31,971 | 8/1985 | Gold | 73/462 |
| 2,635,462 | 4/1953 | Poole et al. | 73/32 |
| 3,456,491 | 7/1969 | Brockhaus | 73/32 |
| 3,527,103 | 9/1970 | Hale et al. | 73/462 |
| 4,093,988 | 6/1978 | Scott | 364/484 |
| 4,127,028 | 11/1978 | Cox et al. | 73/194 |
| 4,192,184 | 3/1980 | Cox et al. | 73/194 |
| 4,252,028 | 2/1981 | Smith et al. | 73/861.38 |
| 4,311,054 | 1/1982 | Cox et al. | 73/861.38 |
| 4,422,338 | 12/1983 | Smith | 73/861.38 |
| 4,445,389 | 1/1984 | Potzick | 73/861.27 |
| 4,450,529 | 5/1984 | Hill et al. | 364/508 |
| 4,491,025 | 1/1985 | Smith | 73/861.38 |
| 4,660,421 | 4/1987 | Dahlin et al. | 73/861.38 |

FOREIGN PATENT DOCUMENTS

WO88/02105  3/1988  World Int. Prop. O.

OTHER PUBLICATIONS

W. Steffen et al, "Direct Mass Flow Metering in Particular by Means of Coriolis Methods", OIM Seminar, Arles, France, May 11-15, 1987, pp. 1-24.

*Primary Examiner*—Herbert Goldstein
*Attorney, Agent, or Firm*—Peter L. Michaelson

[57] ABSTRACT

Apparatus and accompanying methods for use therein for a Coriolis mass flow rate meter which is substantially immune to noise, and more particularly, to such a meter that is substantially unaffected by noise that occurs at substantially any frequency different from a fundamental frequency at which the flow tube(s) in the meter vibrate. Specifically, the meter relies on measuring mass flow rate by determining the phase difference that occurs between real and imaginary components of the discrete fourier transform (DFT) of both the left and right velocity sensor waveforms evaluated at the fundamental frequency at which the flow tubes vibrate. The fundamental frequency is located, during an initialization operation, by providing a power spectrum, determined through use of the DFT of one of the sensor signals and then selecting that frequency at which the magnitude of the power spectrum reaches a maximum value. In addition, the frequency at which both velocity sensor signals is sampled is readjusted in response to any change in the phase of one of the velocity sensor signals, as transformed using the DFT, in order to assure that the sampling frequency always remains substantially equal to a pre-defined integer multiple of the fundamental frequency. Furthermore, the meter, through use of the numerical value of any such phase change, also provides a density indication which is also substantially immune to such noise.

12 Claims, 35 Drawing Sheets

SYSTEM BLOCK DIAGRAM

TIME INTERVAL (Δt) MEASUREMENT CIRCUIT

DRIVE CIRCUIT 40

FIG. 5

TIME INTERVAL (Δt)
MEASUREMENT CIRCUIT
MAIN PROGRAM
500

ENTER (POWER-ON RESET)

510 — EXECUTE INITIALIZATION ROUTINE 600

520 — EXECUTE PHASE ANGLE CALCULATION ROUTINE 1200 TO DETERMINE VALUE OF FILTERED PHASE DIFFERENCE, $PHASE_2$, BETWEEN BOTH FLOW TUBE VELOCITY SENSOR SIGNALS (CHANNEL 1 & 2)

530 — CALCULATE Δt MEASUREMENT:
Δt ← K * $PHASE_2$
WHERE K=SCALE FACTOR

540 — LOAD Δt MEASUREMENT INTO BUS INTERFACE 370 FOR COMMUNICATION TO HOST μP, AND GENERATE "Δt MEASUREMENT COMPLETE" INTERRUPT TO HOST μP

550 — EXECUTE FREQUENCY TRACKING ROUTINE 1300 TO DETERMINE FREQUENCY ERROR DUE TO CHANGES IN FLUID DENSITY AND MODIFY DURATION OF SAMPLING INTERVAL PRODUCED BY TIMER 340 ACCORDINGLY

555

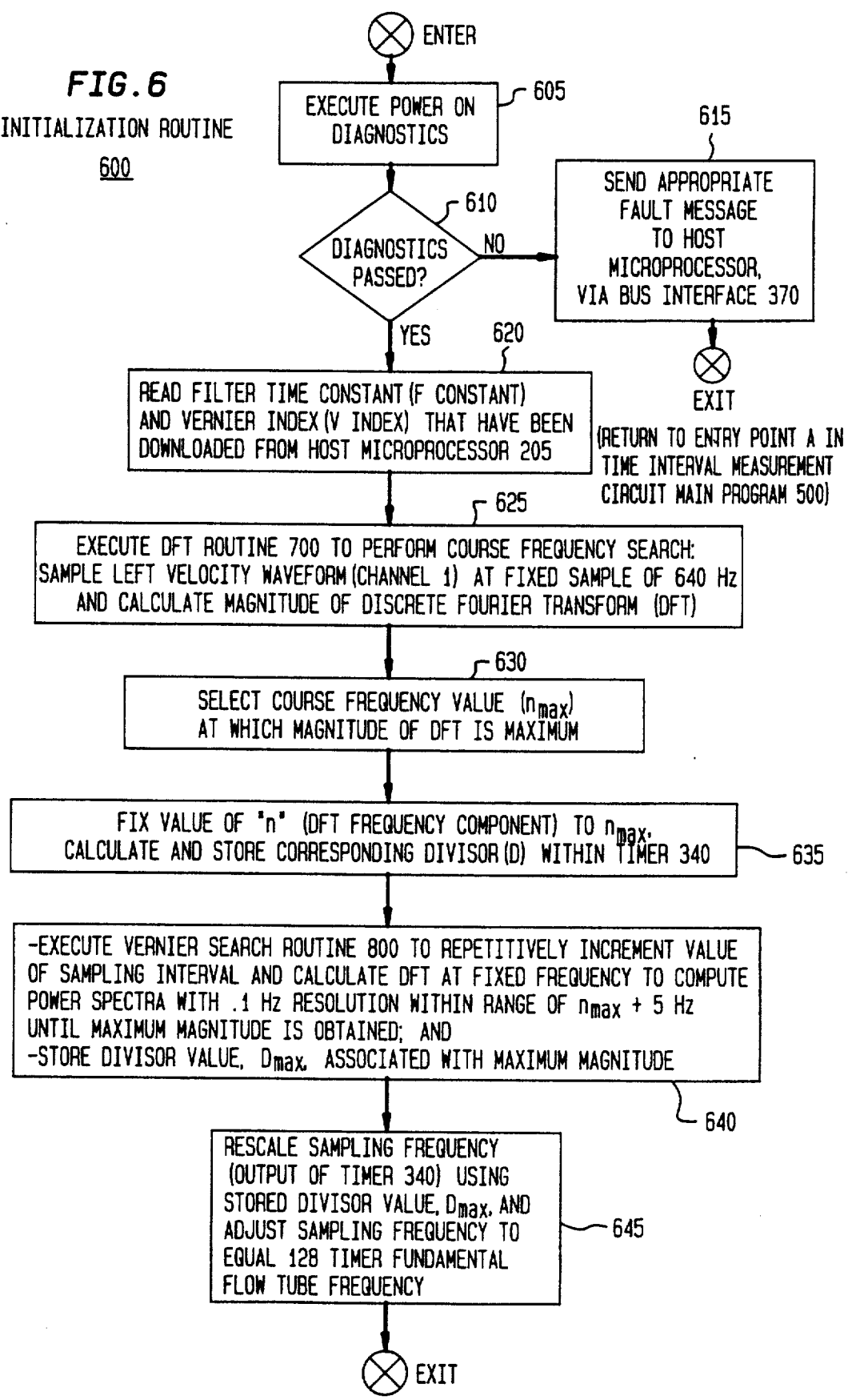

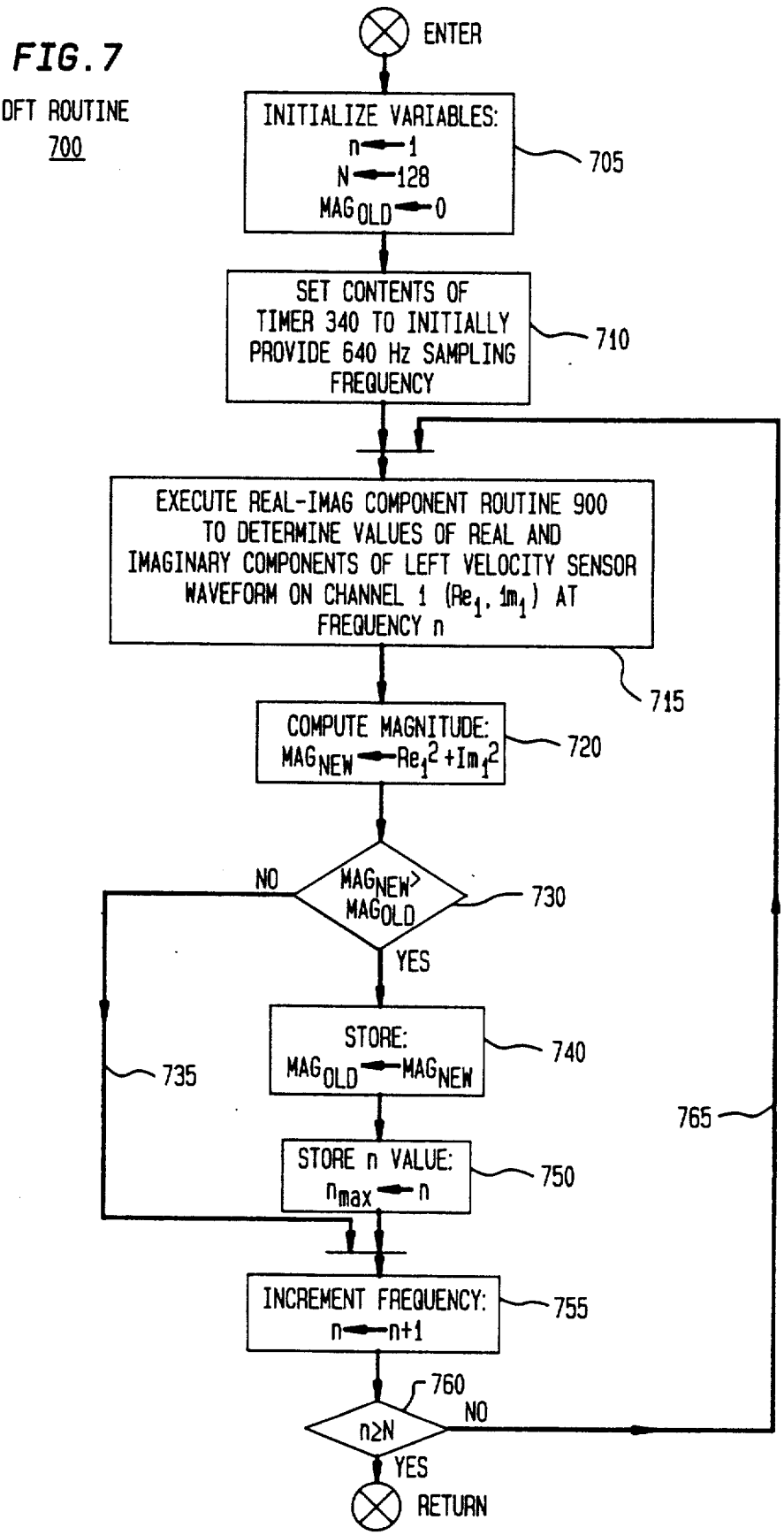

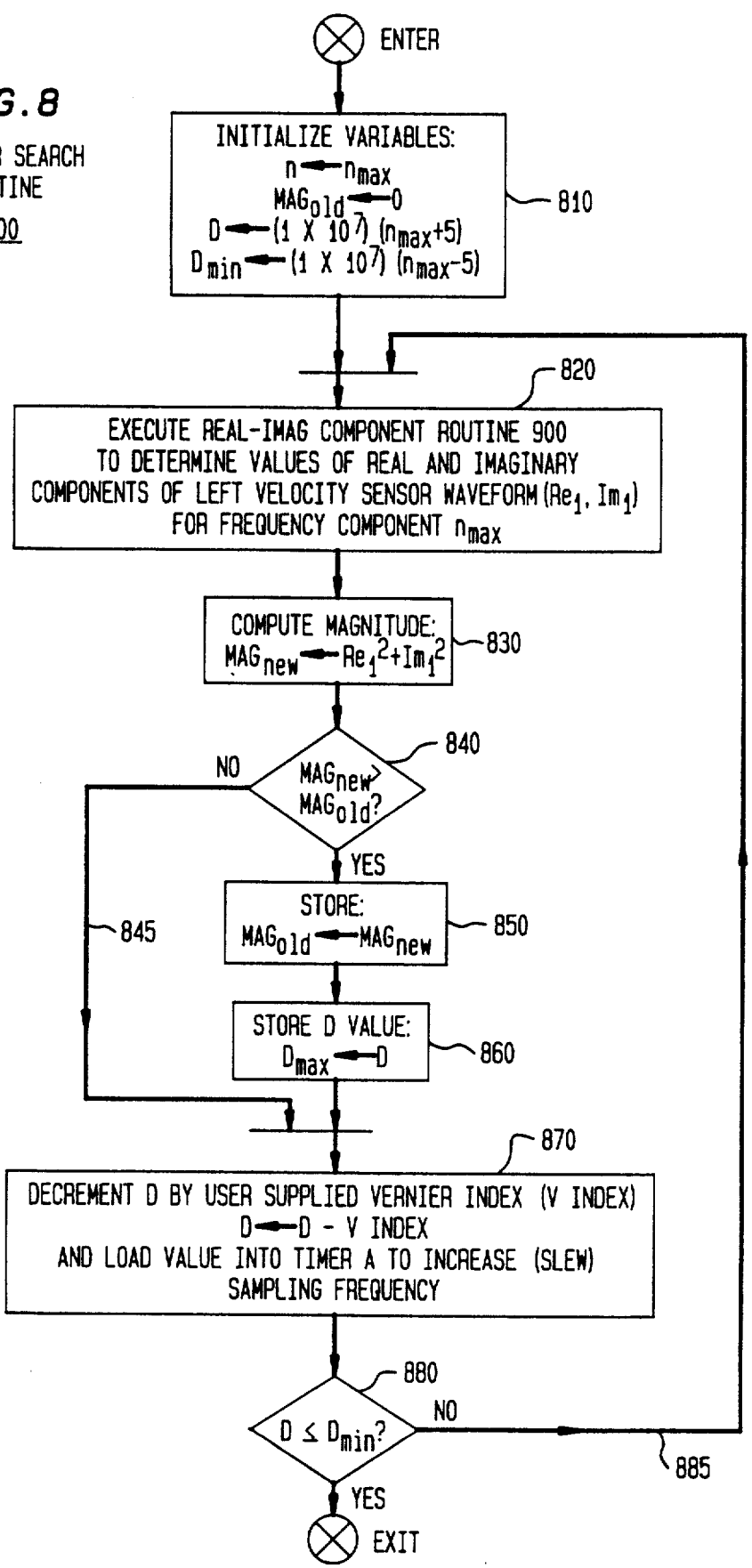

REAL-IMAG COMPONENT
ROUTINE
900

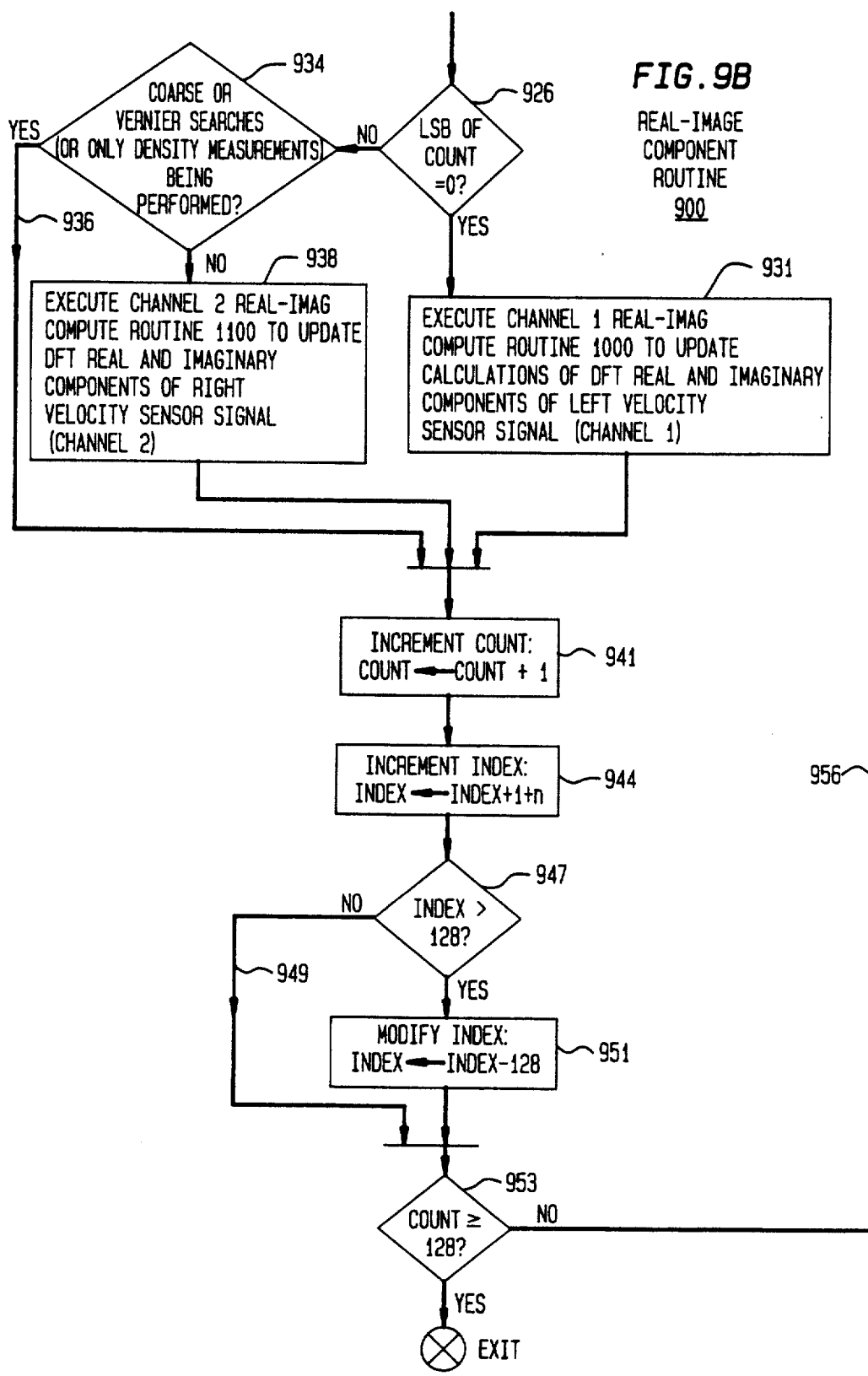

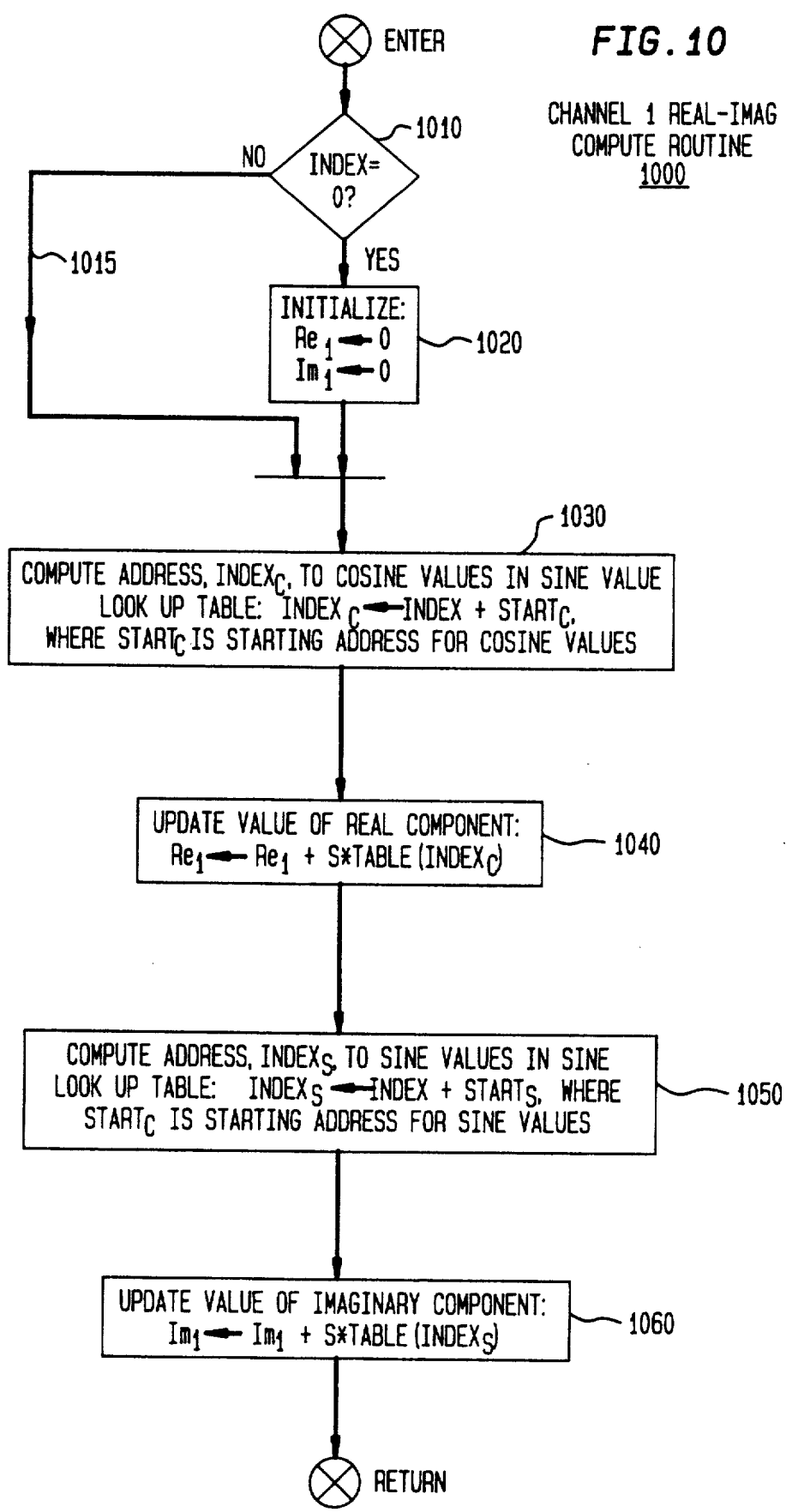

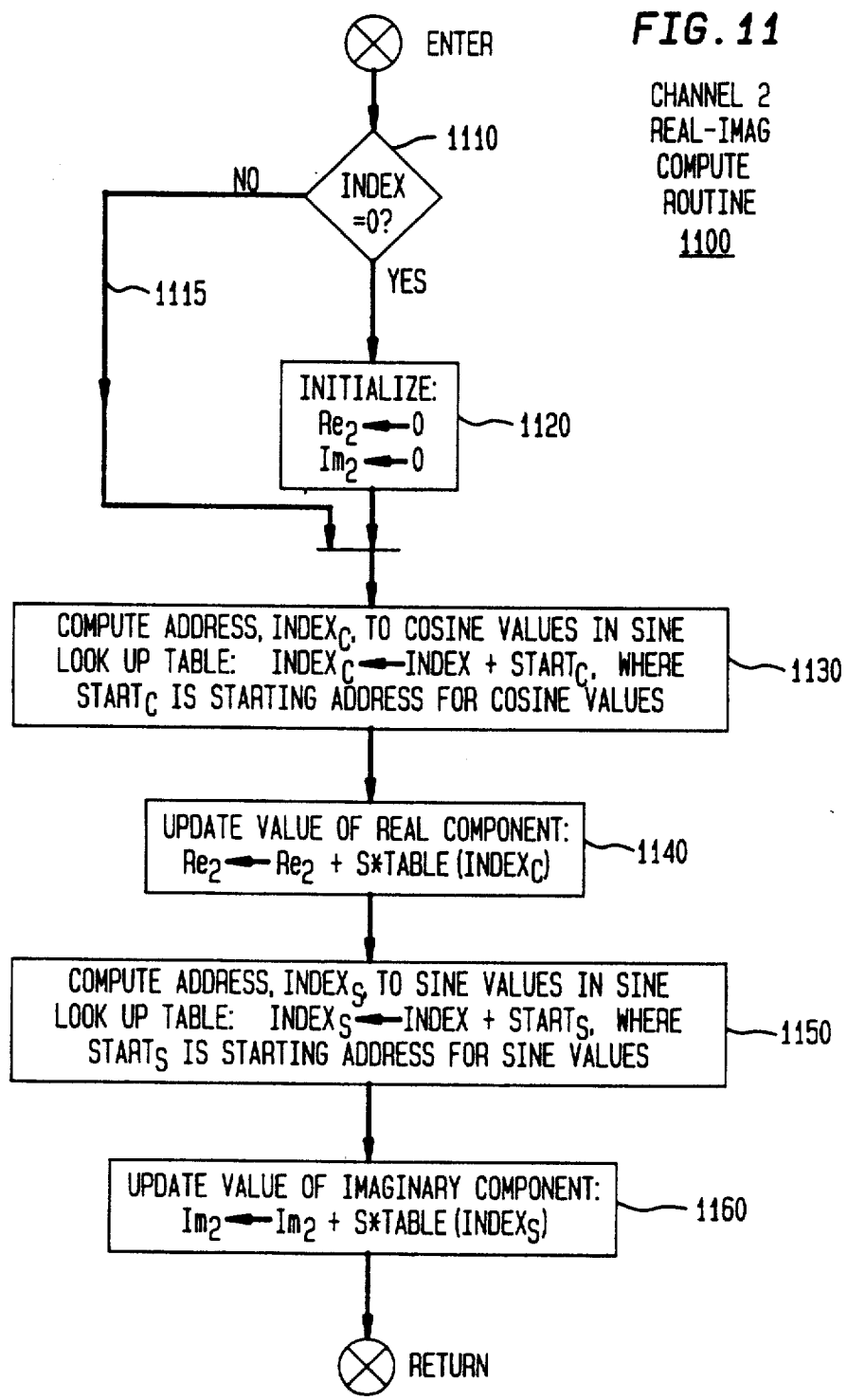

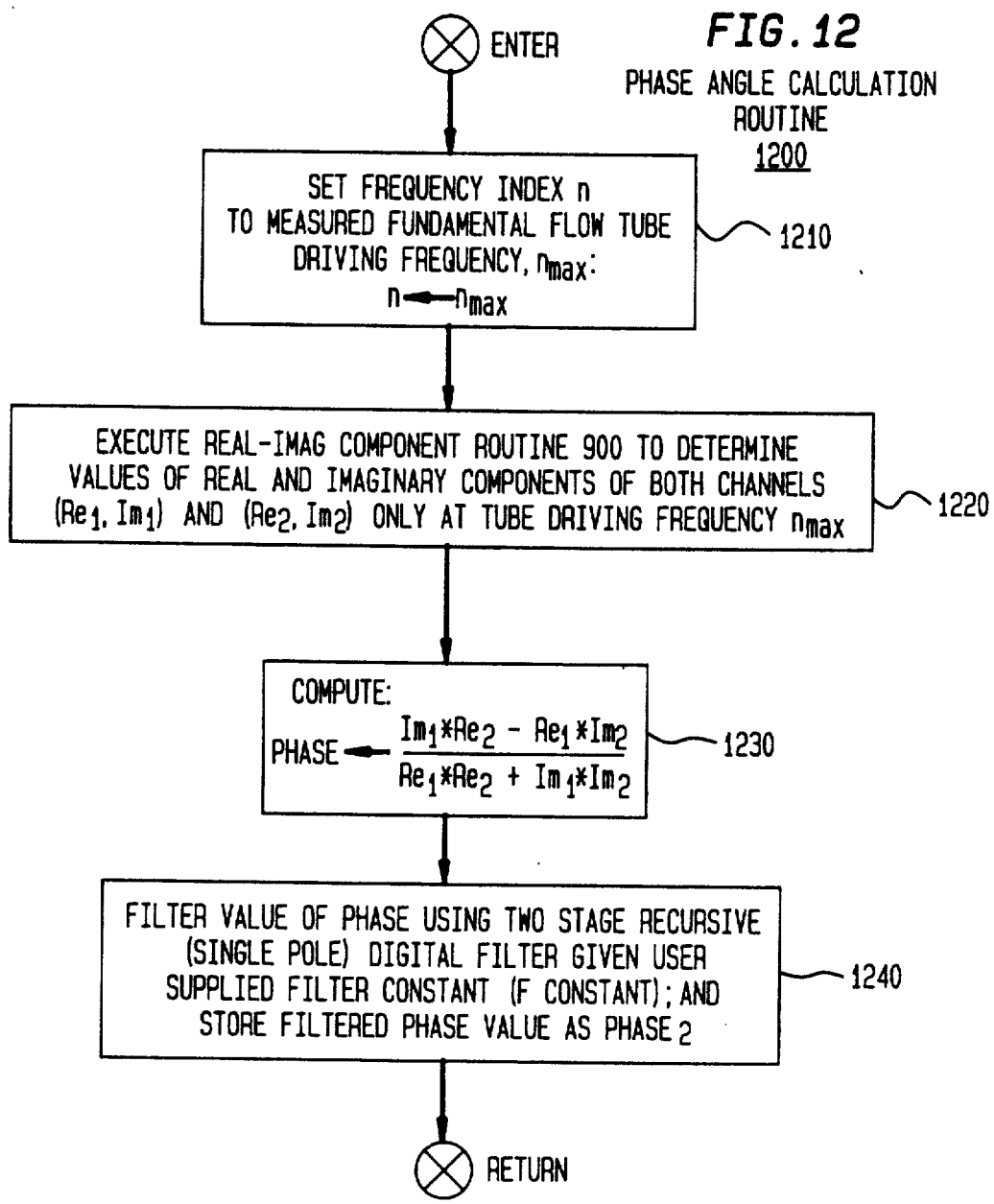

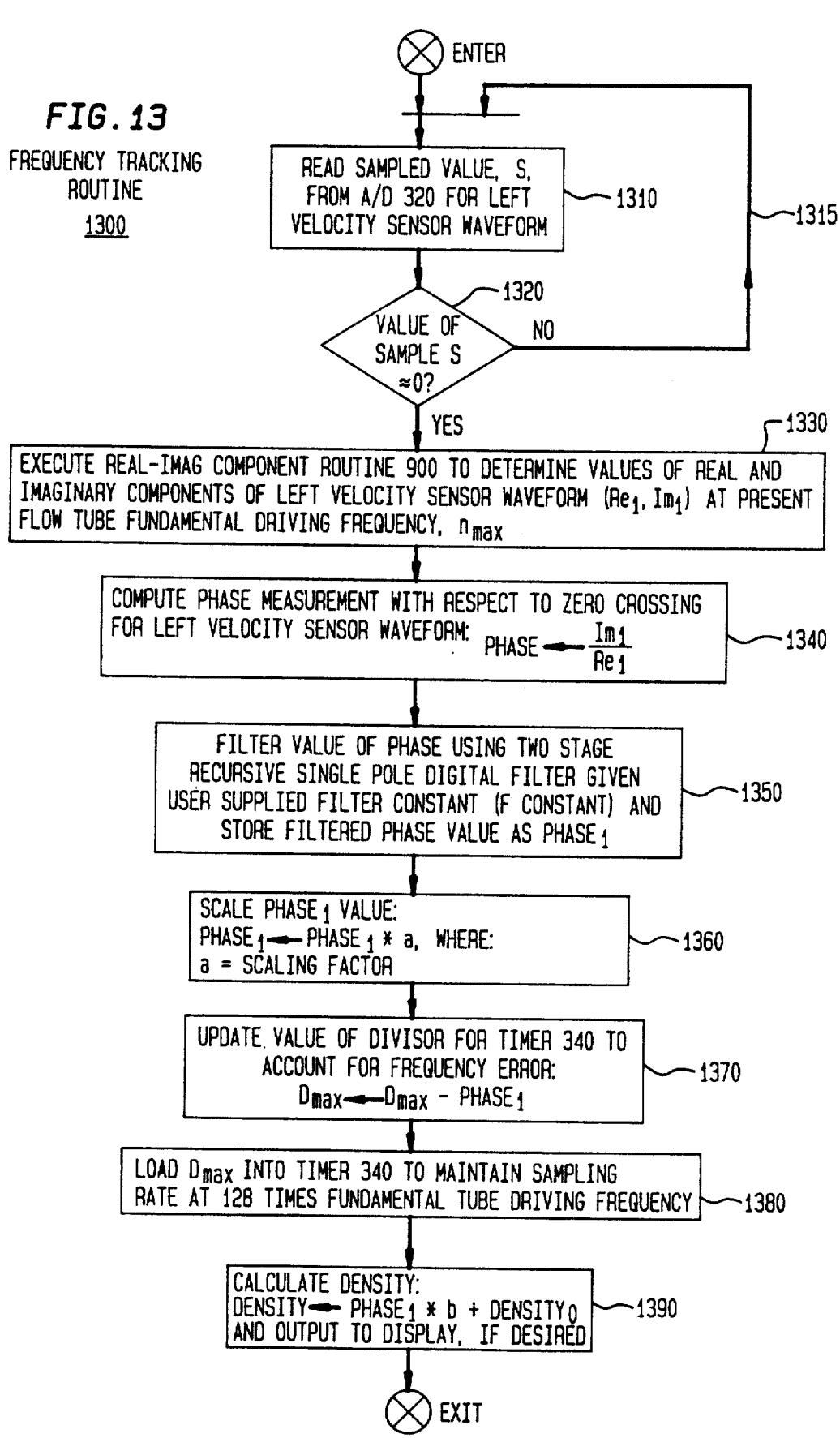

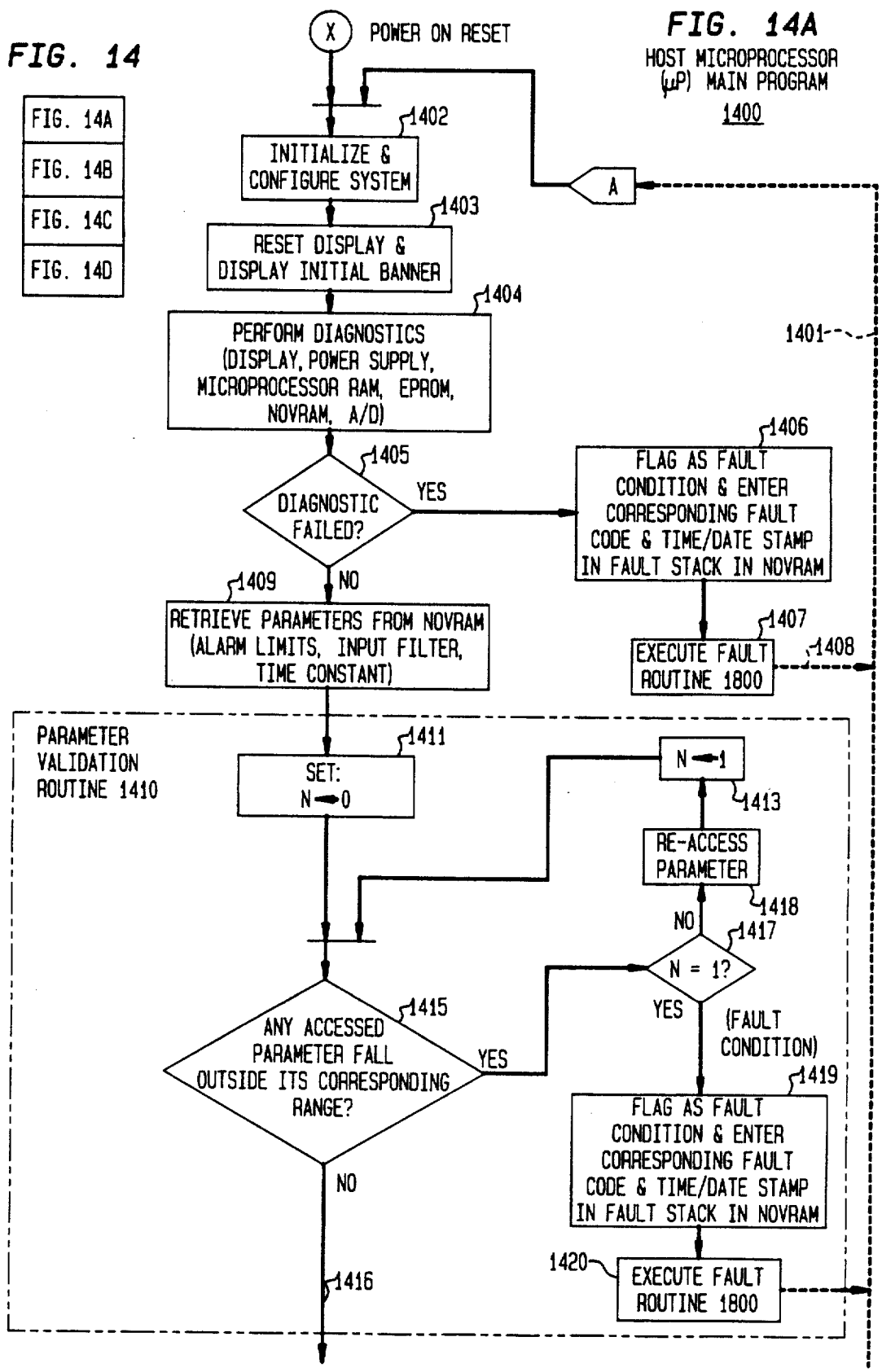

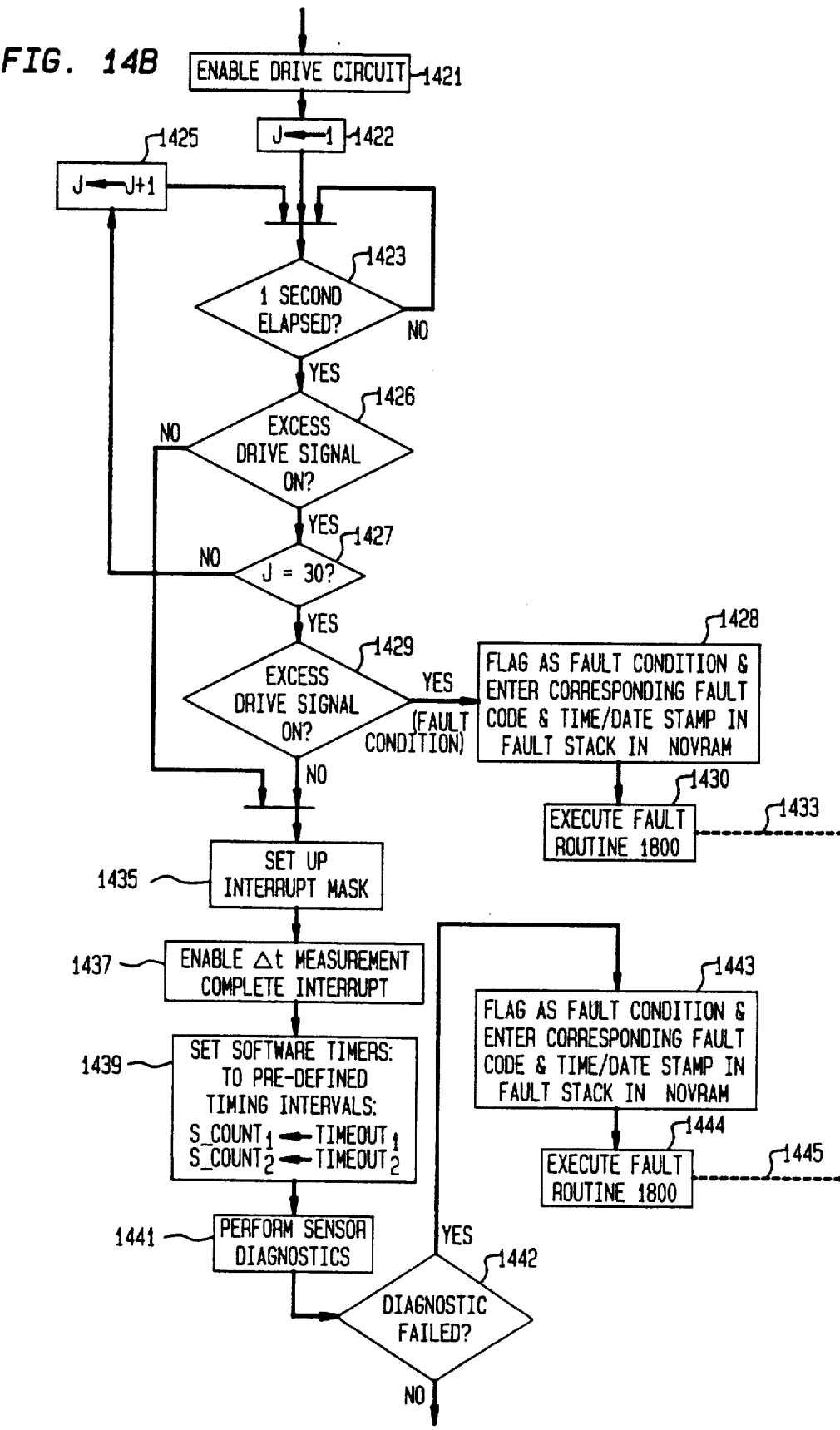

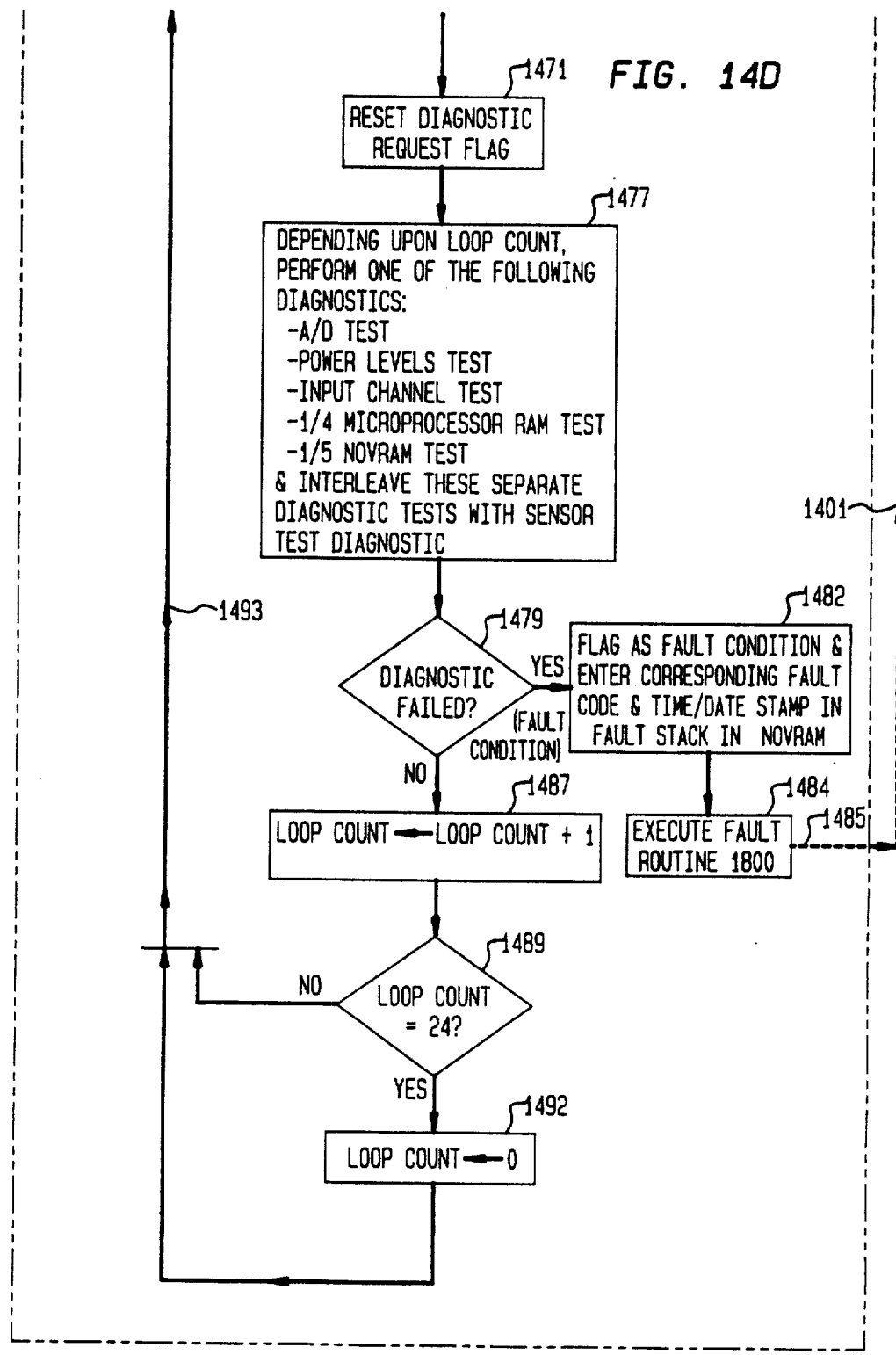

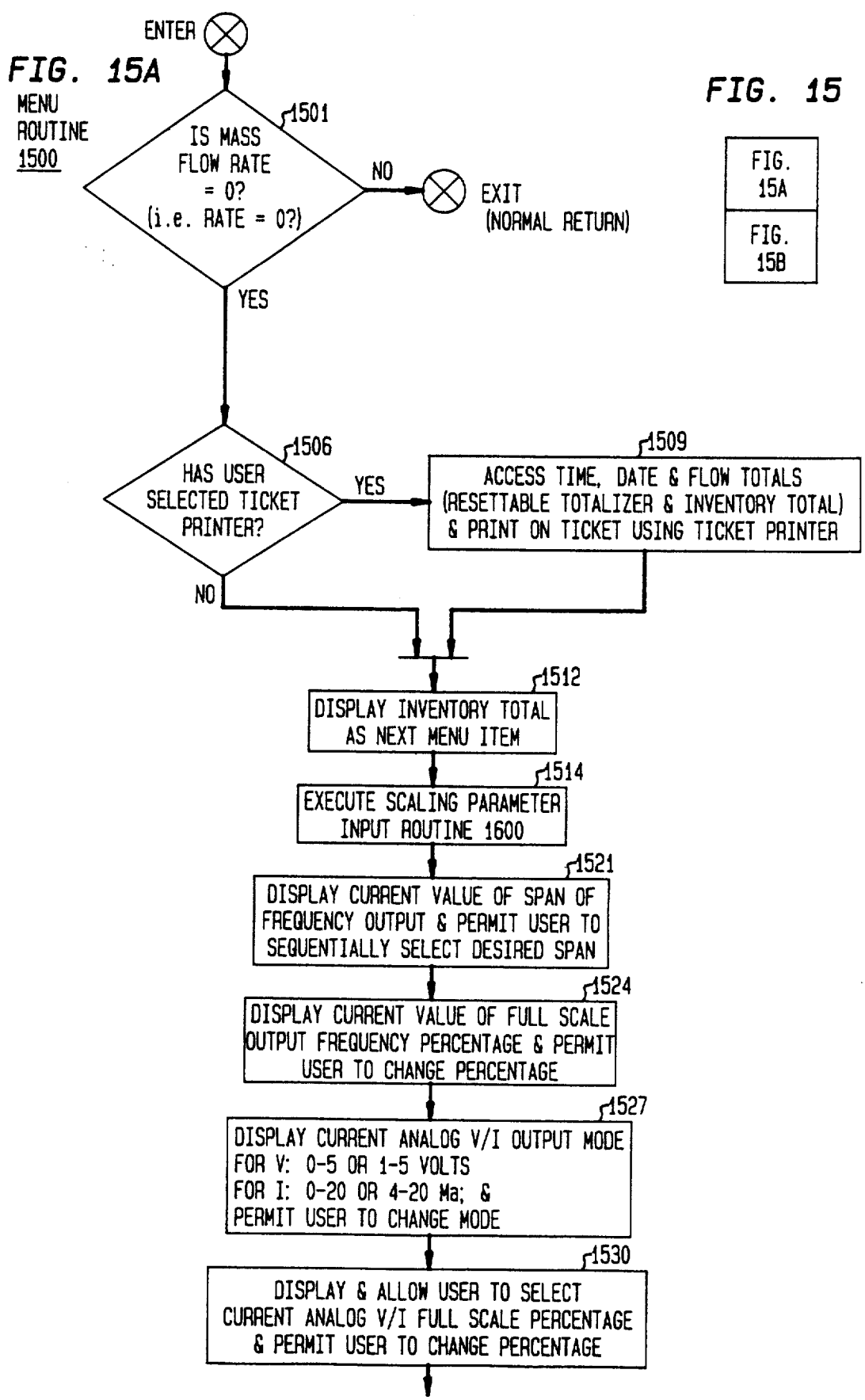

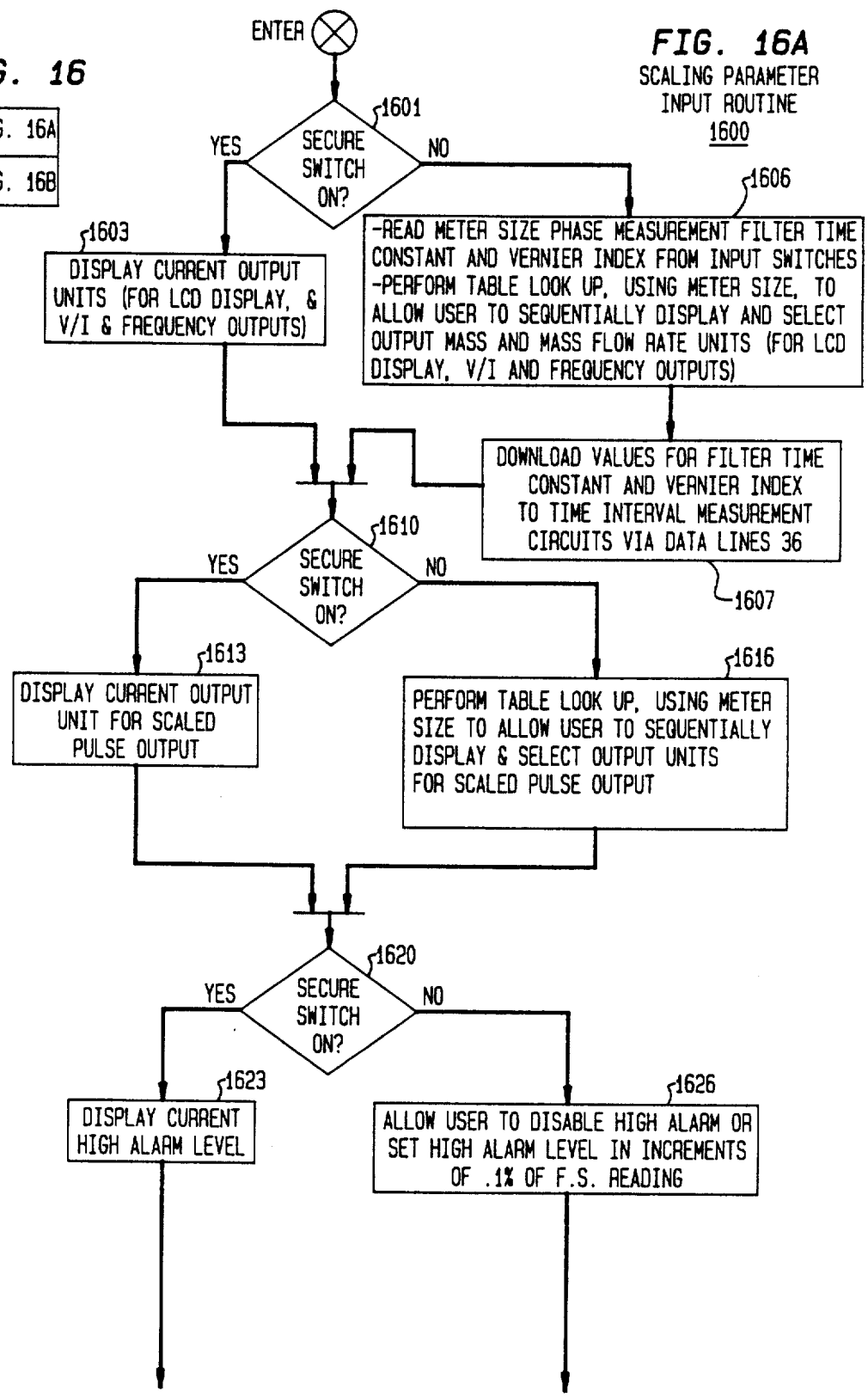

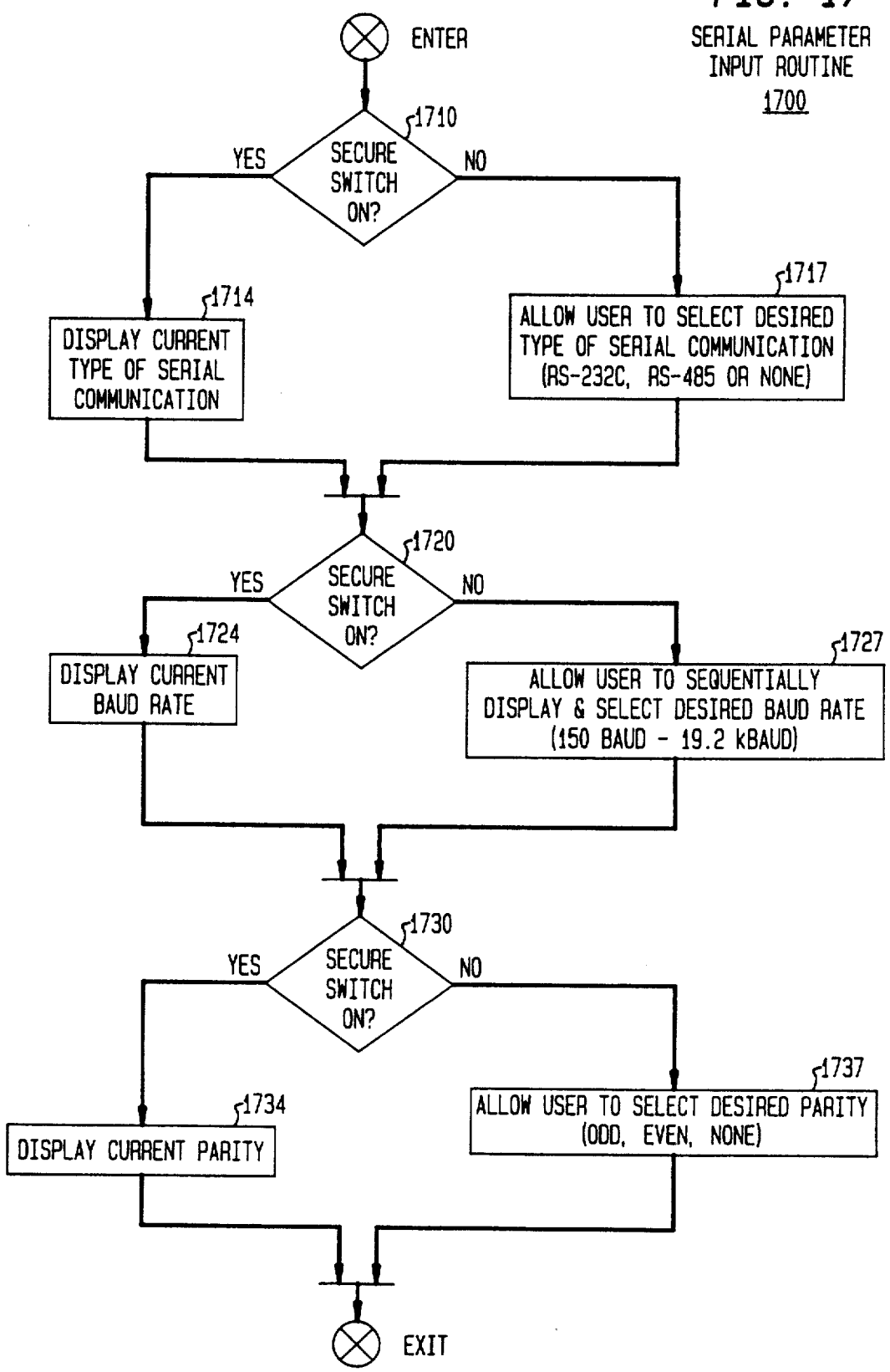

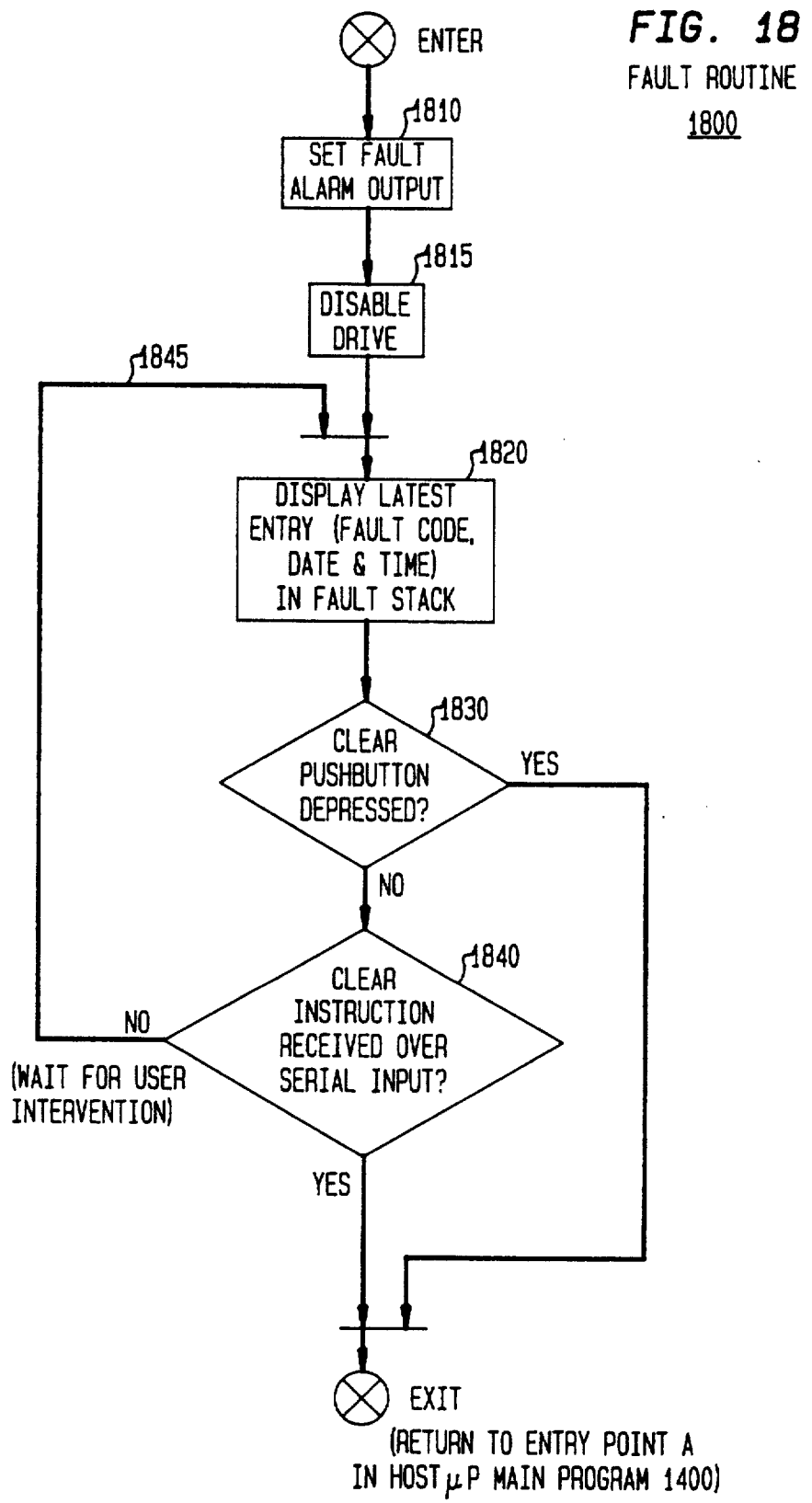

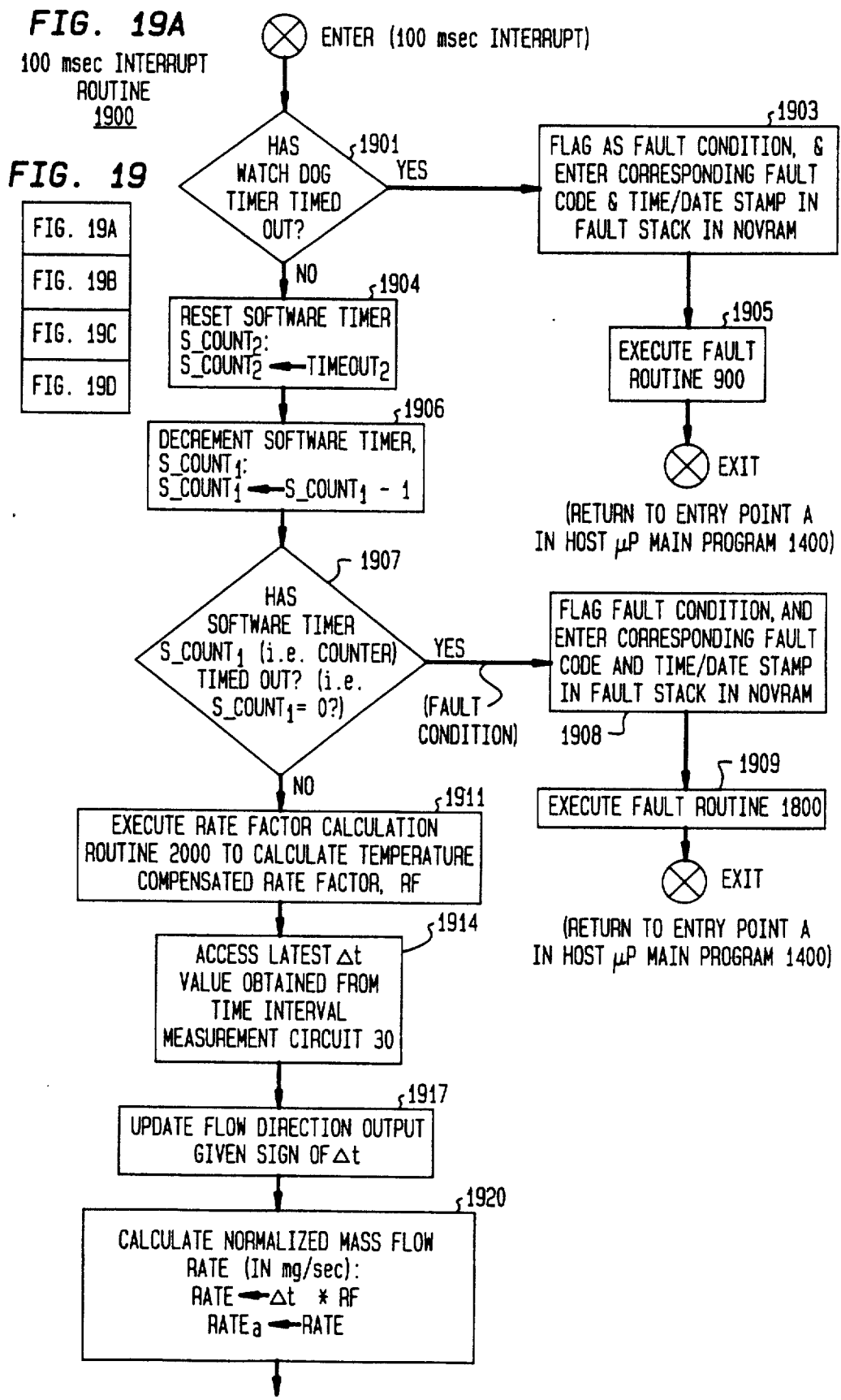

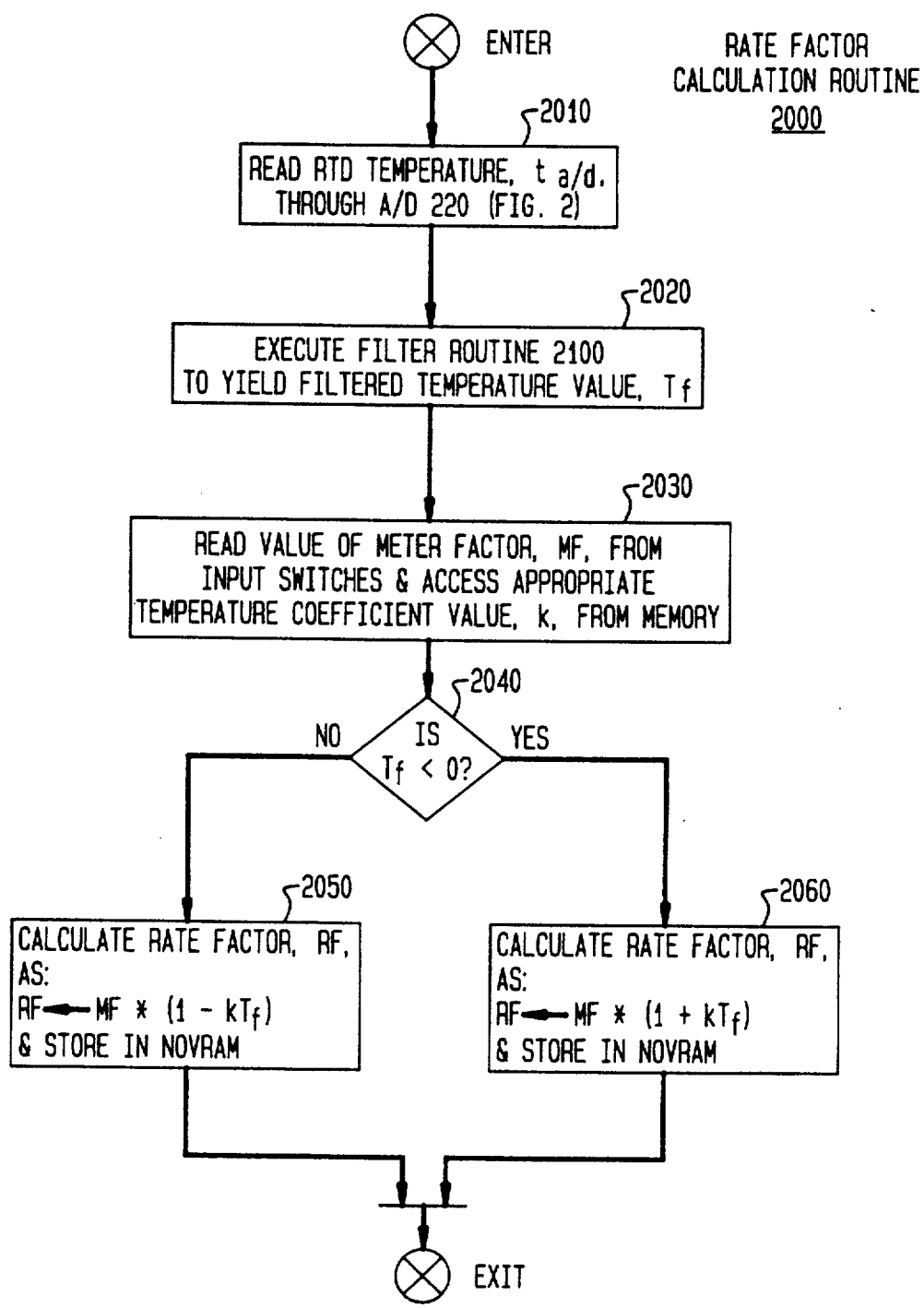

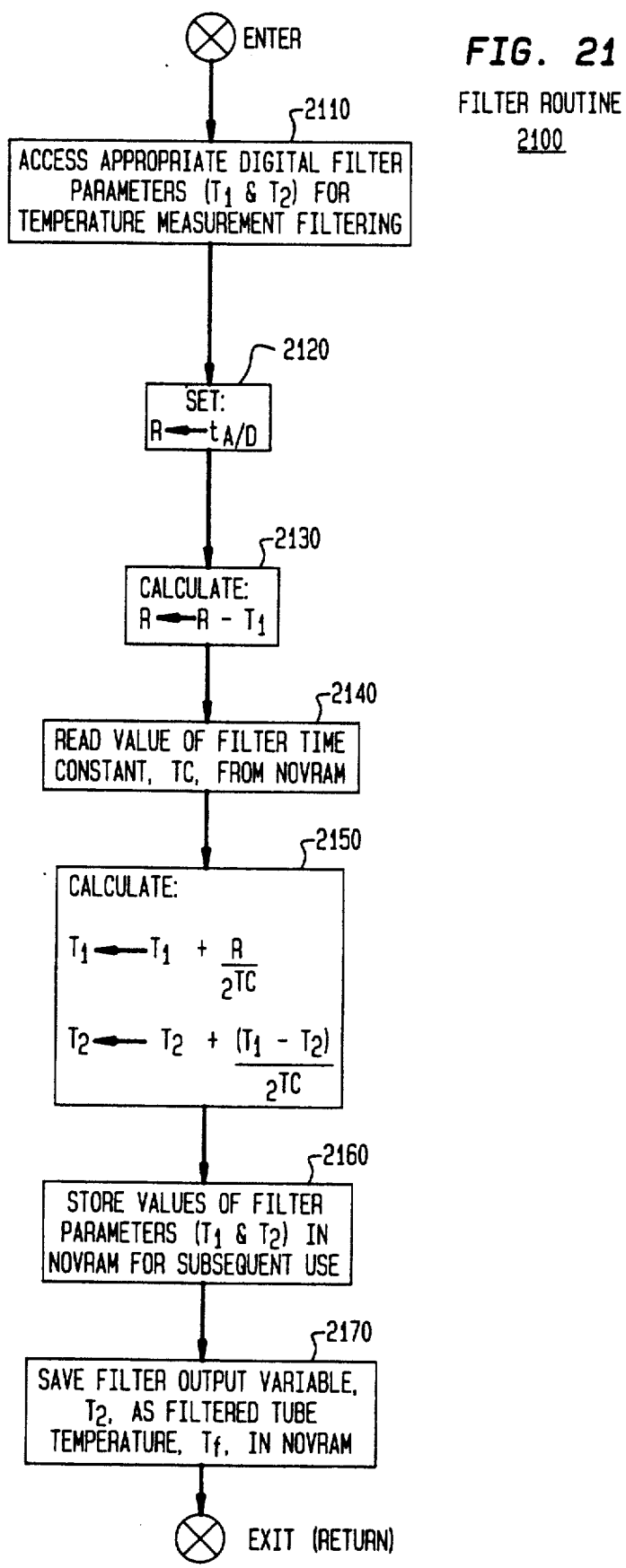

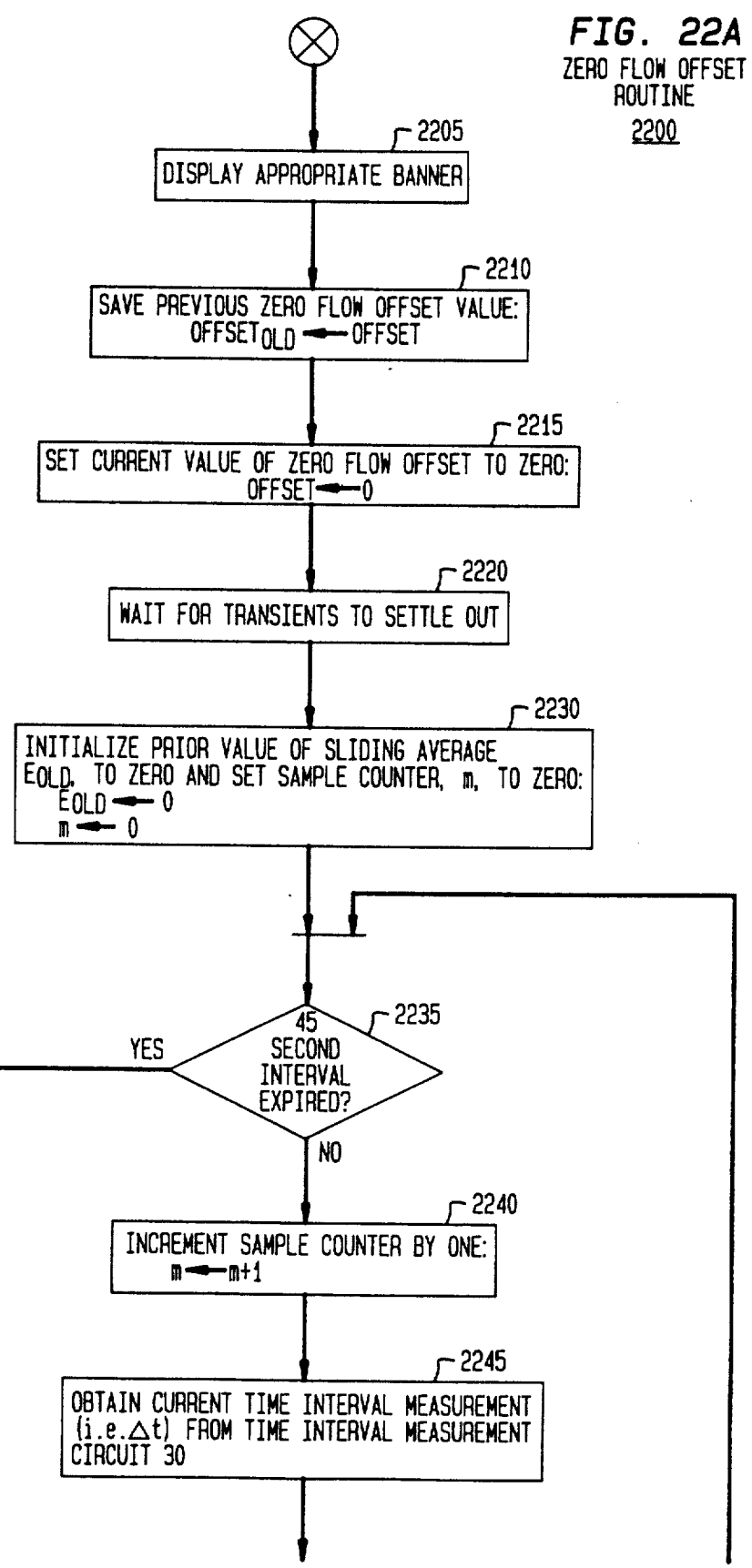

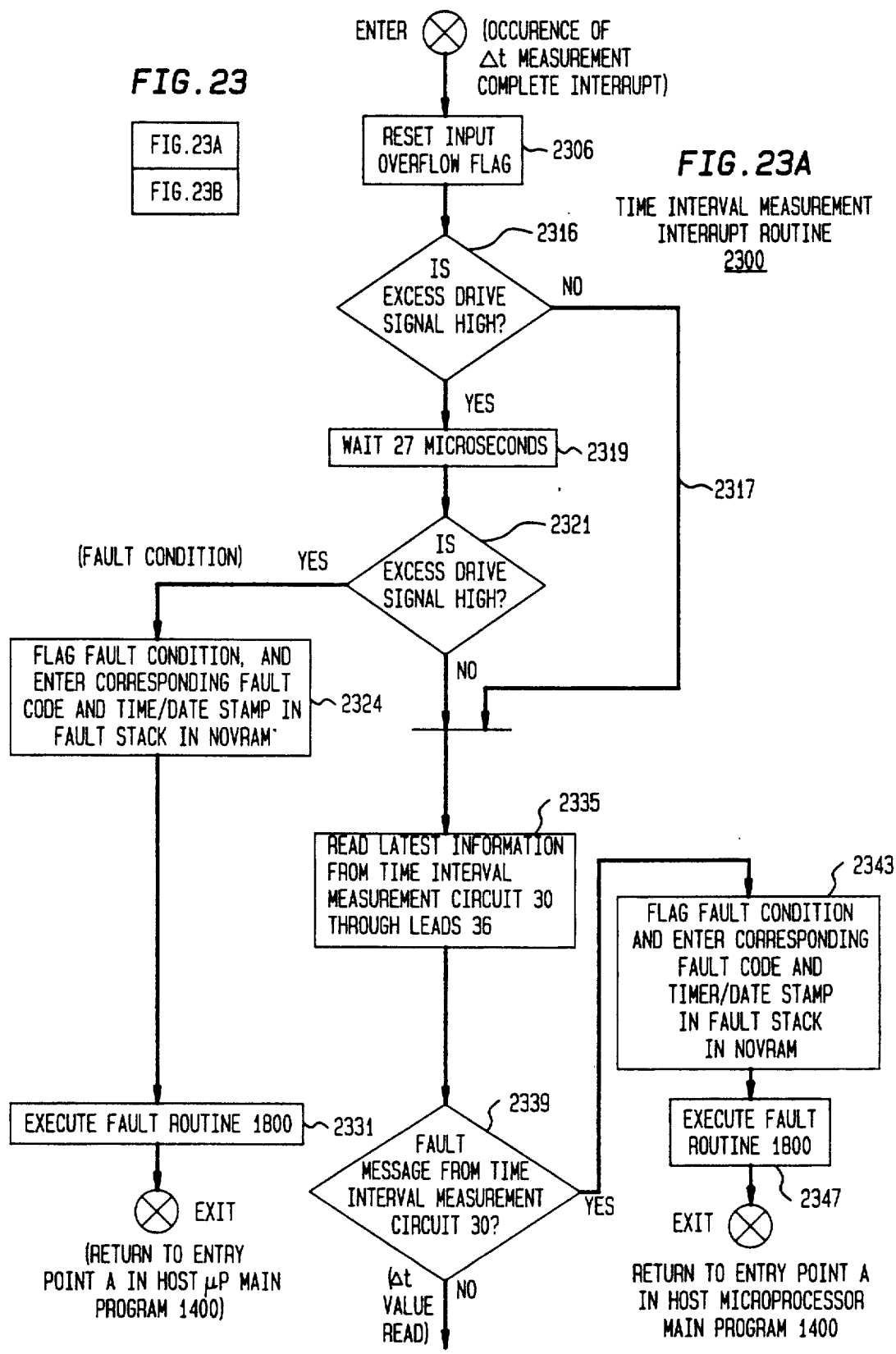

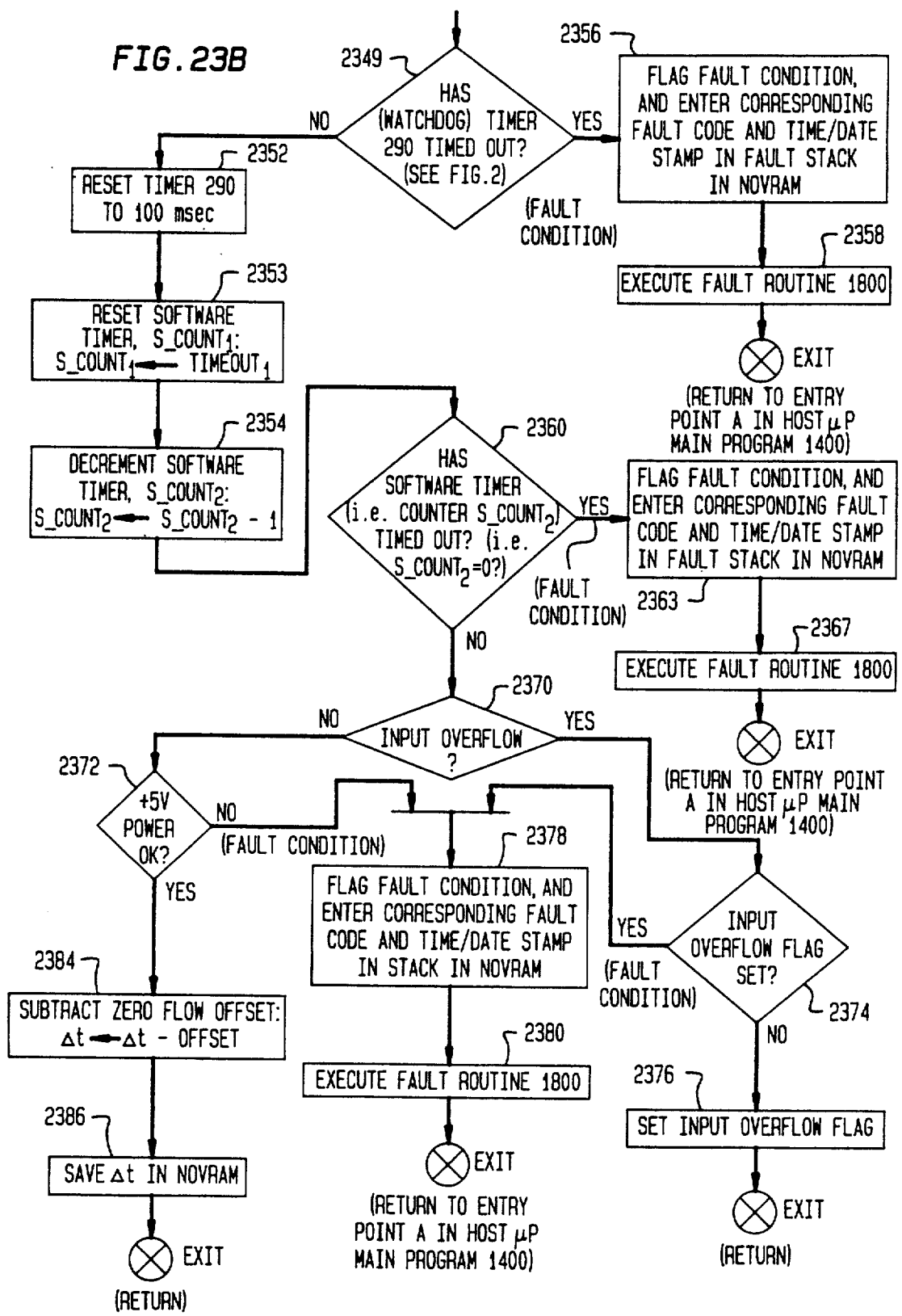

CORIOLIS DENSIMETER HAVING SUBSTANTIALLY INCREASED NOISE IMMUNITY

This application is a division of my co-pending patent application Ser. No. 07/361,000 filed on June 2, 1989.

BACKGROUND OF THE INVENTION

1. Field of the Invention

The present invention relates to apparatus for a Coriolis mass flow rate meter which is substantially immune to noise, and more particularly, to such a meter that is substantially unaffected by noise that occurs at any frequency different from a fundamental frequency at which the flow tube(s) in the meter vibrates and methods for use in such a meter.

2. Description of the Prior Art

Whenever a fluid flows through a rotating or oscillating conduit, Coriolis forces are produced which are perpendicular to both the velocity of the fluid moving through the conduit and the angular velocity of the rotating or oscillating conduit. The magnitude of these Coriolis forces is proportional to the product of the mass flow rate of the fluid and the angular velocity of the conduit. In general, so-called Coriolis mass flow rate meters measure the mass flow rate of the fluid by sensing oscillatory motion of the conduit that results from the Coriolis forces generated by the moving fluid.

In general, Coriolis forces that appear in these mass flow rate meters are rather small in comparison to other forces that are normally present in the meter, such as momentum forces, inertial forces, pressure forces, and others. Consequently, sensitive and precise instrumentation was often employed in early Coriolis mass flow meters known in the art in order to accurately measure the small Coriolis force effects, such as conduit deflection, which resulted from moderate mass flow rates and reasonable angular velocities. Such instrumentation was usually quite expensive. In addition, the angular velocity of the conduit also had to be accurately measured and controlled in order to determine the mass flow rate of the fluid passing through the conduit as a function of the magnitude of the generated Coriolis forces.

A mechanical configuration and measurement technique which, among other things, avoids the need to measure and control the magnitude of the angular velocity of the conduit and also its sensitivity and, to a reasonable degree, accurately measures the Coriolis force is taught in Smith U.S. Pat. Re. No. 31,450 (issued on Nov. 29, 1983 and hereinafter referred to as the '450 reissue patent). This patent discloses a mechanical configuration which incorporates a U-shaped flow tube, devoid of pressure sensitive joints, which has its open ends attached to opposite sides of a manifold. When so mounted, this flow tube is capable of being oscillated about an axis oriented perpendicular to the side legs of the U-shaped tube. This axis is located near the tube-manifold interface and is situated in a plane in which the U-shaped tube lies at rest. This plane is hereinafter referred to as the midplane of oscillation. When fluid flows through the mounted U-shaped flow tube, the filled flow tube is forced to oscillate. These oscillations are sufficient to cause the free end of the flow tube to pass through the mid-plane of oscillation and thereby generate a Coriolis force couple which elastically deflects the free end of the flow tube about an axis. This axis is located in the plane of the flow tube midway between and parallel to its side legs. The flow tube is designed to resonantly oscillate about this axis and another axis orthogonal thereto such that the forces which oppose the generated Coriolis forces are predominantly linear spring forces. Consequently, these spring forces cause one of the two side legs of the flow tube to pass through the midplane of oscillation before the other side leg does so. As such, the mass flow rate of the fluid that flows through the flow tube is proportional to the width of the time interval (time delay) occurring between the passage of the respective side legs of the tube through the mid-plane of oscillation. This time interval and, hence, the mass flow rate of the fluid can be measured, within a reasonable degree of accuracy, using optical sensors as disclosed in the '450 reissue patent, or by using electromagnetic velocity sensors, as disclosed in Smith U.S. Pat. No. 4,422,338 (issued on Dec. 27, 1983).

The '450 reissue patent also teaches the use of a spring arm which extends from the manifold along with the U-shaped flow tube. When this spring arm is sinusoidally driven in opposition to the U-shaped flow tube, the combination of spring arm and U-shaped flow tube operates as a tuning fork. This operation substantially attenuates undesirable vibrations occurring at the tube-manifold and spring arm-manifold interfaces. This attenuation is extremely advantageous for the following reason. In practice, these undesirable vibrations often occur, particularly at the tube-manifold interfaces, with sufficient intensity to effectively mask tube movement caused by the small Coriolis forces and thereby introduce significant errors into the time interval measurements of the passage of the side legs of the U-shaped tube through the mid-plane of oscillation. Because the mass flow rate is proportional to the time interval measurements, these errors inject significant inaccuracies into the measured mass flow rate. Tuning fork operation substantially cancels these undesirable vibrations and thereby significantly increases measurement accuracy. In addition, reducing vibrations that occur at the manifold also decreases long term fatigue effects induced by vibrations that might otherwise occur on the meter mounting structure. The substitution of a second flow tube, having a similar configuration to the first flow tube, for the spring arm, provides an inherently balanced tuning fork structure. The inherent symmetries in such a structure further reduce undesirable vibrations and thereby further increase measurement accuracy. This teaching has been recognized in the design of densimeters wherein measurements of the resonant frequency of filled flow tubes are used to determine the density of fluids in the tubes. See, for example, Poole et al. U.S. Pat. No(s). 2,635,462 (issued during Apr. 1957) and Brockhaus 3,456,491 (issued during July 1969).

The art also teaches the use of a serial double flow tube configuration in a Coriolis mass flow rate meter. Such a configuration is described in Cox et al. U.S. Pat. No(s). 4,127,028 (issued on Nov. 28, 1978); 4,192,184 (issued on Mar. 11, 1980) and 4,311,054 (issued Jan. 19, 1982). Here, incoming fluid sequentially passes through one flow tube, then through an interconnecting conduit and lastly through another flow tube. Unfortunately, series type double flow tube meters possess inherent drawback: since all the fluid must pass through two flow tubes instead of one, the fluid pressure drop across the meter is greater than that of a non-serial type flow meter. One way to compensate for this increased pressure drop is to increase the pressure at which incoming fluid is supplied to the meter. Unfortunately, this generally entails increasing the pumping capacity of the entire fluidic system that supplies fluid to the meter.

An alternate configuration involving parallel flow tubes is disclosed in Smith U.S. Pat. No. 4,491,025 (issued on Jan. 1, 1985 and hereinafter referred to as the '025 patent). Here, incoming fluid is evenly divided between and flows into parallel, illustratively two U-shaped, flow tubes rather than sequentially passing through two serially connected flow tubes. At the output end of each parallel flow tube, the fluid is combined in a drain manifold and from there exits the meter. The two flow tubes are sinusoidally oscillated. As the fluid moves through both flow tubes, Coriolis forces are produced which alternately deflect adjacent legs of the tubes and, in turn, permit time interval measurements to be made in order to determine the mass flow rate of the fluid.

The parallel flow tube design provides significant advantages over the discussed prior art designs that utilize single or serially connected flow tubes. First, each parallel flow tube may be constructed with relatively thin walls which, in turn, provides increased sensitivity. Specifically, as the wall thickness of a flow tube decreases, the mass and rigidity of the tube also decreases which, in turn, increases tube deflection caused by Coriolis forces. Increasing the deflection for a given mass flow rate advantageously increases the sensitivity of the meter. Second, parallel tube flow meters are, in general, operationally more stable than either single flow tube or serial flow tube meters. This occurs because the fluid flowing through both tubes results in a dynamically balanced pair of tuning fork tines, i.e. as the mass of one tine varies due to increased fluid density so will the mass of the other tine. Third, parallel flow tube meters are less sensitive to error-producing external vibrations and, hence, provide more accurate fluid flow measurements than do single tube or serial tube flow meters. This occurs because the time interval measurement sensors can be mounted on the flow tubes without a physical reference to any structure that is immutably fixed with respect to the mid-planes of oscillation for the tubes. Fourth, parallel flow tube meters exhibit less pressure drop across the entire meter than does a serial flow tube meter.

Other parallel and serial flow tube designs known in the art are typified by those shown in Smith et al. U.S. Pat. No. 4,252,028 (issued on Feb. 24, 1981) and Dahlin et al. U.S. Pat. No. 4,660,421 (issued on Apr. 28, 1987), the latter patent being assigned to Exac Corporation of Campbell, California.

Now, although parallel and serial flow tube designs known in the art provide reasonable performance, the accuracy of these designs is adversely affected by noise. In Coriolis mass flow rate meters, the mass flow rate of a fluid that moves through the meter is only proportional to the time interval (time delay) that occurs at the driving frequency of the flow tube. Hence, in all Coriolis mass flow rate meter designs known in the art—whether serial or parallel, a critical goal of any of these designs is to measure a time interval for tube movement that occurs at only the fundamental frequency at which the tube is being driven. This interval is the time that elapses between the instant one point situated on a side leg of the flow tube crosses a predetermined location, e.g. a respective mid-plane of oscillation, until the instant a corresponding point situated on the opposite side leg of the same flow tube, crosses its corresponding location, e.g. its respective mid-plane of oscillation.

Unfortunately, in Coriolis mass flow rate meters known in the art—whether using one or more flow tubes in either a serial or parallel configuration, I have discovered that these time delay measurements contain components that occur at frequencies other than the resonant (fundamental) driving frequency of the flow tube. These components disadvantageously inject error into the time delay measurements which, in turn, adversely affects the overall accuracy of the meter.

Specifically, to greatly simplify both the mathematics involved in designing a Coriolis mass flow rate meter and the electronic circuitry that processes the measured time delays, the art has generally assumed that each flow tube, that is used in such a meter, can be accurately modeled as a lumped spring mass system that possesses a single degree of freedom. As a result, this assumption provides a first order approximation of the actual behavior of each flow tube. While this assumption greatly simplifies the mathematics, the assumption over-simplifies the behavior of each oscillating flow tube. In actuality, each flow tube is a continuous mechanical system having many degrees of freedom in which an infinite number of preferential frequencies (modes) can exist. As such, the frequency response of this system will resemble that of a classical filter having a number of spectral lines (response peaks) at increasing frequencies. Certain of these peaks result from bending modes of the tube, others result from torsional modes of the tube and the like. These modal frequencies are often not harmonically related. Therefore, even if each flow tube is driven at its fundamental frequency of vibration, due to the Coriolis forces, the sinusoidal movement of the tube sides will exhibit response peaks at other frequencies in addition to the fundamental driving frequency. The response peaks occurring at these other frequencies tend to corrupt the time delay measurements.

In addition to modal sources, noise occurs from other sources. For example, the sensors used to measure tube motion are generally assumed to operate as linear devices. These sensors are generally either optical devices or electromagnetic velocity sensors which, in reality, are non-linear devices that produce harmonics when excited. Therefore, the output of these transducers are generally corrupted by harmonic components. Electromagnetic velocity sensors, which are typically used in the art, contain coils and/or magnets which are mounted to the flow tube. Such a velocity sensor has characteristics that markedly change with temperature. As such, the signals produced by these sensors also frequently contain harmonic components.

Furthermore, broadband noise is often produced by virtue of the fluid flowing through a flow tube. Specifically, as the mass flow rate increases, the flow becomes increasingly turbulent which, in turn, increases the modal excitation of the vibrating flow tube. This is particularly evident with gaseous flows which often generate acoustical waves within the flow stream that inject significant amounts of noise into the flow tube sensor signals. The amount of this noise is often so large as to render Coriolis meters unsuitable for measuring gaseous flows.

Now, in the Coriolis mass flow rate measurement art, time intervals, occurring between movement of respective side legs of the flow tube, are typically measured using traditional zero (or level) crossing techniques. Unfortunately, if noise, such as harmonics or broadband noise, contaminates the signals produced by either tube sensor, then the phase shift between the two flow tube sensor signals will disadvantageously change from its true value. Inasmuch as the actual phase shift is often a small value, then any such noise may inject a noticeable error component into measured phase shift and thereby into the measurement of the actual mass flow rate of the fluid as it travels through the meter. Often, in an attempt to remove the noise, the zero (or level) crossing detectors are preceded by a bandpass filter, such as a well known Chebyshev or Butterworth type analog filter. Unfortunately, the output of these filters varies with temperature. Moreover, it is difficult to provide two such analog filters that are exactly matched to each other for temperature variations. Consequently, with analog filters, temperature variations will likely inject error into the phase and hence into the mass flow rate measurements. One way to eliminate this error would be to convert the analog signals produced by the flow tube sensors into a stream of digital values, filter these values digitally and re-convert the results back into the analog domain to measure the phase using conventional zero (or level) crossing detectors. Unfortunately, such an approach is quite complex and unnecessarily expensive.

Due to the apparent difficulty and attendant expense associated with adequately removing noise from flow tube sensor signals, it appears that the art has merely accepted the fact that such signals used in Coriolis mass flow rate meters will contain noise, whether harmonic, broadband or otherwise. As a result, the overall accuracy of presently available Coriolis mass flow rate meters and the use of these meters in certain applications have been limited by the presence of noise.

Therefore, a need exists in the art for a highly accurate Coriolis mass flow rate meter and particularly one that is substantially immune to noise. Specifically, a need exists for such a meter that is inexpensive and substantially insensitive to any frequency other than the fundamental frequency at which a flow tube in the meter is driven.

SUMMARY OF THE INVENTION

Accordingly, it is an object of the present invention to provide a Coriolis mass flow rate meter that is substantially more accurate than such meters currently available in the art.

A specific object is to provide such a meter which is substantially immune to noise, regardless of whether that noise originates from harmonics, turbulent flow conditions, modal excitation or other noise sources.

A more specific object is to provide such a meter that is substantially immune to any noise source that occurs at a frequency different from the fundamental flow tube driving frequency and thereby measures mass flow rate as a function of a time interval that occurs only at the fundamental driving frequency.

Another more specific object is to provide such a meter that can accurately measure mass flow rate in most, if not all, situations where turbulent flow occurs within the meter and therefore will find wider use than Coriolis mass flow rate meters heretofore known in the art.

Another more specific object is to provide such a meter that can accurately measure mass flow rate regardless of whether one or more flow tubes are used and regardless of whether these flow tubes are connected to each other in series or parallel.

Another more specific object is to provide such a meter that does not utilize analog filters and thereby eliminates any need to use any such filters that have matched temperature characteristics.

A further specific object is to provide such a meter that is relatively inexpensive.

These and other objects are provided in accordance with the teachings of the present invention by my inventive apparatus for a metering system, that utilizes a Coriolis flow meter, and my inventive method for use therein. Specifically, through my method, a flow conduit, e.g. a flow tube, that is used in a Coriolis meter is first driven in a sinusoidal vibratory pattern and at a resonant frequency thereof while the fluid flows therethrough. In addition, the signals produced by first and second sensor signals, e.g. left and right magnetic velocity sensors, are sampled at a given pre-defined initial frequency. A power spectra is determined, during system initialization, using illustratively the Discrete Fourier Transform (DFT), for one of the sampled sensor signals. This power spectrum covers a pre-selected sequence of constituent frequencies that forms this one sampled sensor signal. Once this power spectrum is determined, then a particular frequency at which the spectrum reaches a maximum value is selected as being the fundamental frequency at which the flow conduit is resonantly vibrating. Thereafter, the sampling frequency is set to a pre-defined integer multiple of the selected frequency. After these operations have occurred, mass flow rate measurements begin. To determine mass flow rate, both sensor signals are separately transformed from the time domain to the frequency domain, again using illustratively the DFT but which is evaluated at one frequency component, i.e. the fundamental (selected) frequency, to yield corresponding frequency values specifically formed of the values of the real and imaginary components for this one frequency component. Once the values of these components are obtained for both sensor signals, a phase difference therebetween is calculated which, in turn, is used to determine a value of the mass flow rate of the fluid being measured. Because this phase difference is evaluated only for the frequency component that occurs at the fundamental frequency at which the flow conduit is resonantly vibrating, the value of this phase difference advantageously contains substantially no components arising from other frequencies, such as harmonics or other noise sources. Inasmuch as the resulting mass flow rate value is determined through use of this phase difference, the resulting mass flow rate measurement advantageously is highly accurate and has a substantial noise immunity.

In accordance with a specific embodiment of my invention, the fundamental frequency is determined during initialization using a combination of a coarse search and a fine ("vernier") search. Specifically, prior to initialization, the fundamental frequency at which the flow conduit(s), e.g. two flow tubes, vibrate is only known to exist within a certain range but the exact value within that range is not known. To save processing time, a power spectrum is first computed at a fairly "coarse" resolution, using the DFT, for one of the velocity waveforms, illustratively that produced by the left velocity sensor. This power spectrum is determined by calculating the magnitude of all the frequency components that comprise the DFT of the waveform produced by the left velocity sensor. The coarse search is preferably undertaken with a sampling frequency of illustratively 640 Hz which, with "64" samples per measurement interval, provides "32" different frequencies at a resolution of approximately 5 Hz. Once this power spectrum has been computed, the coarse frequency component at which the power spectrum reaches a maximum value is selected as being the initial fundamental frequency at which the flow tubes resonantly vibrate. Now, once this frequency has been selected, the sampling frequency is set to an integer multiple, e.g. "128" times, of this selected frequency.

Owing to the limited resolution of the coarse search, the actual fundamental frequency can lie within ±5 Hz of the value of the selected frequency. Since this resolution is simply too inaccurate (i.e. too low) for setting the sampling frequency during which accurate phase measurements are to be made, a fine search is undertaken to sweep through a ±5 Hz region of the selected frequency at a higher resolution, typically at 0.1 Hz increments. The vernier search computes a power spectrum, specifically the magnitude associated with each one of a series of samples taken with slightly different sampling intervals at the "fine" resolution and contained within a selected 10 Hz coarse frequency bin centered around the selected frequency. Once this power spectrum is determined, the "fine" frequency value, i.e. at a resolution of illustratively 0.1 Hz that as the highest magnitude associated therewith in this power spectrum is selected. Once the "fine" frequency is selected, the sampling frequency is set to the pre-defined integer multiple, i.e. "128" times, of this frequency. Thereafter, the system iteratively measures mass flow rate to provide a series of mass flow rate measurements. In particular, the system first sequentially evaluates the DFT of both velocity sensor signals at the fundamental frequency to first determine the real and imaginary values associated with this frequency component that appears in both velocity signals. Then, using these real and imaginary values, the system computes the phase difference occurring between the transformed signals at the fundamental frequency. Once this has occurred, the system calculates the mass flow rate from the value of this phase difference.

I have observed that changes in phase between the real and imaginary components of either velocity sensor signal, when determined with respect to the zero crossing of that signal, can be used to track changes in the frequency at which the flow tube(s) resonantly vibrate. Hence, inasmuch as the resonant vibratory frequency of the flow tube(s) will change as the density of the fluid passing therethrough changes, the phase of either one of the velocity waveforms, illustratively the left velocity sensor, is determined. The phase is evaluated by first calculating the values of the real and imaginary components of the DFT for this waveform that occur at the fundamental frequency and second, through use of the small angle approximation, calculating the ratio between these imaginary and real components. Once this value of the phase is determined, it is then appropriately scaled by a proportionality constant. The resulting scaled value is then used to re-adjust the sampling frequency such that the sampling frequency employed in determining the next mass flow rate measurement remains substantially equal to the pre-defined multiple of the fundamental frequency. This advantageously minimizes undesirable frequency leakage effects thereby advantageously providing highly accurate mass flow rate measurements.

Now, in accordance with a feature of the present invention, the phase that is determined for either sensor signal can be used to provide a highly accurate measure of the density of the fluid passing through the meter. In particular, the phase of either velocity sensor signal, when referenced to the zero crossing of that signal, will be proportional to and track density changes in the fluid flowing through the meter. Consequently, by monitoring the value of the phase for either one of the velocity sensor signals, a very accurate measurement of fluid density changes can be obtained. Specifically, during initialization, a base-line density value for the fluid being measured is obtained, such as through a thumbwheel entry. Thereafter, the value of the phase determined for one of the velocity sensor waveforms, e.g. the left velocity waveform, is multiplied by a pre-determined proportionality constant with the resultant product being added to the base-line density value to yield a current density measurement. Since the DFT provides a highly selective filter, the resulting phase measurements calculated thereby and the density measurements obtained therefrom will advantageously be highly accurate and substantially immune to noise.

BRIEF DESCRIPTION OF THE DRAWINGS

The teachings of the present invention may be readily understood by considering the following detailed description in conjunction with the accompanying drawings, in which:

FIG. 5 shows a flowchart of Time Interval (Δt) Measurement Circuit Main Program 500 executed by microprocessor 330, located within Time Interval Measurement Circuit 30 shown in FIG. 2;

FIG. 6 depicts a flowchart of Initialization Routine 600 that is executed as part of Time Interval Measurement Circuit Main Program 500 shown in FIG. 5;

FIG. 7 depicts a flowchart of DFT Routine 700 that is executed as part of Initialization Routine 600 shown in FIG. 6;

FIG. 8 depicts a flowchart of Vernier Search Routine 800 that is also executed as part of Initialization Routine 600 shown in FIG. 6;

FIG. 9 shows the proper alignment of the drawing sheets for FIGS. 9A and 9B;

FIGS. 9A and 9B collectively depict a flowchart of Real-Imag Component Routine 900;

FIG. 10 depicts a flowchart of Channel 1 Real-Imag Compute Routine 1000 that is executed as part of Real-Imag Component Routine 900 shown in FIGS. 9A and 9B;

FIG. 11 depicts a flowchart of Channel 2 Real-Imag Compute Routine 1100 that is also executed as part of Real-Imag Component Routine 900 shown in FIGS. 9A and 9B;

FIG. 12 depicts a flowchart of Phase Angle Calculation Routine 1200 that is also executed as part of Time Interval Measurement Circuit Main Program 500 shown in FIG. 5;

FIG. 13 depicts a flowchart of Frequency Tracking Routine 1300 that is also executed as part of Time Interval Measurement Circuit Main Program 500 shown in FIG. 5;

FIG. 14 shows the proper alignment of the drawing sheets for FIGS. 14A-14D;

FIGS. 14A-14D collectively depict a flowchart of Host Microprocessor (μP) Main Program 1400 that is executed by host microprocessor 205 located within meter electronics 20 shown in FIG. 2;

FIG. 16 shows the proper alignment of the drawing sheets for FIGS. 16A and 16B;

FIGS. 16A and 16B collectively depict a flowchart of Scaling Parameter Input Routine 1600 that is executed as part of Menu Routine 1500 shown in FIGS. 15A and 15B;

FIG. 17, depicts a flowchart of Serial parameter Input Routine 1700 that is also executed as part of Menu Routine 1500 shown in FIGS. 15A and 15B;

FIG. 18 depicts a flowchart of Fault Routine 1800;

FIG. 19 shows the proper alignment of the drawing sheets for FIGS. 19A-19D;

FIGS. 19A-19D collectively depict a flowchart of 100 msec Interrupt Routine 1900;

FIG. 20 depicts a flowchart of Rate Factor Calculation Routine 2000 that is executed as part of 100 msec Interrupt Routine 1900 shown in FIGS. 19A-19D;

FIG. 21 depicts a flowchart of Filter Routine 2100 that is executed as part of Rate Factor Calculation Routine 2000 shown in FIG. 20;

FIG. 22 shows the proper alignment of the drawing sheets for FIGS. 22A and 22B;

FIGS. 22A and 22B collectively depict a flowchart of Zero Flow Offset Routine 2200 that is executed as part of 100 msec Interrupt Routine 1900 shown in FIGS. 19A-19D;

FIG. 20 shows the proper alignment of the drawing sheets for FIGS. 23A and 23B;

FIGS. 23A and 23B collectively depict a flowchart of Time Interval Measurement Interrupt Routine 2300.

To facilitate reader understanding, identical reference numerals have been used, where possible, to denote identical elements that are common to various figures.

DETAILED DESCRIPTION

Figure 1:
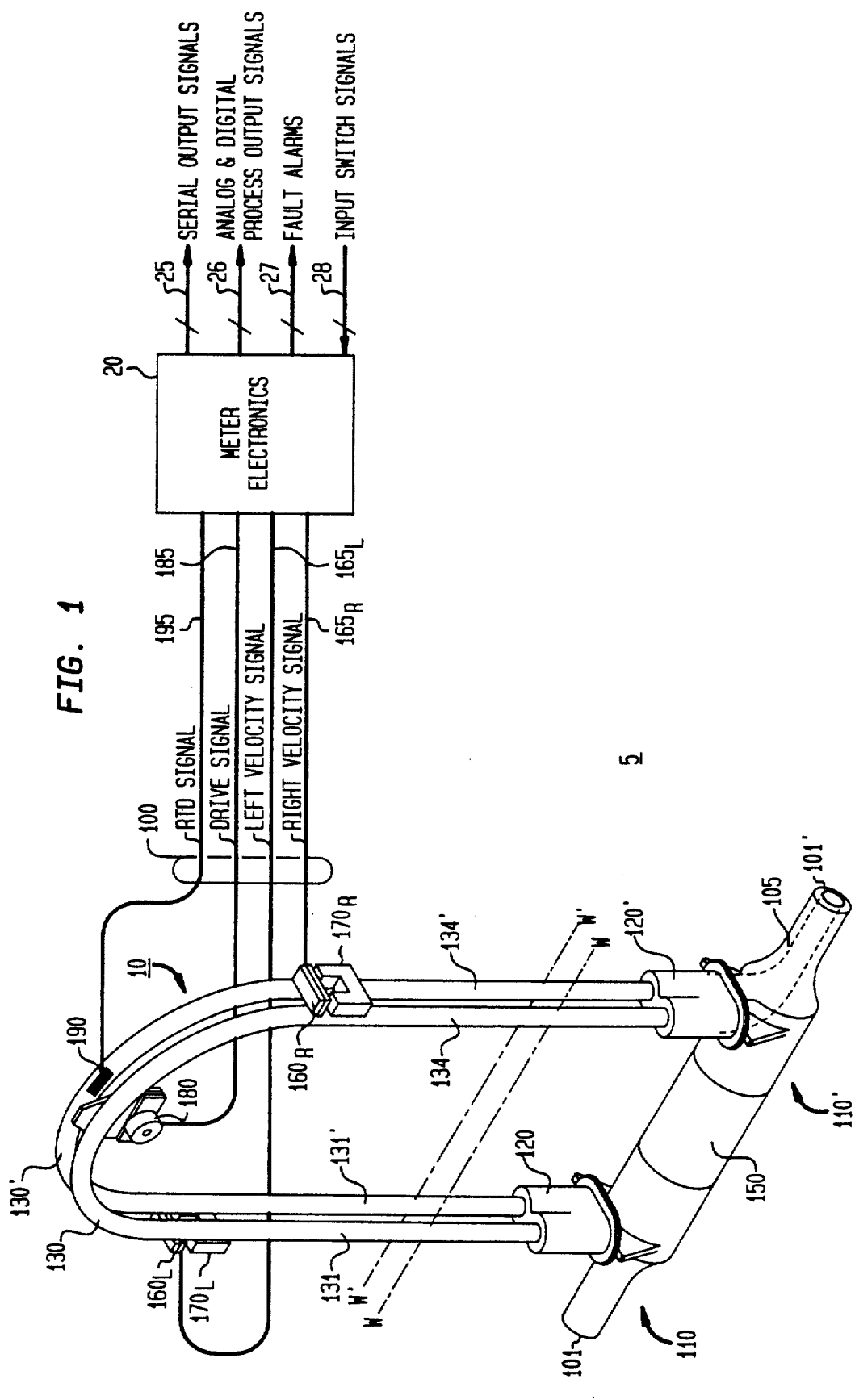
FIG. 1 depicts an overall diagram of a custody transfer metering system 5 which embodies the teachings of the present invention.

After reading the following detailed description, those skilled in the art will readily realize that my invention can be used in conjunction with any Coriolis mass flow rate meter to render that meter substantially immune to noise and thereby significantly increase its measurement accuracy. Since high accuracy is particularly important in custody transfer applications, my invention will be illustratively discussed in the context of a custody transfer system utilizing a Coriolis mass flow rate meter.

Now, in order to convey a full understanding of my invention, a discussion of the mathematical basis of determining an accurate phase measurement, as used in my inventive metering system, will first be presented followed by separate discussions of the hardware and software that collectively form a preferred embodiment of my invention.

I. Phase Measurement

The art teaches that the mass flow rate of a fluid travelling through a flow tube in a Coriolis mass flow rate meter is proportional to the time delay between the instant one point situated on a side leg of the flow tube crosses a reference point and the instant the opposite side leg of the same flow tube crosses the same respective point. For convenience, these reference points may be viewed as the same end point of travel of each leg, i.e. where the velocity is zero. An electromagnetic velocity sensor is used to provide a signal proportional to the velocity of each side leg of the tube and hence provide a profile of the complete travel of the tube. The time interval between zero crossings, or more generally, the phase difference (between the signals produced by both velocity sensors) divided by the resonant frequency at which the flow tubes vibrate is proportional to the mass flow rate of the fluid. To yield an accurate measurement, the phase difference should preferably be measured at the frequency at which the flow tube is being driven, i.e. is vibrating.

Now, in accordance with the present invention, the inventive meter ascertains this phase difference by determining the phase difference between the signals produced by both velocity sensors at the fundamental driving frequency by measuring the real and imaginary components of each signal at this frequency illustratively using the Discrete Fourier Transform (DFT). Other suitable transforms, such as illustratively the Hanning, Hilbert or the Fast Fourier Transform (FFT) can also be used. Moreover, various other transforms may also be used to de-compose the velocity sensor signals into a set of orthogonal basis functions, and specifically an expansion of such functions. Based upon the results provided by such a transformation, the specific mathematical equations used to measure phase will change accordingly. For the sake of brevity, the present invention will be discussed in the context of the DFT. By transforming the velocity signals into the frequency domain and extracting phase information therefrom, instead of determining phase in the time domain as has been previously taught in the art, my inventive technique provides a highly selective filter which advantageously renders the inventive meter substantially immune to noise, regardless of whether that noise originates from harmonics, turbulent flow conditions, modal excitation or other sources. Inasmuch as the measured phase difference contains substantially no components due to phase differences occurring at frequencies other than the flow tube driving frequency, the inventive meter is substantially more accurate than other Coriolis mass flow meters currently known in the art.

Furthermore, in accordance with the present invention, to determine the phase difference, the DFT, specifically the real and imaginary components, needs to be evaluated at only one frequency component, i.e. the frequency at which the flow tubes are resonantly vibrating. As such, whenever the flow tubes are vibrating during normal meter operation, there is no need to calculate the complete DFT, i.e. the DFT at all frequency components. This, in turn, advantageously saves a significant amount of processing time. The only time that the DFT is evaluated at several different frequencies occurs each time the flow tubes are placed into resonant vibration. At each of these times, an initialization procedure is envoked to evaluate the magnitude of the DFT within a range of frequencies in order to determine the specific value of the current frequency at which the flow tubes are resonantly vibrating. Specifically, during initialization, as discussed in detail below, a frequency search, using the DFT, is undertaken at a "coarse", typically ±5 Hz resolution, to locate the frequency "bin" within a pre-defined range that contains the resonant frequency. The magnitude of the DFT associated with this Frequency bin will reach a maximum value. Once this coarse frequency "bin " is located, a frequency search, again using the DFT, is then undertaken within this coarse frequency bin but at a "fine" resolution, typically 0.1 Hz, to accurately determine the value of the resonant frequency (0.1 Hz) bin that contains the actual resonant frequency. Again, the magnitude of the DFT associated with this resonant frequency will reach a local maximum value. The "fine" resolution is chosen such that the actual resonant frequency will fall at substantially the center of a corresponding fine frequency bin. By ensuring that the actual frequency falls at substantially the center of a fine frequency bin, frequency leakage into neighboring bins is advantageously reduced thereby reducing the likelihood that computational artifacts would occur and produce a false frequency lock.

By way of background, any sampled periodic signal may be de-composed, through the DFT, into a finite series of harmonically related sine and cosine waves wherein each wave has a particular pre-determined coefficient. The reader is referred to the textbook E. O. Brigham, *The Fast Fourier Transform* (©1974: Prentice-Hall; Englewood Cliffs, New Jersey) for a full discussion of the DFTs.

In general, the series of frequencies, G[n/NT], determined through the DFT that comprise a given periodic sampled function, s(KT) that contains exactly N samples, is given by the following equation:

$$G\left[\frac{n}{NT}\right] = \sum_{K=0}^{K=N-1} s(KT) e^{-j2\pi(n \cdot K)/N} \quad (1)$$

where:

n is an index value equivalent to the frequency component of interest, i.e. 0, 1, ..., N−1;

N is the total number of samples that have been taken; and

T is the sampling interval.

The exponential term can be re-written as:

$$e^{-j2\pi(n \cdot K)/N} = \cos\frac{2\pi nK}{N} - j\sin\frac{2\pi nK}{N} \quad (2)$$

Therefore, each frequency component will have a real portion (summation of cosine terms) and an imaginary portion (summation of sine terms). If we represent the real and imaginary components at any one frequency, n', as Re(n'K/N) and Im(n'K/N), then, the phase, Φ, at that frequency is simply given by:

$$\Phi(n'/NT) = \tan^{-1}[Im(n'K/N)/Re(n'K/N)] \quad (3)$$

and the magnitude at frequency n' is given by:

$$\left|G\left[\frac{n'}{NT}\right]\right| = \sqrt{\left(\left[\sum_{K=0}^{K=N-1} s(KT)\cos\frac{2\pi n'K}{N}\right]^2 + \left[\sum_{K=0}^{K=N-1} s(KT)\sin\frac{2\pi n'K}{N}\right]^2\right)} \quad (4)$$

Now, as noted, in a Coriolis mass flow meter, only one frequency is of interest; namely, the fundamental frequency at which the flow tube(s) is being driven. The mass flow rate of the fluid is proportional to the phase difference, occurring at this frequency, between sinusoidal velocity signals produced by both velocity sensors. Now, one way to determine the phase difference between the velocity sensor signals is to determine the phase of each signal (e.g. with respect to its zero crossing point) and subtract the results. Specifically, if the real and imaginary parts of the left and right velocity sensor signals at the driving frequency are represented as (Re$_1$, Im$_1$) and (Re$_2$, Im$_2$), then the phase difference, Φ, between both sensor signals is given by the following equation:

$$\Phi = \tan^{-1}[Im_1/Re_1] - \tan^{-1}[Im_2/Re_2]. \quad (5)$$

From a computational standpoint, use of equation (5) poses two problems. First, a look up table could be used to store values of the arc-tangent function; however, use of such a table is relatively complex. Alternatively, if the phase of each velocity signal always remains as a small quantity, then the "small angle approximation" will be valid, i.e. here the arc-tangent of an angle essentially equals the value of the angle itself, thereby obviating the need for a look up table and any necessary accompanying interpolation. In a Coriolis meter, the phase associated with each sensor signal is extremely small, often in the range of microradians. Therefore, the resulting difference calculated in equation (5) is the difference of two extremely small numbers. Often, insufficient resolution exists to compute such a difference without injecting a certain amount of error into the computation. Second, the phase of each sensor signal specifies where, on the waveform for that signal, sampling has begun. Now, to ensure that both imaginary portions are small and hence that the small angle approximation always remains valid for both terms in equation (5), both imaginary portions, Im$_1$ and Im$_2$, must remain quite small. This means that both channels must be synchronized together and sampling started for each at a respective peak or zero crossing point. This requires that circuitry must be used to ensure that both velocity signals are synchronized together. Such circuitry, often in the form of an appropriate phase locked loop, is rather complex and, like all circuitry, will inject a certain, though typically quite small, amount of error into the measurement process. Inasmuch as the phase angles being measured are extremely small, this additional error may be significant.

Now, to circumvent these limitations and determine the phase difference between both sensor signals, a transfer function can be fabricated as:

$$H(jw) = (Re_1 + j\,Im)/(Re_2 + j\,Im_2) \quad (6)$$

The phase of this transfer function, H (jw), provides the phase difference between both sensor signals. This phase difference, Φ, is given by the following equation:

$$\Phi = \tan^{-1}\frac{[Im_1 \ Re_2 - Re_1 \ Im_2]}{[Re_1 \ Re_2 + Im_1 \ Im_2]} \quad (7)$$

Although equation (7) requires more multiplications than does equation (5) but only one division as contrasted with two needed in equation (5), equation (7) computationally provides a significant advantage over equation (5). Inasmuch as the value of the fraction in equation (7) remains constant no matter where both velocity sensor signals are sampled, use of this equation eliminates the need to ensure that both channels are sampled on a synchronized basis. Consequently, thus dispenses with the need to add a synchronizing circuit and eliminates the attendant errors and cost associated with use of such a circuit. Also, since the phase shifts are usually very small, the imaginary portions of both sensor signals will remain small and hence the small angle approximation will still be valid here. Thus, equation (7) can be computed without the need for a arc-tangent look-up table. It is this equation, implemented in the manner set forth below, that is used to accurately determine phase differences that occur between left and right velocity sensor waveforms in the inventive Coriolis metering system.

With this background in mind, the discussion will now turn to the implementation of my inventive metering system and specifically to a detailed description of the hardware followed by a detailed description of the software used therein.

II. Hardware Description

FIG. 1 shows an overall diagram of a custody transfer metering system 5 that embodies the teachings of the present invention.

A. Overall System Description

As shown, system 5 consists of two basic components: Coriolis meter assembly 10 and meter electronics 20. Meter assembly 10 measures the mass flow rate of a fluid product being transferred. This fluid can be all liquid or an emulsion. Meter electronics 20, connected to meter assembly 10 via leads 100, provides mass flow rate and totalized mass flow information. For custody transfer applications, totalized flow information is provided through two separate totals: a user resettable flow total and a generally non-resettable inventory flow total (which can only be reset under very limited conditions, as set forth in detail below). Both totals and the mass flow rate information are visually displayed by meter electronics 20 and are also available in serial form, over leads 25. Mass floW rate information is also provided over leads 26 in frequency form and in scaled pulse form. In addition, mass flow rate information is also provided in analog form (selectable V/I form) over leads 26, for easy connection to downstream process control and/or measurement equipment. Furthermore, the inventive system continually performs diagnostic operations to advantageously permit it to detect many possible single fault conditions (faults) that could occur during system operation. To indicate a fault condition, contact closures are provided on leads 27 for connection to an appropriate alarm. User input (for example, to select measurement units) is provided through various input switches which are connected through leads 28 to meter electronics 20.

B. Coriolis Meter Assembly 10

Specifically, as shown, Coriolis meter assembly 10 includes a pair of manifolds 110 and 110'; tubular member 150; a pair of flow conduits here depicted as parallel flow tubes 130 and 130'; drive mechanism 180; a pair of velocity sensing coils $160_L$ and $160_R$; and a pair of permanent magnets $170_L$ and $170_R$. Tubes 130 and 130' are substantially U-shaped and have their ends attached to tube mounting blocks 120 and 120', which are in turn secured to respective manifolds 110 and 110'. Both flow tubes are free of pressure sensitive joints.

With the side legs of tubes 130 and 130' fixedly attached to tube mounting blocks 120 and 120' and these blocks, in turn, fixedly attached to manifolds 110 and 110', as shown in FIG. 1, a continuous closed fluid path is provided through Coriolis meter assembly 10. Specifically, when meter 10 is connected, via inlet end 101 and outlet end 101', into a conduit system (not shown) which carries the fluid that is being measured, fluid enters the meter through an orifice in inlet end 101 of manifold 110 and is conducted through a passageway therein having a gradually changing cross-section to tube mounting block 120. There, the fluid is divided and routed through flow tubes 130 and 130'. Upon exiting flow tubes 130 and 130', the fluid is recombined in a single stream within tube mounting block 120' and is thereafter routed to manifold 110'. Within manifold 110', the fluid flows through a passageway having a similar gradually changing cross-section to that of manifold 110—as shown by dotted lines 105—to an orifice in outlet end 101'. At end 101', the fluid reenters the conduit system. Tubular member 150 does not conduct any fluid. Instead, this member serves to axially align manifolds 110 and 110' and maintain the spacing therebetween by a pre-determined amount so that these manifolds will readily receive mounting blocks 120 and 120' and flow tubes 130 and 130'.

U-shaped flow tubes 130 and 130' are selected and mounted so as to have substantially the same moments of inertia and spring constants about bending axes W—W and W'—W', respectively. These bending axes are perpendicularly oriented to the side legs of the U-shaped flow tubes and are located near respective tube mounting blocks 120 and 120'. The U-shaped flow tubes extend outwardly from the mounting blocks in an essentially parallel fashion and have substantially equal moments of inertia and equal spring constants about their respective bending axes. Inasmuch as the spring constant of the tubes changes with temperature, resistive temperature detector (RTD) 190 (typically a platinum RTD device) is mounted to one of the flow tubes, here tube 130', to continuously measure the temperature of the tube. The temperature of the tube and hence the voltage appearing across the RTD, for a given current passing therethrough, will be governed by the temperature of the fluid passing through the flow tube. The temperature dependent voltage appearing across the RTD is used, as discussed in detail later, by meter electronics 20 to appropriately compensate the value of the spring constant for any changes in tube temperature. The RTD is connected to meter electronics 20 by lead 195.

Figure 4:
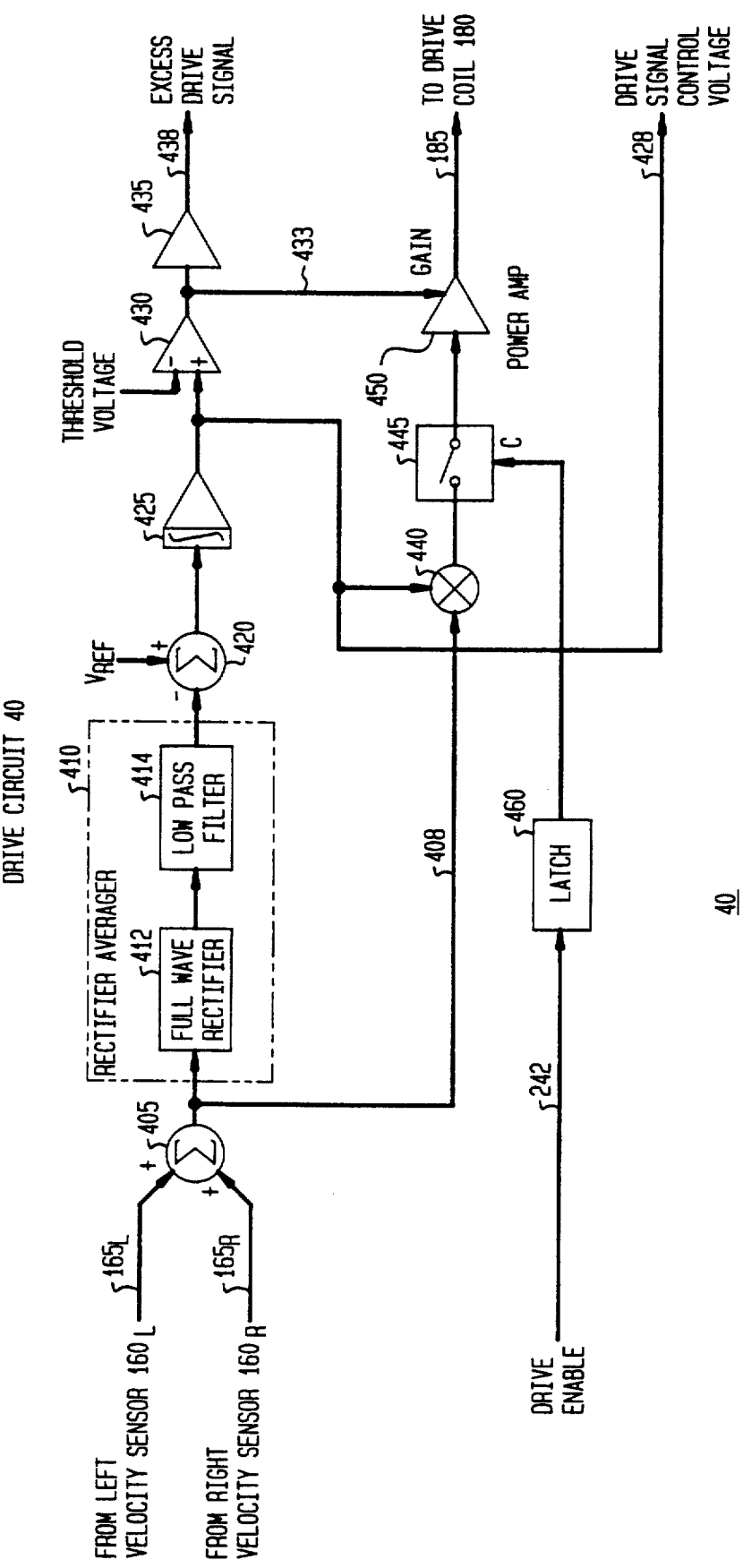
FIG. 4 depicts a block diagram of Drive Circuit 40, shown in FIG. 2.

Both of these flow tubes are sinusoidally driven in opposite directions about their respective bending axes and at essentially their common resonant frequency. In this manner, both flow tubes will vibrate in the same manner as do the tines of a tuning fork. Drive mechanism 180 supplies the sinusoidal oscillatory driving forces to tubes 130 and 130'. This drive mechanism can consist of any one of many well known arrangements, such as a magnet and a coil through which an alternating current is passed, for sinusoidally vibrating both flow tubes at a common frequency. A suitable oscillatory drive signal, as discussed in detail below in conjunction with FIG. 4, is applied by meter electronics 20, via lead 185, to drive mechanism 180.

As long as fluid flows through both tubes while these tubes are sinusoidally driven in opposite directions, Coriolis forces will be generated along adjacent side legs of each of flow tubes 130 and 130' but in opposite directions, i.e. the Coriolis force generated in side leg 131 will oppose that generated in side leg 131'. This phenomenon occurs because although the fluid flows through the flow tubes in essentially the same parallel direction, the angular velocity vectors for the oscillating flow tubes are situated in opposite though essentially parallel directions. Accordingly, during one-half of the oscillation cycle of both flow tubes, side legs 131 and 131', will be twisted closer together than the minimum distance occurring between these legs produced by just the oscillatory movement of the tubes generated by drive mechanism 180. During the next half-cycle, the generated Coriolis forces will twist the side legs 131 and 131', further apart than the maximum distance occurring between these legs produced by just the oscillatory movement of the tubes generated by drive mechanism 180.

During oscillation of the flow tubes, the adjacent side legs, which are forced closer together than their counterpart side legs, will reach the end point of their travel, where their velocity crosses zero, before their counterparts do. The time interval (also referred to as "time difference" or "$\Delta t$") which elapses from the instant one pair of adjacent side legs, e.g. those forced closer together, reaches their end point of travel to the instant the counterpart pair of side legs, i.e. those forced further apart, reach their respective end point is proportional to the total mass flow rate of the fluid flowing through meter assembly 10. In accordance with the invention, this time interval is accurately measured, as discussed in detail below, by measuring the phase difference between left and right velocity sensor signals that occurs at the fundamental frequency at which the flow tubes are being driven.

To provide the velocity waveform of each flow tube, coils $160_L$ and $160_R$ are each respectively attached to either one of tubes 130 and 130', near its free ends, e.g. coil $160_L$ is attached to tube 130 while coil $160_R$ is attached to tube 130', and permanent magnets $170_L$ and $170_R$ are also attached to the other ones of the tubes near their free ends, e.g. magnet $170_L$ is attached to tube 130' while magnet $170_R$ is attached to tube 130. Magnets $170_L$ and $170_R$ are disposed so as to have coils $160_L$ and $160_R$ located in the volume of space that surrounds the respective permanent magnets and in which the magnetic flux fields are essentially uniform. With this configuration, the electrical signal outputs generated by coils $160_L$ and $160_R$ provide a velocity profile of the complete travel of each corresponding tube and can be processed, as set forth in detail later, to accurately determine, through phase difference measurements taken only at the fundamental frequency at which the flow tubes vibrate, the time interval occurring between the motion of these tubes and, in turn, the mass flow rate of the fluid passing through the meter. Specifically, coils $160_L$ and $160_R$ produce the left and right velocity signals that appear on leads $165_L$ and $165_R$, respectively.

C. Meter Electronics 20

As noted, meter electronics 20 accepts as input the RTD signal appearing on lead 195 and left and right velocity signals appearing on leads $165_L$ and $165_R$, respectively. Meter electronics 20 also produces, as noted, the sinusoidal drive signal appearing on lead 185. Leads $165_L$, $165_R$, 185 and 195 are collectively referred to as leads 100. The meter electronics, as explained below, processes both the left and right velocity signal and the RTD temperature to determine the mass flow rate and totalized mass flow of the fluid passing through meter assembly 10. This mass flow rate is provided by meter electronics 20 on associated lines within leads 26 in analog form, either user selectable 0–20 mA/4–20 mA or user selectable 0–5/1–5 volt signals, and in serial form over leads 25. Mass flow rate information is provided in frequency form (typically with a maximum range of 0–10 kHz), over an appropriate line within leads 26 for connection to downstream equipment. In addition, scaled pulses (typically with a maximum range of 0–10 Hz) are also provided on another line within leads 26 for connection to a remote mechanical totalizer. Each scaled pulse, as explained in detail later, represents that a known totalized quantity of fluid has passed through meter assembly 10. Totalized flow information (inventory and resettable totals) are also provided in serial form over leads 25. In addition, normally open and normally closed contacts are separately provided over leads 27 for connection to appropriate alarm circuits for indicating the presence and/or absence of a fault condition. Furthermore, user defined values of a number of constants are provided through voltage levels appearing on leads 28 that are dictated by the settings of various input switches.

Figure 2:
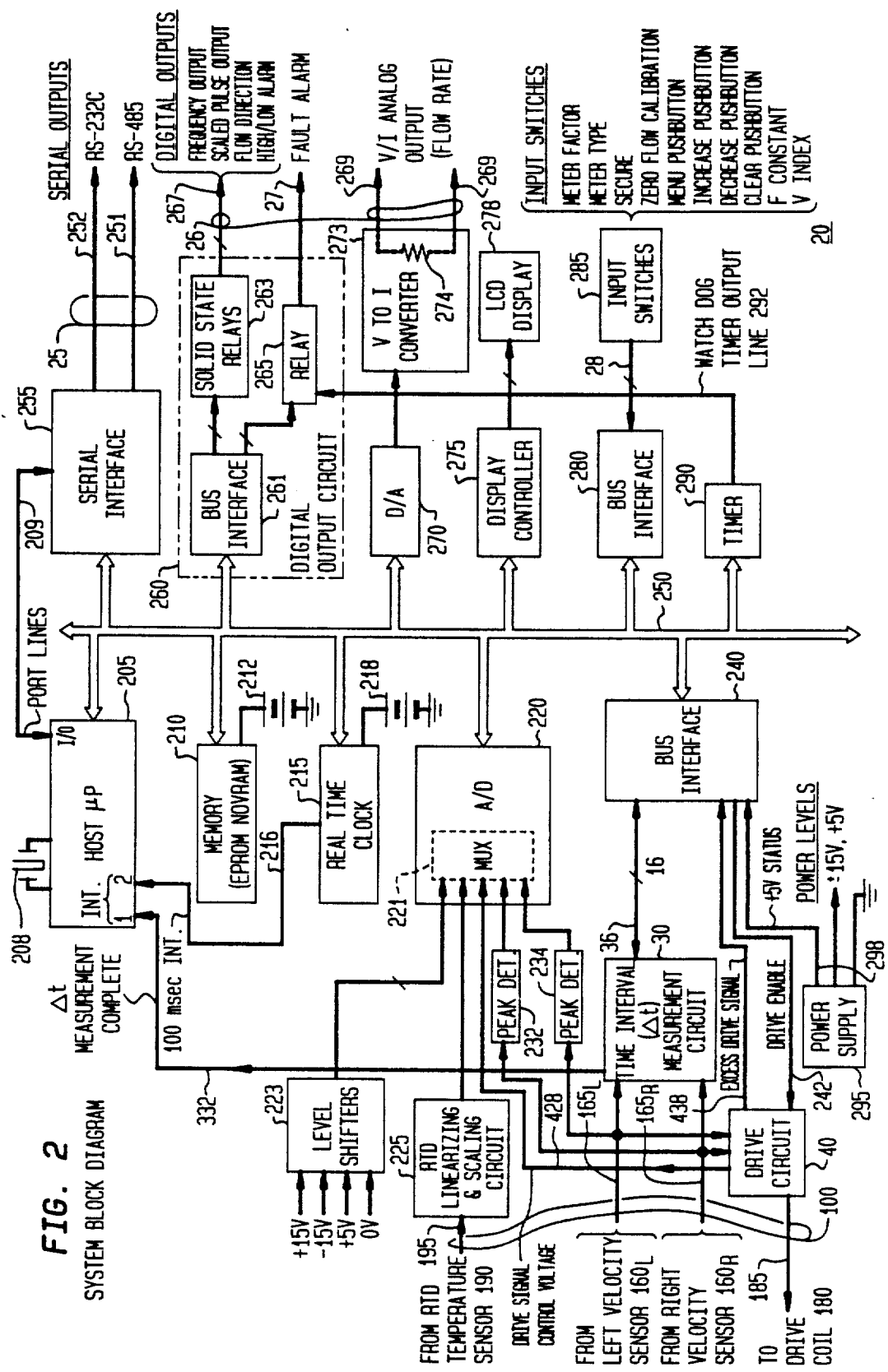
FIG. 2 depicts a block diagram of Meter Electronics 20, shown in FIG. 1.

A block diagram of meter electronics 20 is depicted in FIG. 2. The electronics employs two microprocessor based systems. One such system (the "host" system), which is an 8-bit system, illustratively contains common bi-directional address and data busses 250 that link 8-bit microprocessor 205, memory 210, real time clock 215, analog-to-digital (A/D) converter 220, bus interface 240, serial interface 255, digital output (D/O) circuit 260, digital-to-analog converter 270, display controller 275, bus interface 280 and timer 290. Appropriate clock signals to drive the host system are generated by microprocessor 205 using crystal 208.

Memory 210 contains non-volatile random access memory (NOVRAM) for temporary data storage and erasable programmable read only memory (EPROM) for program storage. The NOVRAM consists of conventional random access memory (e.g. CMOS random access memory) that is powered through battery 212 in the event of a power outage. Consequently, the NOV is operated in the same manner as conventional random access memory but advantageously retains its contents in the event system power fails. New values, both constants and data, are routinely written into the NOVRAM during program execution.

Real time clock 215 provides time/date information and 100 msec timing pulses. As explained in detail below, the time/date information is read by microprocessor 205 in logging fault data. Specifically, the real time clock applies the time/date information to the data busses that form part of busses 250 upon request of the microprocessor and whenever it detects a fault condition. The 100 msec timing pulses are applied, via line 216, to an interrupt input of microprocessor 205. At the occurrence of each 100 msec timing pulse, microprocessor 205 executes 100 msec interrupt routine 1900, as shown in FIGS. 19A-19D. In essence, this routine calculates the latest value of mass flow rate, updates the flow totals and output values, displays new results and performs various diagnostics. This routine will be fully explained later. In the event of a power failure, real time clock 215, as shown in FIG. 2, is powered by battery 218 and therefore advantageously continues to operate during this failure.

Analog input information is provided to the microprocessor through 10 bit A/D converter 220. This converter contains internal multiplexer 221 which is connected to various analog inputs: the outputs of level shifters 223, the output of RTD linearizing and scaling circuit 225, DRIVE SIGNAL CONTROL VOLTAGE produced by drive circuit 40 and appearing on lead 428, and outputs of peak detectors 232 and 234. Under control of microprocessor 205, A/D converter 220 selects one of these analog inputs, through multiplexer 221, samples the selected input, converts the value of that input to an equivalent digital form and thereafter applies the resulting digital value to the data bus that forms part of busses 250.

Level shifters 223, consisting of four individual level shifters, shift the level of each of the power supply voltages (e.g. $\pm 15V$, $+5V$ and $0V$) to an appropriate analog value located within the input range of A/D converter 220. These shifted values are then periodically tested by the microprocessor, as part of the diagnostics routinely executed by the inventive metering system. In the event any of these levels is outside of a pre-defined range, then microprocessor 205 signifies this as a fault condition.

Tube temperature information is provided to A/D 220 through RTD linearizing and scaling circuit 225. In particular, RTD 190 is connected, via lead 195, to an input of circuit 225. Inasmuch as the voltage appearing across the RTD varies non-linearly with temperature, circuit 225 linearizes the voltage, in a well known fashion, and thereafter scales it by a pre-determined constant to yield a resolution of 0.5 degree C/bit (after conversion by A/D 220) and referenced to 0 degrees C. The resulting scaled RTD voltage is applied to an input of A/D converter 220. This voltage is converted and read by the microprocessor every 100 msec during execution of 100 msec interrupt routine 1900, shown in FIGS. 19A-19D and discussed in detail later.

The DRIVE SIGNAL CONTROL VOLTAGE appearing on lead 428, as shown in FIG. 2, is produced, as an intermediate control signal, by drive circuit 40. The value of this signal is periodically digitized by A/D 220 and tested by microprocessor 205 to determine, for diagnostic purposes, whether the value remains within acceptable bounds. If the value exceeds these bounds, then a fault condition has occurred, specifically that the velocity sensors are producing an insufficiently high voltage—because of a failure in a power amplifier located within the drive circuit itself, a mechanical failure in the tubes themselves or a failure in either or both of the velocity sensors.

As noted, the voltages appearing at the outputs of peak detectors 232 and 234 are also applied as inputs to A/D converter 220. These detectors repetitively sample the sinusoidal voltages produced by the left and right velocity sensors, appearing over leads $165_L$ and $165_R$, and store the peak values thereof occurring during any cycle. As discussed below, the peak values produced by each detector are continuously digitized by the A/D converter and tested by the microprocessor, during execution of the system diagnostics, to determine whether the voltages produced by both sensors lie within pre-determined bounds. If the voltages lie outside these bounds, then a fault condition has occurred.

The outputs of left and right velocity sensors $160_L$ and $160_R$, are also applied, via leads $165_L$ and $165_R$, to time interval ($\Delta t$) measurement circuit 30. This circuit, as discussed in detail below in conjunction with FIG. 3 and with time interval measurement circuit main program 500 shown in FIG. 5, measures the phase difference occurring, at the fundamental flow tube driving frequency, between the waveforms produced by both velocity sensors. As noted, the mass flow rate is substantially proportional to this phase difference. As such, circuit 30 then calculates a corresponding time interval ($\Delta t$) measurement from the measured phase difference. The resulting time interval measurement is provided by circuit 30 as data signals over leads 36. Furthermore, at the conclusion of each time interval measurement, circuit 30 generates a pulse on $\Delta t$ measurement complete interrupt lead 332. This pulse causes microprocessor 205 to execute time interval measurement interrupt routine 2300 shown in detail in FIGS. 23A and 23B and discussed below. In essence, this routine reads a current value of the time interval ($\Delta t$) provided by circuit 30, subtracts a previously measured time difference associated with zero flow offset from the current time interval measurement and executes various diagnostics. The resulting time difference measurement is subsequently used by 100 msec interrupt routine 1900 (see FIGS. 19A-19D) to update the mass flow rate.

As shown in FIG. 2, drive circuit 40, as discussed in detail below in conjunction with FIG. 4, utilizes the left and right velocity sensor signals to produce a sinusoidal voltage that is applied, via lead 185, as the drive signal to drive coil 180. The drive circuit is essentially an integral controller that produces a drive signal that is in phase with the sum of the left and right velocity sensor waveforms. The drive circuit also produces an EXCESS DRIVE control signal appearing on lead 438 shown in FIG. 2. This signal is high whenever the value of the drive signal is substantially increased, such as, for example, during initial excitation of the flow tubes during power-up, and is continually monitored for diagnostic purposes by microprocessor 205. The microprocessor can also disable the drive signal applied to drive coil 180 by applying a low level to DRIVE ENABLE signal appearing on lead 242. This occurs both during system initialization and during a fault condition. Alternatively, a suitable drive voltage can be produced by time interval measurement circuit 30, as discussed in detail below.

Power supply 295 generates the necessary DC power levels used by the inventive system, namely $\pm 15$ and $+5$ volts. In addition, the power supply provides a $+5V$ STATUS signal over lead 298. This signal represents the status of the $+5$ volt supply and will fall from a high to a low level approximately 4-5 msec before the $+5$ volt supply level collapses. This signal is continuously tested by microprocessor 205 as part of the system diagnostics.

Bus interface 240 provides a bi-directional interface, via busses 250, between microprocessor 205 and the 16-bit data signals appearing over leads 36, the EXCESS DRIVE signal appearing on lead 438, the DRIVE ENABLE signal appearing on lead 242 and the +5 VOLT STATUS signal appearing on lead 298. Through this interface, the microprocessor can selectively detect or establish the level of each of these signals, as appropriate.

Figure 24:
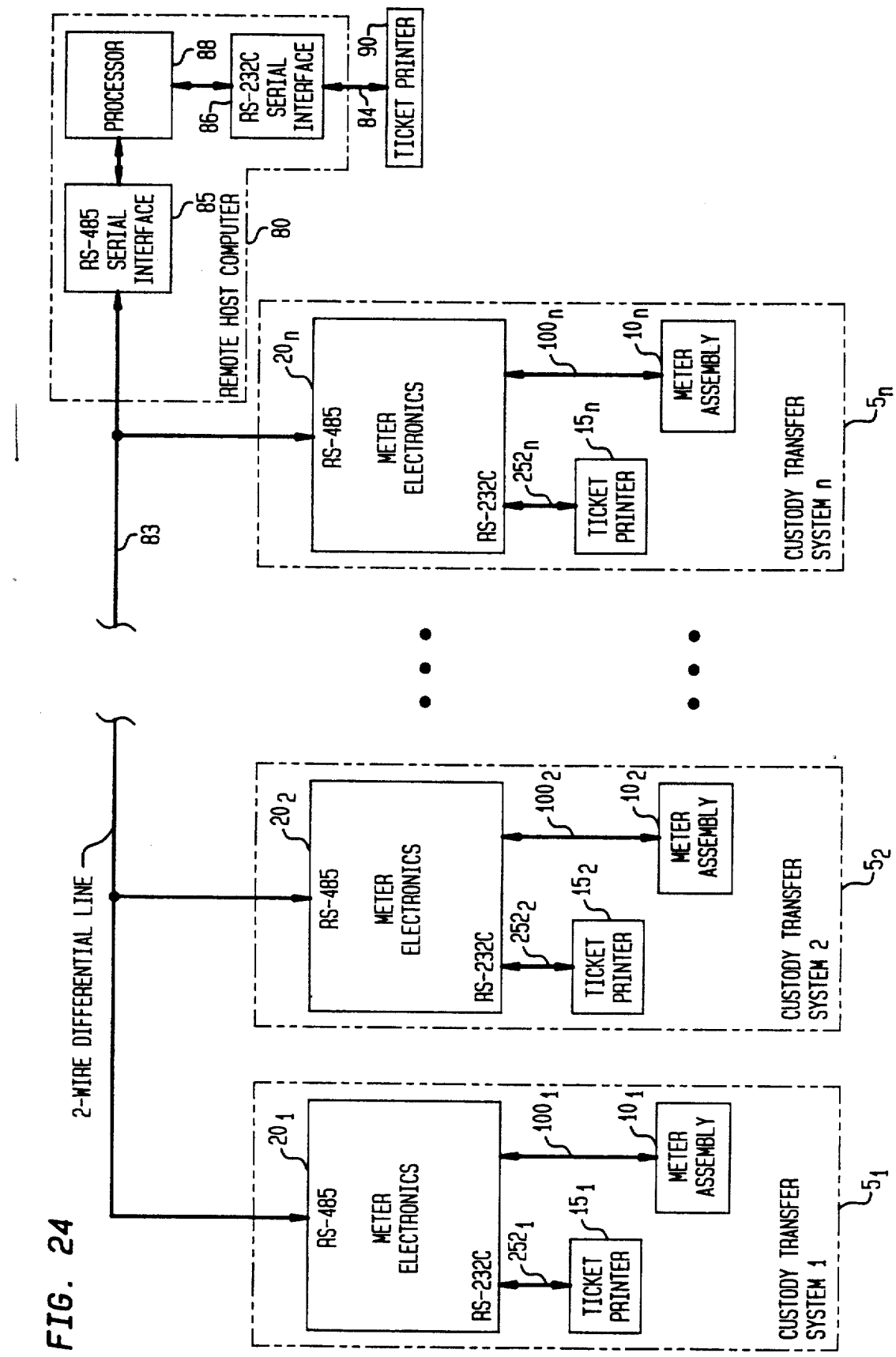
FIG. 24 shows a network of several inventive Coriolis custody transfer metering systems all interconnected to a remote computer.

Serial interface 255 provides serial communication, over leads 25, between the host microprocessor and an external device. The mode (RS-232C or RS-485), baud rate (150 baud–19.2 kBaud) and parity (even, odd or none) of the serial interface are all programmed through appropriate instructions received from the microprocessor over busses 250. Once programmed, the serial interface receives data from the microprocessor, over I/O port lines 209, for subsequent serial transmission. Two alternate modes of serial communication exist: RS-232C for communication to a single external device, such as a ticket printer, and RS-485 for inter-connection to a network of metering systems and a host computer. As shown in FIG. 24 and discussed in detail below, a ticket printer is connected to leads 252 for RS-232C communication; while a network connection is made to leads 251 for RS-485 communication. The network may advantageously contain a number of separate metering systems all interconnected, through appropriate RS-485 ports, over a common differential line (such as a twisted pair) to a host computer that can obtain data from each metering system while simultaneously controlling the operation of that system.

Digital output circuit 260, as shown in FIG. 2, provides various digital output signals. Specifically, the frequency output, the scaled pulse output, flow direction and high/low alarms are provided, over leads 267, through solid state relays 263. Normally open and normally closed mechanical fault alarm contacts are provided by mechanical relay 265 over leads 27. The normally closed contacts are used to indicate a fault condition. The solid state relays and the mechanical relay are selectively energized by host microprocessor 205 through bus interface 261. In addition, relay 265 can also be disabled, to indicate a fault condition, by an appropriate signal appearing over lead 292 from (watch-dog) timer 290. This signal occurs in the event this timer reaches the end of its timing interval (i.e. it times out).

Analog V/I output signals are provided by D/A converter 270 and voltage-to-current converter 273. Incoming digital information is provided to the D/A converter through busses 250 and is thereafter converted into an equivalent analog form. The resulting voltage is converted into a current signal by converter 273. Host microprocessor 205 can be instructed by the user to set the maximum range of this current signal to either 0-20 mA or 4-20 mA. An appropriate resistor, such as resistor 274, can be inserted between the outputs of this converter, which are preferably isolated and appear on leads 269, in order to change the output current signal into a voltage signal having a corresponding range of 0-5 volts or 1-5 volts.

Figure 15B:
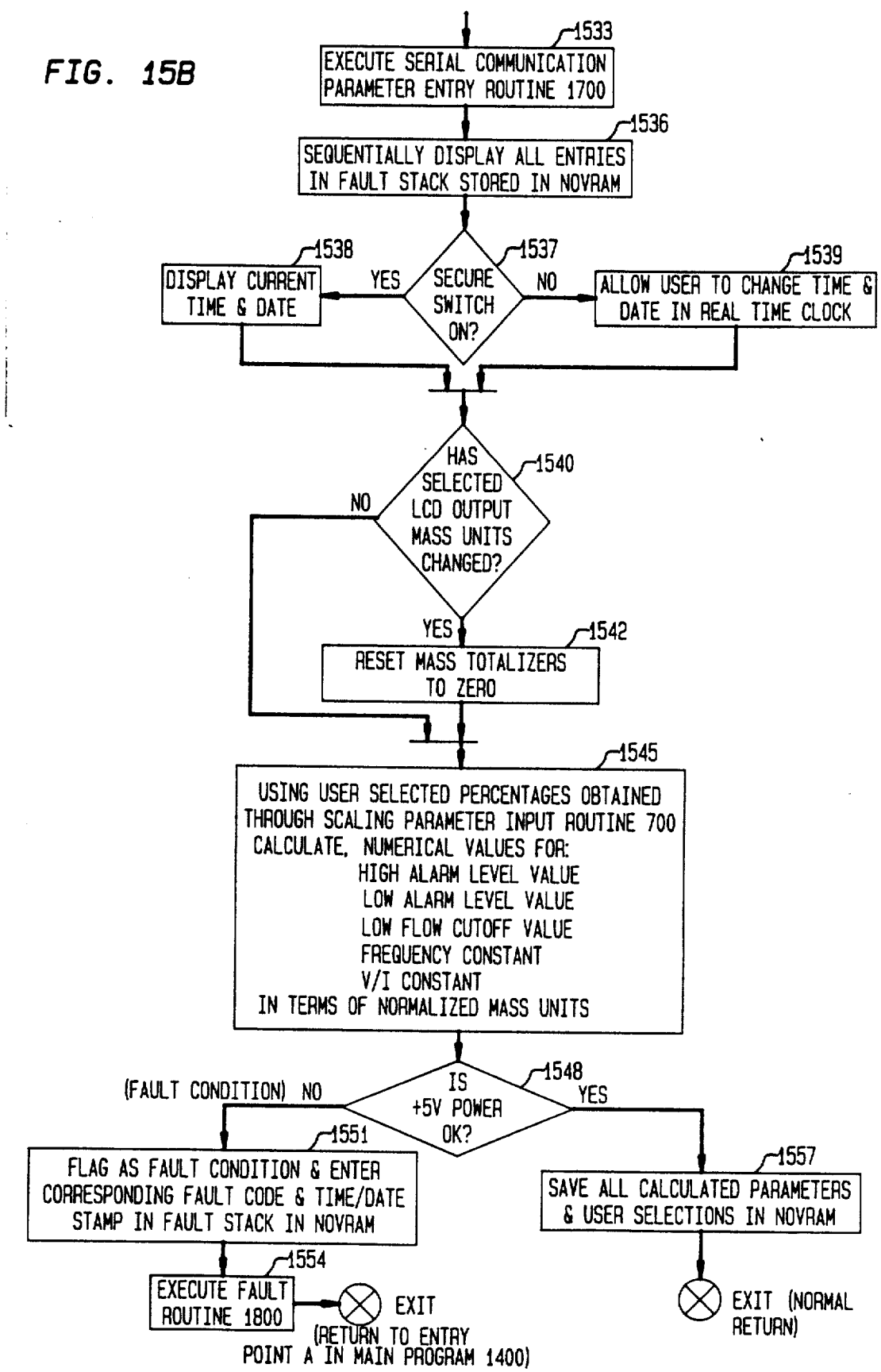
FIG. 15 shows the proper alignment of the drawing sheets for FIGS. 15A and 15B;, FIGS. 15A and 15B collectively depict a flowchart of Menu Routine 1500 that is executed as part of Host Microprocessor Main Program 1400 shown in FIGS. 14A-14D.

Display 278, typically a well known liquid crystal display (LCD), displays various output information such as mass flow rate and totalized mass flow. The displayed mass flow rate and totalized mass flow information is updated every 100 milliseconds by host microprocessor 205. At these times, new data is placed on the data bus, that forms part of busses 250, by the host microprocessor and is thereafter loaded into display controller 275 which, in turn, controls the operation of display 278. The user can select other information to be displayed (such as illustratively high/low alarm limits, current output units, low flow cutoff value and input filter time constant) through operation of menu routine 1500, as shown in FIGS. 15A and 15B and discussed in detail below.

The user enters information into the metering system through various switches. The state of each of these switches is read by host microprocessor 205 through bus interface 280. In particular, certain of these switches are advantageously located on a front panel of the metering system and include: a menu pushbutton, increase/decrease pushbuttons and a clear pushbutton. The menu pushbutton allows the user to step the host system through a pre-defined menu to display various operating parameters and totalized values. The clear pushbutton, when depressed, allows the user to clear a resettable totalized mass flow reading to zero. The remaining switches which include meter factor, meter type, zero flow calibration invoke switch and secure switch (all discussed in detail below) are all located within the enclosure that contains meter electronics 20. To deter tampering, this enclosure is one that preferably provides access only through a single cover which can be sealed closed with a governmental seal. As such, the seal must be broken to gain entry to the internal switches. The secure switch, when placed in an appropriate position (i.e. the secure position) and read by the host microprocessor, inhibits the user from changing any of the system parameters. In this case, the host system will only display the values of these parameters but will not permit the user to change any of them. By placing the secure switch within the enclosure, the system becomes substantially tamper-proof. The increase/decrease switches are used to increase or decrease the values of any system parameter whenever the secure switch is not placed in the secure position.

Timer 290 functions as a watch-dog timer. In particular, this timer is set to provide a pulse after 100 msec elapses but, in normal operation, is reset approximately every 20 msec by execution of time interval measurement interrupt routine 2300. In the event this timer reaches the end of its timing cycle before being reset, then a fault condition has occurred; namely, that host microprocessor 205 has ceased functioning. In this case, the timer provides a signal over leads 292 which de-energizes fault relay 265 to appropriately indicate this fault condition.

D. Time Interval ($\Delta t$) Measurement Circuit 30

Figure 3:
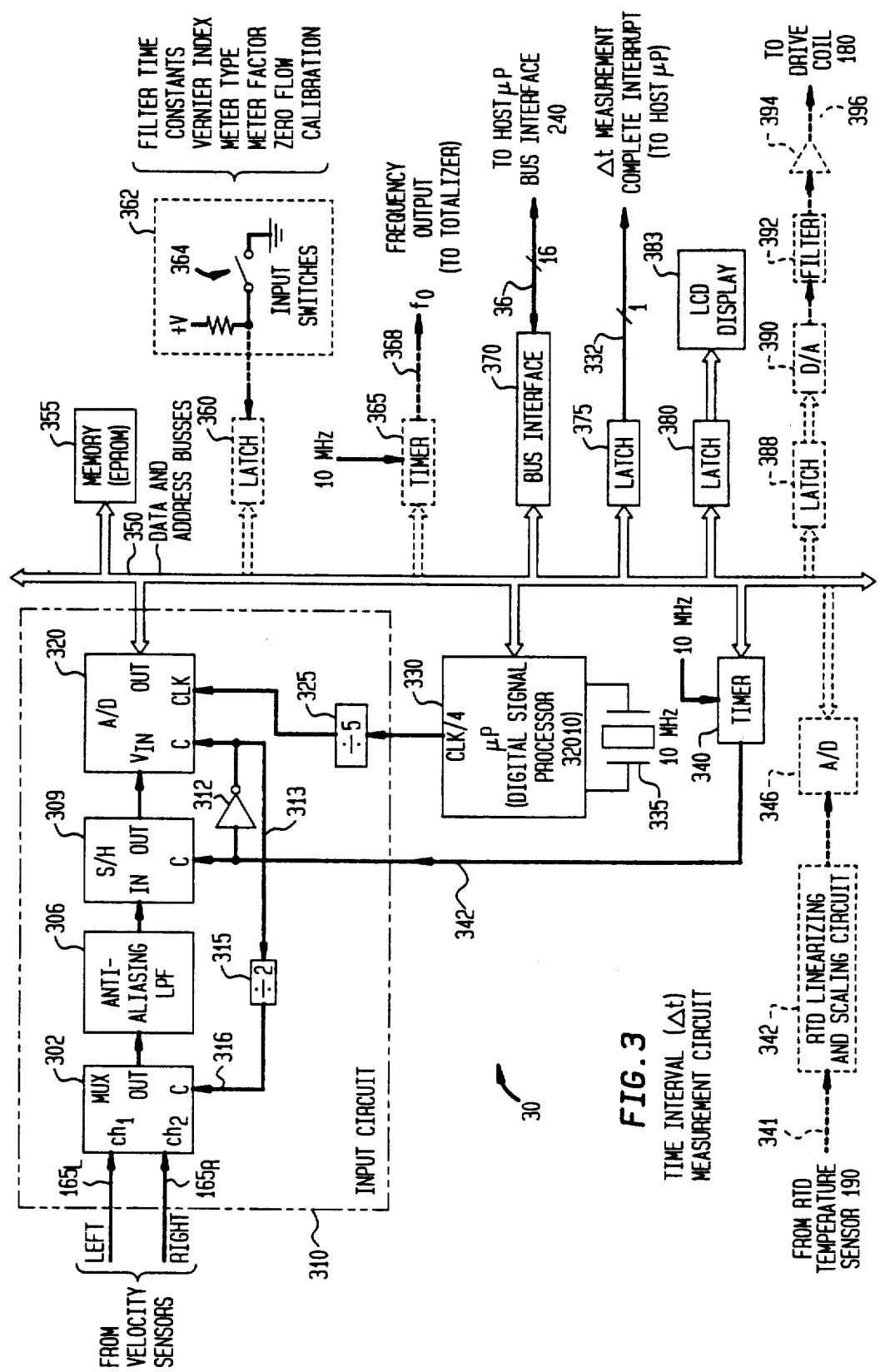
FIG. 3 depicts a block diagram of Time Interval (Δt) Measurement Circuit 30, shown in FIG. 2.

A block diagram of time interval measurement circuit 30 is depicted in FIG. 3. This circuit measures the phase difference occurring, at the fundamental flow tube driving frequency, between the waveforms produced by left and right velocity sensors $160_L$ and $160_R$ and appearing on leads $165_L$ and $165_R$, respectively. As noted, the phase difference which occurs at this frequency is directly proportional to the mass flow rate of the fluid that flows through meter assembly 10 (see FIG. 1). Time interval measurement circuit 30 very accurately ascertains the value of this phase difference by transforming both velocity waveforms into the frequency domain (using the discrete fourier transform components) and then evaluating the phase difference, between both waveforms, that occurs only at the fundamental flow tube driving frequency. This circuit then multiplies the phase difference value by a suitable scaling factor to produce a measured time interval ($\Delta t$) value. This value equals the time interval occurring between the motion of both flow tubes in meter assembly 10.

In essence, as shown in FIG. 3, time interval measurement circuit 30 consists of a specialized 16-bit microprocessor system. This system, which provides digital signal processing of both velocity sensor waveforms, forms the second microprocessor system employed within meter electronics 20 (see FIG. 2). This system, as shown in FIG. 3, illustratively contains liquid crystal display (LCD) 383, and common bi-directional data and address busses 350 that link input circuit 310, microprocessor (digital signal processor) 330, timer 340, memory 355, bus interface 370, and latches 375 and 380.

Microprocessor 330 is preferably a specialized 16-bit microprocessor, such as the TMS32010 digital signal processor manufactured by Texas Instruments, that has an architecture designed to support high speed numeric applications such as digital signal processing. Specifically, the architecture supports high speed multiplication of a value with another value, the latter value being stored in a table, followed by accumulation of the result. This microprocessor operates at a basic clock rate of 10 MHz as determined by crystal 335.

Memory 355 contains non-volatile read only memory which stores the specific program which is executed by microprocessor 330, as discussed later in conjunction with time interval measurement circuit main program 500 (see FIG. 5) and the various routines called thereby (see FIGS. 6–13) and stored constants associated therewith. These constants include a "128" point look-up table of sine values. The look-up table could have more than "128" separate points, e.g. "256" points or more, to provide additional resolution, if desired. Memory 355, as shown in FIG. 3, is preferably implemented using electrically programmable read only memory (EPROM) circuits.

Timer 340, which is programmed by microprocessor 330, divides a stream of 10 MHz clock pulses by a value determined by microprocessor 330 into a stream of timing pulses. These timing pulses occur at a rate that, within a small resolution, exactly equals "128" times the fundamental flow tube driving frequency. If an increased resolution is desired, then the value programmed into timer 340 would be suitably decreased to provide these timing pulses at an appropriately increased rate. For purposes of simplifying the ensuing discussion, a resolution of "128" points will be used. As will be explained in detail later in conjunction with Real-Imag Component Routine 900 (see FIGS. 9A–9C), each velocity sensor signal is sampled exactly "64" times per tube cycle. Sampling in this fashion ensures sufficient accuracy while substantially eliminating any undesirable leakage effects. Specifically, the Discrete Fourier Transform (DFT) assumes that an input waveform that is to be transformed is periodic. In the event one cycle of the input waveform extends beyond "64" sample periods, then a high frequency tail would result in the sampled waveform causing the results of the DFT to contain undesirable and erroneous high frequency components (so-called "leakage" effects). Such leakage is advantageously minimized, in the manner described below, by ensuring that both velocity waveforms are each sampled exactly "64" times per tube cycle. Microprocessor 330, as described below, accurately determines the magnitude of the fundamental flow tube driving frequency and, in response thereto, sets the value programmed into timer 340 such that this timer produces a sequence of timing pulses over lead 342 that occurs at a rate substantially equal to exactly "128" times the flow tube driving frequency.

Input circuit 310 samples both the left and right velocity sensor signals appearing over leads $165_L$ and $165_R$, respectively, on an interleaved basis to produce "128" samples per tube cycle: "64" samples for right velocity sensor $160_R$ interleaved between "64" samples for the left velocity sensor $160_L$, respectively (see FIG. 1). Specifically, both velocity signals can not be sampled at the same time. Consequently, the two velocity sensor signals are continuously sampled on an alternating basis. As a result, the samples for one sensor, illustratively the left sensor, will always lead the corresponding samples for the right sensor by a phase shift of 2P/128 radians. In calculating the fourier components, microprocessor 330, as shown in FIG. 2 and discussed in detail below, utilizes a "128" point look-up table of sine values. Now, to compensate for this phase shift between the sampled velocity signals, each of the "64" samples for every tube cycle produced by the left velocity sensor is multiplied by a corresponding sine term, while, as discussed below, each of the "64" samples produced by the right channel is multiplied by a corresponding sine term that includes a phase shift of 2P/128 radians.

As shown in FIG. 2, input circuit 310 contains multiplexer 302, anti-aliasing low pass filter 306, sample/hold (S/H) circuit 309, analog-to-digital (A/D) converter 320, inverter 312, divide-by-five counter 325 and divide-by-two counter 315. Both the left and right velocity sensor waveforms appearing over leads $165_L$ and $165_R$ are applied to corresponding inputs, Channel 1 ($ch_1$) and Channel 2 ($ch_2$), of multiplexer 302. In response to the level of a select signal appearing on lead 316 and applied to the control ("C") input to the multiplexer, multiplexer 302 routes one of the velocity sensor signals to its output terminal and, from there, to an input of anti-aliasing low pass filter 306. This filter has an appropriate high frequency rolloff beginning at approximately 21 kHz, to prevent aliasing from occurring in the samples of each velocity waveform. Alternatively, a separate low pass filter could be situated in front of multiplexer 302 for each of the two incoming velocity signals in lieu of using anti-aliasing filter 306. Advantageously, each of these filters could possess a much lower high frequency rolloff of 10 kHz than the 21 kHz provided by filter 306. Unfortunately, if two separate filters are used, adequate design precautions must be taken to ensure that the characteristics of both filters identically track each other with temperature variations.

The output of filter 306 is, in turn, applied to an input of sample/hold (S/H) circuit 309. This circuit, in response to an appropriate level appearing on lead 342, samples the analog value applied to its input and thereafter, in response to the opposite level appearing on lead 342, maintains its output at the sampled value. The output of sample/hold circuit 309 is applied as an input to A/D converter 320 which converts the analog value into a corresponding 14-bit value. The resulting digitized value is routed, via bus 350, to microprocessor 330 for use in computing the DFT of the velocity sensor waveforms and other digital signal processing related thereto. A/D converter 320 is clocked at a 500 kHz rate by a stream of clock pulses provided by divide-by-five counter 325. This counter is driven by a stream of 2.5 MHz clock pulses that appear on the clock/4 output of microprocessor 330.

In operation, multiplexer 302 selects one of its input channels depending upon the level of the control signal appearing on lead 316. The output of the multiplexer is suitably filtered by filter 306. Then, at the next edge, e.g. rising, of a clock pulse produced by timer 340 on lead 342, sample/hold circuit 309 samples the analog value produced by filter 306 and sets the output value produced by the sample/hold circuit to the sampled analog value. At the same time, this clock pulse is inverted by inverter 312 which applies a falling edge to the convert input of A/D converter 320. At the occurrence of the falling edge of the present clock pulse, sample/hold circuit 309 maintains its output at the previously sampled value. Simultaneously, inverter 312 produces a rising edge which when applied, via lead 313, to A/D converter 320 causes the converter to initiate an analog-to-digital conversion. Once the conversion is started, it proceeds at a rate determined by the clock pulses produced by counter 325. In addition, the rising edge of the clock pulse appearing on lead 313 also increments the contents of counter 315. This counter divides the pulse train appearing on lead 313 by two to produce a level change on lead 316 to cause the multiplexer 302 to switch between the input channels for every sample. As a result, input circuit 310 produces "64" samples for the left velocity sensor waveform and "64" samples for the right velocity sensor waveform with each successive sample for one velocity sensor waveform interleaved between two successive samples for the other velocity sensor waveform.

Bus interface 370 provides a parallel 16-bit data path over leads 36 for communication between microprocessor 330 in time interval measurement circuit 30 and, via bus interface 240 (see FIG. 2), host microprocessor 205 in meter electronics 20. Through this data path, the host microprocessor can download various values, such as the phase measurement filter time constant and vernier index, both of which are read from various input switches, to the time interval measurement circuit for subsequent use therein. In addition, through this data path, the time interval measurement circuit can supply the host microprocessor with measured Δt values and status (fault) information.

Latch 375 is a time single bit latch which is set at the conclusion of a time interval (Δt) measurement. The output of this latch, appearing on lead 332, provides the Δt measurement complete pulse which, as discussed above, is used as an interrupt to host microprocessor 205 (see FIG. 2).

Latch 380, as shown in FIG. 3, is used to store information, such as measured phase or time interval and/or status information, which, in turn, is applied to LCD display 383 for local display to a user.

Now, in the event a low cost, stand-alone, highly accurate Coriolis mass flow rate meter is desired, such a meter can be implemented by merely using meter assembly 10 in conjunction with the electronic circuitry that forms time interval measurement circuit 30. The additional circuitry that would need to be added to circuit 30, as that circuit has been described thusfar, to provide a stand-alone meter is shown by dotted lines. No other portion of meter electronics 20, other than a suitable power supply, would need to be used.

First, latch 360 and timer 365 would be added to the circuit 30. This latch would be used by microprocessor 330 to read various user parameters from a set of input switches (typically thumbwheels) 362, of which one such illustrative contact 364 is shown. These parameters would include filter time constants, vernier index, meter type, meter factor and zero flow calibration initiation. Timer 365 is used to provide a frequency output $f_O$, for use by downstream equipment. This timer is operated by a 10 MHz clock but is loaded with an appropriately valued divisor by microprocessor 330 to provide an output with a frequency range of 0–10 kHz that is proportional to the measured mass flow rate. Also, in the meter, the measured mass flow rate and totalized mass flow can be selectively displayed on LCD display 383 in much the same fashion as these parameters can be displayed on LCD display 278 (see FIG. 2). In implementing this low cost Coriolis mass flow rate meter, appropriate portions of the software used in the host microprocessor software, as discussed below, to calculate mass flow rate, totalize mass flow, and display various user specified quantities would need to be incorporated into the software, discussed below, employed in time interval measurement circuit 30. Inasmuch as the necessary modifications that would need to be made to the time interval measurement software to provide stand alone mass flow rate measurement and mass flow totalization would be readily apparent to those skilled in the art, these modifications are not discussed any further.

Second, a digitally based drive circuit, shown in dotted lines and formed of latch 388, digital-to-analog (D/A) converter 390, filter 392 and amplifier 394, could be used in lieu of analog drive circuit 40 shown in FIG. 4. As discussed in detail below, microprocessor 330, as shown in FIG. 3, calculates the magnitude of a succession of frequency components, using the DFT—specifically using equation 4 above, to locate the frequency at which the flow tubes resonantly vibrate, i.e. that frequency component at which the magnitude of the DFT reaches a peak value. Therefore, once this frequency component is known, microprocessor 330 can readily generate a quantized sinusoidal waveform at exactly this frequency. Specifically, once the frequency component is found, microprocessor 330 could easily set the period at which a sine look up table (not shown and which can either be situated internal to or more likely external to the microprocessor) is successively and consecutively indexed, through well known circuitry not shown, to produce a continuous series of multi-bit digital values that represent this waveform. Each of these values would be applied to latch 388 which, in turn, would apply the value to D/A converter 390. This converter would produce an equivalent analog voltage. This analog voltage would then be applied to low pass filter 392 to remove unwanted high frequency noise. The resulting filtered value would then be amplified by amplifier 394 to an appropriate drive level and thereafter routed, via lead 396, to drive coil 180. In the event this digitally based drive circuit were to be used in lieu of drive circuit 40 but in conjunction with the host microprocessor system, then the drive enable signal appearing on lead 242 could be used to open and close a well-known switch (typically solid-state and similar to switch 445 shown in FIG. 4 but not shown in FIG. 3 to simplify the latter figure) situated in series between the output of filter 392 and amplifier 394, as shown in FIG.

3, to either connect or disconnect the filtered drive signal from the amplifier. Through use of such a digital drive circuit, both flow tubes can be driven at a frequency that very accurately matches their resonant frequency. Advantageously, such a drive circuit would be less complex and less expensive than would analog drive circuit 40.

Lastly, for a stand-alone Coriolis meter, tube temperature information would need to be provided to microprocessor 330. This can readily be accomplished, as shown in dotted lines, by routing the output of RTD 190, via lead 341, to RTD linearizing and scaling circuit 342. This circuit would be identical to and perform the same function as circuit 225 (see FIG. 2) in order to provide a resolution of 0.5 degree C./bit (after conversion by A/D converter 346) and referenced to 0 degrees C. The resulting scaled RTD voltage would be applied, as shown in FIG. 3, to an input of A/D converter 346 and, from there, to busses 350, upon request of microprocessor 330.

E. Drive Circuit 40

FIG. 4 depicts a block diagram of drive circuit 40. As noted, this circuit produces a sinusoidal voltage which is applied to drive coil 180, via lead 185, to keep both flow tubes oscillating at their natural frequency. In essence, as discussed, the drive circuit is essentially an integral controller that produces a drive signal that is in phase with the sum of the left and right velocity sensor waveforms. By operating linearly and producing a sinusoidal drive voltage, drive circuit 40 drives the flow tubes at their natural resonant frequency, introducing minimal harmonic modes.

Specifically, both velocity signals are combined through summer 405 with the resultant sum being applied to rectifier averager 410 which consists of full wave rectifier 412 followed by low pass filter 414. The output signal generated by the rectifier averager tracks the average amplitude in the combined rectified velocity signals produced by summer 405. This output signal is then subtracted from a reference signal, $V_{ref}$, by summer 420. The resulting difference is then integrated by integrator 425. This integrator includes appropriate well known compensation circuitry to prevent drive circuit 40 from oscillating. The integrated difference signal is fed to one input of multiplier 440 which multiplies the integrated signal by the amplitude of the combined velocity signals appearing on lead 408 and produced by summer 405. In addition, the output of the integrator is the DRIVE SIGNAL CONTROL VOLTAGE appearing on lead 428. This voltage, as noted previously, is continually tested by host microprocessor 205 (see FIG. 2) during execution of the system diagnostics. Through the use of integral control, and particularly here where the output of the integrator is multiplied by the combined velocity signals, the resulting error signal, which, as shown in FIG. 4, is applied through switch 445 to an input of power amplifier 450, is quite sensitive to any differences between the peak value of the combined velocity signals and the reference voltage. In operation, the output of the power amplifier will appropriately change to maintain the peak amplitude of the combined velocity signals at the reference level. In the event the combined signals produced by both velocity sensors are too low, indicating that the flow tubes are not vibrating over a sufficiently large distance, then the power amplifier will increase its peak output to correspondingly increase the peak vibratory amplitude of the flow tubes. Likewise, if the peak vibratory amplitude is too large, then the output of power amplifier 450 will be correspondingly reduced.

Switch 445 is controlled through the DRIVE ENABLE signal applied to lead 242. This signal is applied through latch 460 to the control input of switch 445. Whenever this signal is high, the output of latch 460 is high and switch 445 is closed thereby feeding the error signal produced by multiplier 440 to an input of power amplifier 450. To disable the drive circuit, a low level is applied to lead 242 which causes the latch to produce a low level output that, in turn, causes switch 445 to apply ground potential to the input of power amplifier 450. As a result, power amplifier 450 reduces its output signal to zero which, in turn, allows the flow tubes to cease vibrating.

Whenever the flow tubes are to be initially placed into vibratory motion from a stationary position, the flow tubes would generally require approximately 10 seconds for the amplitude of the vibratory motion to reach and stabilize at a desired peak value. To shorten this time period, the output of integrator 425 is applied to one input of comparator 430. A pre-defined threshold voltage is applied to the other input of the comparator. Whenever the output of the integrator exceeds the threshold voltage, the output of the comparator assumes a high level which, in turn, is applied, over lead 433, to the variable gain input of power amplifier 450. This increases the gain of the power amplifier by approximately tenfold. As such, the flow tubes are driven with a much higher amplitude drive signal than under steady state operation, which, as such, shortens the period for the tubes to stabilize at a desired peak vibratory motion from approximately 10 seconds to between 2-3 seconds. To indicate that a high amplitude drive condition is occurring, the output of comparator 430 is also fed to buffer 435 which produces the digital EXCESS DRIVE signal on lead 438. The status of this signal is continually read, as described in detail below, by host microprocessor 205 (see FIG. 2) as part of the system diagnostics.

III. Software Description

The software for the inventive metering system is essentially broken into two separate independent portions: the software executed by the digital signal processor (microprocessor) located within time interval measurement circuit 30 (see FIG. 3), and the software executed by host microprocessor 205 situated within meter electronics 20 (see FIG. 2). The first portion (see FIG. 5) includes time interval measurement circuit main program 500 and the various routines it calls (see FIGS. 6-13); while the second portion includes host microprocessor main program 1400 (see FIGS. 14A-14D) and the various routines it calls (see FIGS. 15-23).

The discussion will now proceed with a description of the software executed by time interval measurement circuit 30 followed by a description of the software executed by host microprocessor 205.

A. Time Interval Measurement Circuit Software

1. Time Interval Measurement Circuit Main Program 500

A flowchart of Time Interval Measurement Circuit Main Program 500 is shown in FIG. 5.

Time Interval Measurement Circuit Main Program 500, when executed, first initializes the operation of time interval measurement circuit 30 (see FIG. 3). Part of this initialization involves determining the natural frequency at which the flow tubes are vibrating and then setting the sampling frequency to substantially equal, within a small resolution, to exactly "128" times this natural frequency. Now, once the initialization has been completed, main program 500 then determines the phase difference, $\Delta\Phi$, that exists between the left and right velocity signals. Thereafter, with the value of the phase difference known, the duration of the time interval, $\Delta t$, as discussed above which occurs between the motion of both flow tubes, is calculated and then supplied to the host microprocessor system for subsequent use in determining mass flow rate and totalized mass flow. Thereafter, main program 500 determines whether the fundamental frequency at which the flow tubes are vibrating has changed due to, for example, changes in fluid density and then readjusts the sampling frequency accordingly.

Specifically, as shown in FIG. 5, execution enters time interval measurement circuit main program 500 through one of two paths: either by virtue of a power on reset or by virtue of a fault condition which, as discussed below, routes execution to entry point A. In either case, execution proceeds to block 510 which invokes initialization routine 600 (see FIGS. 6A and 6B). As discussed below, routine 600 essentially executes various diagnostics, determines the natural frequency at which the flow tubes are initially vibrating and then sets the sampling frequency to, within a small resolution, exactly "128" times this natural frequency. Once initialization has been completed, execution then proceeds, as shown in FIG. 5, to block 520 which invokes phase angle calculation routine 1200. This routine, when executed and as discussed below in conjunction with FIG. 12, determines the phase difference occurring between the left and right velocity sensor waveforms and then appropriately filters the result using a two pole digital filter to produce the filtered phase difference measurement value, PHASE$_2$. Next, as shown in FIG. 5, execution proceeds to block 530 which merely multiplies the filtered phase difference measurement value, PHASE$_2$, by an appropriate pre-determined scale factor, K, to produce a value of the time interval, $\Delta t$. Thereafter, execution proceeds to block 540. This block, when executed, loads the value for $\Delta t$ into bus interface 370 (see FIG. 3) for eventual downloading into host microprocessor 205 (see FIG. 2). Thereafter, this block causes microprocessor 330 (see FIG. 3) to apply a pulse, via latch 375, to lead 332, to serve as the $\Delta t$ measurement complete signal. This signal interrupts the operation of host microprocessor 205 and causes it, as discussed below, to read the current value of $\Delta t$, via bus interface 240 (see FIG. 2). Execution then passes, as shown in FIG. 5, to block 550 which invokes Frequency Tracking Routine 1300 which, as discussed below in conjunction with FIG. 13, determines whether the fundamental frequency at which the flow tubes are vibrating has changed due to, for example, changes in density of the fluid passing through meter assembly 10 (see FIG. 1), and the magnitude of any such change (i.e. so-called "frequency error"). Once this has occurred, block 550 re-computes the duration of the sampling interval, T$_s$, to account for any such frequency errors. Specifically, a new value of the divisor for timer 340 (see FIG. 3) is determined and then loaded into the timer such that the sampling frequency is set to substantially equal, within a small resolution, exactly "128" times the fundamental frequency at which the flow tubes are actually vibrating. Once block 550 has finished executing, then execution loops back, as shown in FIG. 5, via path 555, to block 520 to undertake the next successive phase difference measurement.

Now, to implement a low cost Coriolis mass flow rate meter, additional steps would need to be added to block 530. Specifically, once the value of time interval $\Delta t$ has been determined, the values of the meter factor and meter size would need to be read from input switches 362, via latch 360 (see FIG. 3). Thereafter, the temperature of the flow tubes as measured by the RTD would need to be obtained. Once these operations have occurred, the rate factor and the mass flow rate are determined in the same manner as that employed in rate factor calculation routine 2000, as discussed below in conjunction with FIG. 20, and in 100 msec interrupt routine 1900, as discussed below in conjunction with FIGS. 19A-19D. Thereafter, given the measured mass flow rate, microprocessor 330 (see FIG. 3) sets the value of the divisor stored within timer 365 to an appropriate value in order to adjust the mass flow frequency output to an appropriate value, within a range of 0-10 kHz, that is proportional to the measured mass flow rate.

2. Initialization Routine 600

A flowchart of Initialization Routine 600 is shown in FIG. 6. Essentially, this routine executes various diagnostics, determines the natural frequency at which the flow tubes are initially vibrating and then sets the sampling frequency, within a small resolution, to exactly "128" times this natural frequency.

Upon entry into this routine, execution proceeds to block 605 which performs various power on diagnostics. These diagnostics include an EPROM check (typically a read checksum test) and a microprocessor RAM test. If any of these diagnostics fail, then execution is routed, via the "NO" path emanating from decision block 610 to execution block 615. This latter block, when executed, supplies an appropriate fault message to the host microprocessor. Specifically, this block loads a fault message, which contains a specific code assigned to the diagnostic that failed, into bus interface 370 (see FIG. 3). Thereafter, block 615 causes microprocessor 330 to apply a pulse, via latch 375, onto $\Delta t$ measurement complete lead 332 in order to interrupt the execution of the host microprocessor. The host microprocessor then reads the fault message, via bus interface 370, and executes fault routine 1800. Fault routine 1800, as discussed in detail below in conjunction with FIG. 18, stores the specific fault code along with the date and time this fault condition occurred in a specific fault stack in NOVRAM located within memory 210 (see FIG. 2) for later retrieval by a user and then waits for a user to provide an instruction, such as depressing a clear pushbutton, to re-initialize (i.e. "clear") the system. Once block 615 has executed, then, as shown in FIG. 6, execution is routed back to entry point A in time interval measurement circuit main program 500 to re-initialize the time interval measurement circuit.

Alternatively, if all these diagnostics have successively executed, then decision block 610, as shown in FIGS. 6A and 6B, routes execution, via its "YES" path to block 620. This block, when executed, reads the values of the filter time constant (F CONSTANT) and the vernier index (V INDEX) that have been most recently downloaded into the time interval measurement circuit by host microprocessor 205 during execution of Scaling Parameter Input Routine 1600, which will be discussed below in conjunction with FIGS. 16A-16B.

Once these values have been downloaded, digital signal processing of both velocity sensor waveforms can begin in accordance with the teachings of the present invention.

Now, in order to accurately transform both velocity sensor waveforms using the discrete fourier transform, the sampling frequency must first be set. This occurs, as shown in FIG. 6, through execution of blocks 625, 630, 635, 640 and 645. Specifically, at the outset of system operation, the fundamental frequency at which both flow tubes vibrate is only known to exist within a certain range but the exact value within that range is not known. To save processing time, a power spectrum is computed at a fairly "coarse" resolution, using the discrete fourier transform, for one of the velocity waveforms, illustratively that produced by the left velocity sensor. This operation occurs within block 625 which invokes DFT Routine 700 which, when executed and as discussed in detail shortly in conjunction with FIGS. 7A-7B, samples one of the velocity waveforms at a fixed sampling rate and calculates the magnitude (squared—for reasons that will become clearer later) of all the frequency components, from $n = 1, \ldots, N-1$ (here $N-1$ equals the value "63") that comprise the discrete fourier transform of the waveform produced by the left velocity sensor. The coarse search is preferably undertaken with a sampling frequency of 640 Hz which, with "64" samples per measurement interval, provides 32 different frequencies at a resolution (1/NT) of approximately 5 Hz. Once the coarse power spectrum has been computed, execution proceeds, as shown in FIGS. 6A-6B, to block 630 which determines the maximum value within that spectrum and selects the frequency corresponding to that maximum ($n_{max}$) as being the initial fundamental frequency at which both flow tubes resonantly vibrate. Now, once this frequency has been selected, execution passes to block 635 which determines the appropriate value of the divisor, D, that when stored within timer 340 (see FIG. 3) produces a sampling frequency substantially equal, within a small resolution, to exactly "128" times the value of $n_{max}$. Once this value has been calculated, block 635 then stores this value within timer 340 (see FIG. 3).

Owing to the limited resolution of the coarse search, the actual fundamental frequency can lie within ±5 Hz of the value of $n_{max}$. Since this resolution is simply too inaccurate (i.e. too low) for setting the sampling frequency during which phase measurements are made, block 640 is executed to undertake a fine ("vernier") search within a ±5 Hz region of frequency $n_{max}$ with a higher resolution, i.e. that specified by the value of the vernier index (V INDEX) obtained from input switches associated with the host microprocessor. This index is typically set, during manufacture of the meter, to provide a 0.1 Hz change in the sampling frequency. Specifically, block 640 when executed, invokes Vernier Search Routine 800, shown in FIG. 8 and discussed in detail shortly. This routine computes a power spectrum, specifically the magnitude associated with each one of a series of samples taken with slightly different sampling intervals, evaluated at a "fine" resolution (i.e. typically 0.1 Hz) within a selected 10 Hz coarse frequency bin, and then selects the value of that interval (actually the value, D, of the divisor stored within timer 340—see FIG. 3) that produced the series having the largest magnitude. To accomplish this, the sampling interval is first set to a value equal to $1/(n_{max}+5 \text{ Hz})$ and a series of "64" samples are taken. Now, with the frequency fixed at $n_{max}+5$ Hz, the magnitude of the discrete fourier transform associated with these samples is calculated. The value of the divisor stored in timer 340 is then decreased by the vernier index, which typically is set to a pre-defined value which decreases the sampling interval by 100 milliseconds. A new series of "64" samples is taken. The magnitude of the discrete fourier transform for these current samples is then computed. The resulting current magnitude value is compared to a prior maximum magnitude value to determine whether the current value is larger than the prior value. If it is larger than the prior value, the current value is stored as the prior maximum magnitude value. Also, the value of the divisor, D, associated with this current maximum magnitude value is stored in variable $D_{max}$. Thereafter, the divisor supplied to timer 340 is decreased by the value of the vernier index to obtain a new series of "64" samples, using a slightly decreased sampling interval, for which the magnitude of the discrete fourier transform will be computed. This process is repeated until the sampling interval reaches the value $1/(n_{max}-5 \text{ Hz})$. Once the vernier search is complete, the stored value, $D_{max}$, of the divisor is that which produced the maximum magnitude value. Now, at this point, a highly accurate value of the fundamental frequency, F FREQ, at which both flow tubes vibrate is given by $(1*10^7)/D_{MAX}$. Execution now proceeds to block 645 which, when executed, stores the divisor value, $D_{max}$, within timer 340 in order to appropriately modify the actual sampling rate to substantially equal, within a small resolution, the value "128" times the fundamental frequency at which the flow tubes vibrate. At this point, initialization routine 600 has completely executed. Therefore, execution then exits this routine and appropriately returns to time interval measurement circuit main program 500.

Clearly, the coarse and vernier searches could be combined into a single vernier search which spans the entire frequency band from $N=1$ to $N=63$; however, an excessive amount of processing time would be needlessly consumed in executing such a search.

3. DFT Routine 700

A flowchart of DFT Routine 700 is shown in FIG. 7. Essentially, this routine samples one of the velocity waveforms at a fixed sample rate and calculates the magnitude of all the frequency components, from $n = 1, \ldots, N-1$ (here $N-1$ equals the value "63"), that comprise the discrete fourier transform of the waveform produced by the left velocity sensor. The coarse search is preferably undertaken with a sampling frequency of 640 Hz which with "64" samples per measurement interval provides 32 different frequencies at a resolution (1/NT) of approximately 5 Hz for either one of the two velocity sensor waveforms.

Specifically, upon entry into routine 700, execution proceeds to block 705 which, when executed, initializes the values of various variables. Specifically, the frequency index, n, is set to the value one; the maximum frequency index, N, is set to the value "128" and the contents of a temporary variable, $MAG_{old}$, is set to zero. Thereafter, execution passes to block 710 which appropriately sets the contents (divisor) of timer 340 to a value which produces a stream of 640 Hz sampling pulses on lead 342 (see FIG. 3). Once this has occurred, as shown in FIG. 7, execution proceeds to block 715. This block, when executed, invokes Real-Imag Component Routine 900 which, as discussed below in conjunction with FIGS. 9A and 9B, samples the left velocity waveform appearing on Channel 1 of multiplexer 302 (see FIG. 3), at a fixed frequency and determines the values of both the real and imaginary components at a particular frequency, n, that form the discrete fourier transform of the sampled left velocity sensor waveform. Once these values have been determined, then, as shown in FIG. 7, block 720 is executed to determine the magnitude (actually squared) of the discrete fourier transform at frequency n. The only purpose of determining the magnitude is to determine the corresponding frequency at which the magnitude reaches a maximum value. Ordinarily, the magnitude is the square root of the sum of the squares of the values of the real and imaginary components. Inasmuch as the square root reaches a maximum value at the same point at which this sum also reaches a maximum value, there is no need to compute the square root to locate the maximum magnitude. As such, the square root is not calculated in order to save processing time. Consequently, the sum of the squares of the values of the real and imaginary components is calculated and assigned to the variable, $MAG_{new}$. Thereafter, execution proceeds to decision block 730 which determines whether the magnitude is increasing. In particular, this block compares the current magnitude value, $MAG_{new}$, against a prior maximum magnitude value stored within variable $MAG_{old}$. If the current value stored in variable $MAG_{new}$ is larger than the prior maximum magnitude value stored in variable $MAG_{old}$, then decision block 730 routes execution, via its "YES" path, to block 740. This block, when executed, temporarily stores the current magnitude value, $MAG_{new}$, as the prior maximum magnitude value in variable $MAG_{old}$ for subsequent use in the next comparison. Thereafter, block 750 is executed to store the frequency value, n, of the real and imaginary components associated with the current magnitude value in variable $n_{max}$. Execution then proceeds to execution block 755. Now, in the event that the current magnitude value stored in variable $MAG_{new}$ equals or is less than the prior maximum magnitude value stored within variable $MAG_{old}$, thereby indicating that the magnitude remains constant or is decreasing with increasing frequency, then decision block 730 merely routes execution, via "NO" path 735, directly to block 755, without storing the current magnitude value or its associated frequency value. Block 755, when executed, merely increments the value of frequency index n by one. Once this occurs, execution proceeds to decision block 760 to determine whether all the frequency components of the discrete fourier transform have been evaluated. If not, i.e. the value of the frequency index, n, is less than the frequency limit value, N (here equal to the value "128"), then decision block 760 loops execution, via "NO" path 765, back to block 715 to determine the real and imaginary values of the next frequency component, and so on. Once the magnitude has been calculated for all the frequency components, i.e. from N=1 to N=127, execution then exits routine DFT routine 700, via the "YES" path emanating from decision block 760. At this point, execution of DFT Routine 700 is now complete with the variable $n_{max}$ containing the specific "coarse" frequency component, determined through the discrete fourier transform of the left velocity sensor waveform, that has the maximum magnitude.

Inasmuch as maximum and minimum frequencies at which the flow tubes in any given meter will resonantly vibrate are usually known, then alternatively, in the coarse frequency search, certain values of "n" could be used to bracket only those coarse frequency bins of interest for which the DFT would be separately evaluated. This obviates the need to evaluate corresponding "64" point DFTs for the left velocity sensor waveform at every one of the 32 different unique coarse frequencies, i.e. for all 32 different coarse frequency bins, and thereby saves computational time.

4. Vernier Search Routine 800

A flowchart of Vernier Search Routine 800 is shown in FIG. 8.

Essentially, as noted above, Vernier Search Routine 800 computes a power spectrum at a fine resolution within a selected coarse frequency bin, i.e. by calculating the magnitude associated with each one of a series of samples taken with slightly different sampling intervals ("T" in equation 4), and then selects the value of that interval (actually the value, D, of the divisor stored within timer 340—see FIG. 3) that produced the series having the largest magnitude. The resulting value provides a very accurate measurement of the fundamental frequency at which both flow tubes resonantly vibrate. The value of the frequency component, $n_{max}$, and the maximum number of samples, N, both used in the discrete fourier transform calculations remain fixed throughout the calculations employed in Vernier Search Routine 800. Only the value of the sampling interval, T, changes; it does so on an incrementally decreasing basis in order to effectively sweep through the selected coarse frequency bin.

Specifically, upon entry into vernier search routine 800, execution first proceeds to block 810 to initialize the values of various variables: the frequency index, n, is set to the value $n_{max}$; a temporary variable, $MAG_{old}$, that stores the maximum magnitude value is set to zero; the value, D, of the divisor supplied to timer 340 is set to a minimum value to provide a sampling frequency of $n_{max}+5$ Hz (one limit frequency); and, a divisor limit index, $D_{min}$, is set to a value to produce a sampling frequency of $n_{max}-5$ Hz (another limit frequency). Next, execution proceeds to block 820, which, when executed, invokes Real-Imag Component Routine 900 which samples the left velocity waveform at a particular sampling interval $(T-\Delta T)$ and determines the values of both the real and imaginary components that form the discrete fourier transform of the sampled left velocity sensor waveform. Once these values have been determined, block 830 is executed to determine the magnitude (actually squared) of the discrete fourier transform evaluated at frequency $n_{max}$ and sampling interval $T-\Delta T$. The only purpose of determining the magnitude is to determine the value of the corresponding sampling interval at which the magnitude reaches a maximum value.

At this point, execution proceeds to decision block 840 which determines whether the magnitude is increasing. In particular, this block compares the current magnitude value, $MAG_{new}$, against a prior maximum magnitude value stored within variable $MAG_{old}$. If the current value stored in variable $MAG_{new}$ is larger than the prior maximum magnitude value stored in variable $MAG_{old}$, then decision block 840 routes execution, via its "YES" path, to block 850. This block, when executed, temporarily stores the current magnitude value, MAG$_{new}$, as the prior maximum magnitude value in variable MAG$_{old}$ for subsequent use in the next comparison. Thereafter, block 860 is executed to store the value, D, of the divisor provided to timer 340 and associated with the current magnitude value in variable D$_{max}$. Execution then proceeds to execution block 870. Now, in the event that the current magnitude value stored in variable MAG$_{new}$ equals or is less than the prior maximum magnitude value stored within variable MAG$_{old}$, thereby indicating that the magnitude remains the same or is decreasing as the sampling interval decreases, then decision block 840 merely routes execution, via "NO" path 845, directly to block 870, without storing both the current magnitude value and the associated value, D, of the divisor. Block 870, when executed, merely decreases the value, D, of the divisor supplied to timer 340 by the amount of the vernier index in order to decrease the sampling interval by a fixed pre-defined corresponding amount T (which typically provides a 0.1 Hz resolution in the sampling frequency). The new value of this divisor is then stored within the timer to appropriately change the duration of the sampling interval by incrementally increasing the value of T to incrementally slew the sampling frequency upward.

Execution next proceeds to decision block 880 to determine whether the divisor has been decremented to its minimum limit, i.e. that the magnitude of the real and imaginary components of the discrete fourier transform has been evaluated for each different sampling frequency lying within the interval n$_{max}$±5 Hz at the resolution defined by the reciprocal of the vernier index (typically 0.1 Hz, as noted above). If not, meaning that the value, D, of divisor has not been decremented to its minimum limit, D$_{min}$, then decision block 880 loops execution, via "NO" path 885, back to block 820 to determine the real and imaginary values using the next successive sampling interval (T−ΔT), and so on. Alternatively, once the magnitude has been calculated for all the different sampling intervals, then execution exits routine 800 via the "YES" path emanating from decision block 880. At this point, variable D$_{max}$ contains the specific value of the divisor for timer 340 that will produce a sampling frequency that is substantially equal (within the resolution given by the reciprocal of the vernier index) to "128" times the fundamental frequency at which the flow tubes vibrate. This now completes execution of Vernier Search Routine 800.

5. Real-Imag Component Routine 900

Figures 9, 9A:
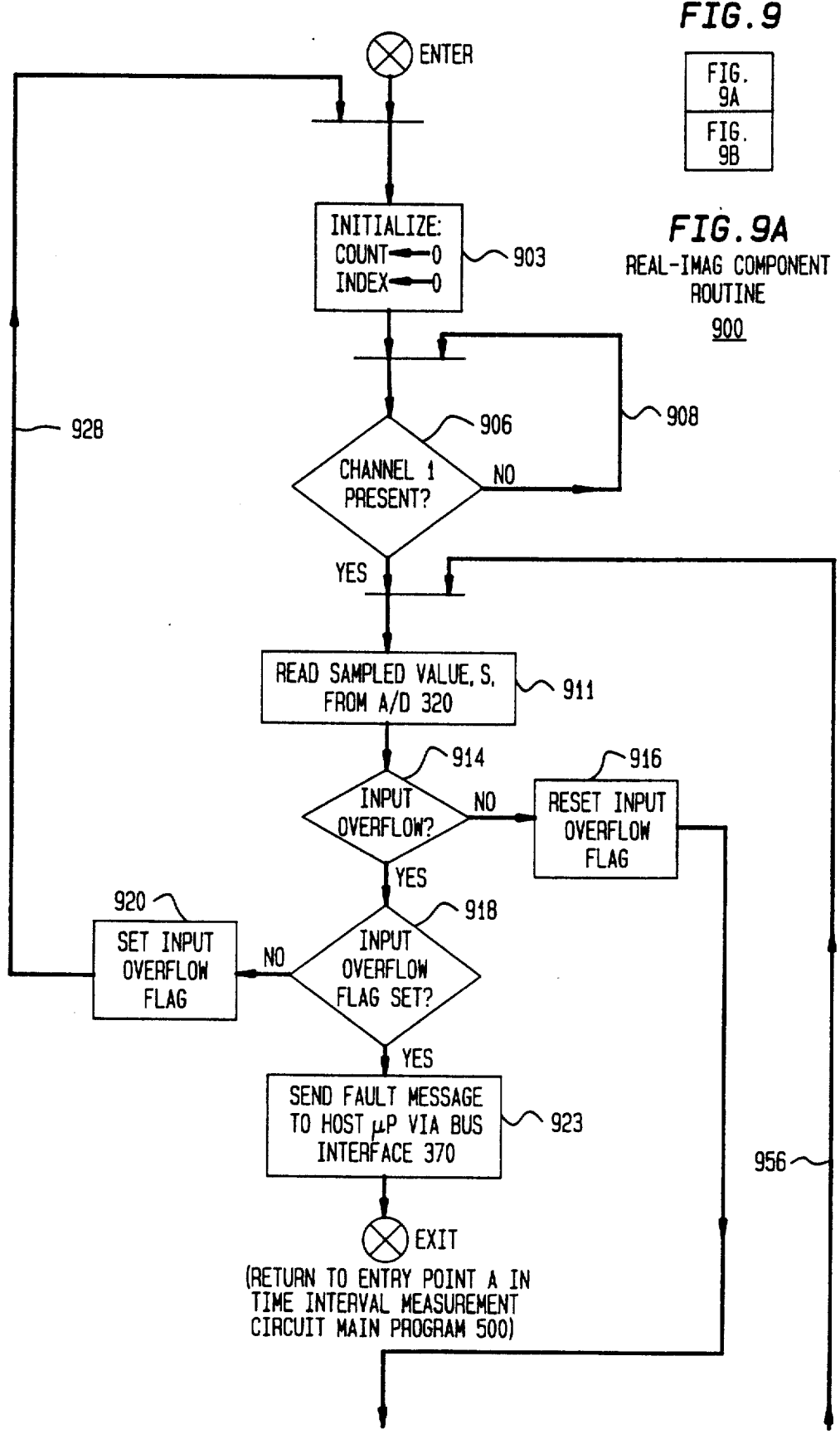

A flowchart of Real-Imag Component Routine 900 is depicted in FIGS. 9A and 9B; for which the proper alignment of the drawing sheets for these figures is shown in FIG. 9. As noted above, this routine samples the left velocity waveform at a fixed frequency and determines the values of both the real and imaginary components at a particular frequency, n, and sampling interval, T, that form the discrete fourier transform of the sampled left velocity sensor waveform.

Specifically, upon entry into routine 900, execution proceeds to block 903 which sets the value of two software counters, COUNT and INDEX, to zero. The counter, COUNT, points to the specific sample presently being processed. The variable INDEX is a pointer into a sine table that has been stored within EPROM memory 355 located within time interval measurement circuit 30 (see FIG. 3). Thereafter, as shown in FIGS. 9A and 9B, execution passes to decision block 906 which first instructs multiplexer 302 to route the signal appearing at its Channel 1 input to filter 306 (see FIG. 3) and then determines whether a signal appears at this input, i.e. whether the left velocity sensor signal is present. If this signal is not present, then, as shown in FIGS. 9A and 9B, execution merely loops back to the beginning of this decision block, via "NO" path 908, until such time as this signal appears. Now, if this signal exists, execution is directed, via the "YES" path emanating from decision block 906, to block 911 which, when executed, reads the value, S, of the digitized sample of the Channel 1 signal, i.e. the left velocity signal, produced by A/D converter 320 (see FIG. 3). In this manner, time interval measurement circuit 30 always begins taking data starting with the left velocity sensor waveform. This ensures that phase measurements maintain the same polarity even if the meter electronics 20 (see FIG. 2) interrupts its phase measurement operations for a period of time.

Now, once the sampled value is read, execution, as shown in FIGS. 9A and 9B, proceeds to decision block 914 which, when executed, determines whether an input overflow has occurred. If such an overflow has occurred, then a decision is made as to whether a fault condition exists in input circuit 310 (see FIG. 3) or whether the overflow is merely a transitory condition. Specifically, a fault condition is assumed to occur if two overflow conditions successively occur. Consequently, if an overflow has occurred, decision block 914 routes execution, via its "YES" path, to decision block 918. This latter decision block determines whether an input overflow has occurred during the prior sampling interval. This is accomplished by testing the status of an INPUT OVERFLOW flag. If this flag has not been set to illustratively a high state, thereby indicating that an overflow did not occur during the prior sampling interval, then decision block 918 routes execution, via its "NO" path, to block 920 which, when executed, sets the INPUT OVERFLOW flag to high. Since any subsequent values in the current series of samples for either and/or both velocity sensor waveforms and any calculations based thereon, during the current pass through routine 900, will now be in error due to the overflow, execution loops back, via path 928, to block 903 to re-initialize the calculations and then completely begin sampling again. Alternatively, in the event the INPUT OVERFLOW flag was set, thereby indicating that an overflow had just recently occurred and now another overflow has just occurred thereby giving rise to a fault condition, then decision block 918 routes execution, via its "YES" path, to block 923. This latter block, when executed, sends an appropriate fault message, containing an appropriate error code indicating an input overflow fault, to host microprocessor 205 (see FIG. 2). Only after the user has intervened to reset the meter electronics and an appropriate reset instruction has been transmitted by the host microprocessor back to microprocessor 330, via bus interface 370 (see FIG. 3), will block 923 allow execution to return to entry point A in time interval measurement circuit main program 500 (see FIG. 5). Now, in the event an input overflow did not occur during the present sampling interval, then decision block 914 routes execution to block 916 which, when executed, merely resets the status of the INPUT OVERFLOW flag to a low state. Execution is then directed to decision block 926.

Decision block 926 tests the least significant bit (LSB) of the contents of counter COUNT to determine whether the current sampled value originates from Channel 1 (the left velocity sensor waveform) or Channel 2 (the right velocity sensor waveform) of multiplexer 302 (see FIG. 2). If this sample was generated by the left velocity sensor, i.e. the value of the least significant bit stored within counter COUNT is zero, then decision block 926 routes execution, via its "YES" path, to execution block 931. This latter block, when executed, invokes Channel 1 Real-Imag Compute Routine 1000, shown in FIG. 10 and discussed in detail below, to update the calculations of the discrete fourier transform real and imaginary components for the left velocity sensor waveform with the current sampled value. Alternatively, if the current sampled value is associated with Channel 2, i.e. the right velocity sensor waveform, then decision block 926 routes execution, via its "NO" path, to decision block 934. This latter decision block determines whether power spectra calculations are being made as part of a coarse or vernier search. Since either of these searches only require the fourier components for one velocity waveform, illustratively that produced by the left velocity sensor, then there is no need to process the sampled values for the right velocity waveform. If such calculations are being made, then decision block 934 routes execution to "YES" path 936 which bypasses block 938 and thereby effectively ignores the current sampled value for the right velocity waveform. In addition, if the metering system is only being used to provide density measurements of the fluid, then block 934 would also route execution to block 941 inasmuch as density measurements also only require the fourier components of one velocity waveform, e.g. that produced by the left velocity waveform sensor. Alternatively, if a phase measurement to calculate mass flow rate is being undertaken, in which case a coarse or vernier search is not being made, i.e. blocks 520–550 are being executed as shown in FIG. 5, then decision block 934, as shown in FIGS. 9A and 9B, routes execution, via its "NO" path, to block 938. This latter block, when executed, invokes Channel 2 Real-Imag Compute Routine 1100, shown in FIG. 11 and discussed in detail later, to update the calculations of the discrete fourier transform real and imaginary components for the right velocity sensor waveform with the current sampled value.

Now, after either block 931 or 938 has completely executed or if execution has been routed to "YES" path 936, then execution directly proceeds to block 941. Block 941, when executed, increments the contents of software counter COUNT by the value "one" to indicate the number of the next sampled value. Thereafter, the value of pointer INDEX is also incremented by one to point to the next entry that will be used in the sine table. As noted, there are "128" entries in this table, of which "64" of these entries are used to evaluate the discrete fourier transform for the left velocity sensor waveform and are successively interleaved with the other "64" entries which are used to evaluate the discrete fourier transform for the right velocity sensor waveform. Each entry corresponds to $2\pi/128$ radians. Evaluation of these "64" samples for each sensor waveform using the DFT yields 32 unique frequency values for that waveform. Once the value of pointer INDEX has been appropriately set, then execution proceeds to decision block 947 to test whether the value of the pointer exceeds "128", i.e. $2\pi$ radians. If so, decision block 947 routes execution, via its "YES" path, to block 951 which, when executed subtracts the value "128" from the current contents of the pointer in order to reduce the value of the pointer to a value corresponding to within 0 to $2\pi$ radians for subsequent use in properly accessing the sine table. Execution then proceeds to decision block 953. If, however, the value of the pointer INDEX is less than "128", then decision block 947 merely routes execution, via "NO" path 949, directly to decision block 953. This latter decision block determines whether all "64" samples for each velocity sensor waveform, i.e. a total of "128" samples, have been processed. If not, in which case the contents of counter COUNT are less than the value "128", i.e. between 0 to 127, then decision block 953 loops execution, via "NO" path 956, back to block 911 to continue the current series of sampling and accompanying discrete fourier transform calculations. Alternatively, in the event, all "128" samples have just been processed, then the real and imaginary components of both the left and right velocity waveforms have been completely calculated. In this case, execution exits from routine 900, via the "YES" path emanating from decision block 953. This now concludes the discussion of Real-Imag routine 900.

6. Channel 1 Real-Imag Compute Routine 1000

A flowchart of Channel 1 Real-Imag Compute Routine 1000 is shown in FIG. 10. As noted above, this routine calculates the discrete fourier transform real and imaginary components for the left velocity sensor waveform. This routine evaluates the following equation:

$$G\left[\frac{n}{NT}\right] = \sum_{K=0}^{K=N-1} s(KT)\cos\frac{2\pi nK}{N} - j\sum_{K=0}^{K=N-1} s(KT)\sin\frac{2\pi nK}{N} \tag{8}$$

Specifically, routine 1000 is executed once for every sampled value of the left velocity waveform. Essentially, this routine provides a table look-up of a sine value, multiplies that value by the current sampled value to yield a product and accumulates the product with corresponding prior products. This operation is undertaken once to compute the real (cosine) component and again to compute the imaginary (sine) component. Consequently, routine 1000 is executed "64" times to update the calculations with each incoming sampled value that forms one cycle of the left velocity sensor waveform. At the conclusion of these "64" executions, the values produced by this routine equal the real and imaginary components of the left velocity waveform. While this routine and Channel 2 Real-Image Computer Routine 1100, which is discussed in detail below, use the discrete fourier transform (DFT), the fast fourier transform (FFT) could be used instead. In particular, the DFT and the FFT both provide equally accurate results. However, for a relatively large number of samples, e.g. in excess of "64" samples, the FFT is computationally faster than the DFT and, hence, for that reason, is preferable thereto. In contrast, for a relatively small number of samples, both the DFT and the FFT require comparable computation times; therefore, for "64" samples or less, either the DFT, as used here, or FFT can be used.

Specifically, upon entry into routine 1000, execution proceeds to block 1010 which tests whether the current value of pointer INDEX equals zero. If it does equal zero, then the first sample in a series of "64" samples is being processed. In this case, decision block 1010 routes execution, via its "YES" path, to block 1020. This latter block, when executed, initializes the values of two variables ($Re_1$ and $Im_1$), that will store the values of the real and imaginary components of the left velocity sensor waveform, to zero for use during subsequent processing. Thereafter, execution proceeds to block 1030. Alternatively, if the value of pointer INDEX is not zero, then decision block 1010 routes execution, via "NO" path 1015, directly to block 1030.

Block 1030, when executed, calculates an address to the "128" value sine look up table, TABLE, that has been stored within EPROM located within memory 355 (see FIG. 3). This address, $INDEX_C$, points to the appropriate cosine value, stored within this table, for use in processing the current sampled value to update the value of the real component. As shown in FIG. 10, the pointer, $INDEX_C$, is calculated by adding the value of pointer INDEX to a pre-determined offset address that points to the starting address for cosine values stored within the sine look up table, i.e. address $START_C$ which is the starting address of the table that has then been indexed to a location within the table corresponding to $\pi/2$ radians. Execution then proceeds to block 1040 which updates the calculation for the real component using the present sampled value. In particular, the value, S, of the current sample is multiplied by a corresponding cosine value, i.e. [TABLE ($INDEX_C$)]. The product is added to the prior value of the real component, $Re_1$. The result is then stored as the current value of the real component for the left velocity sensor waveform, i.e. $Re_1$, for subsequent use.

Next, execution proceeds to block 1050 which calculates an address, $INDEX_S$, to the sine look up table, TABLE, which points to the appropriate sine value for use in processing the current sampled value to update the value of the imaginary component. The pointer, $INDEX_S$, is calculated by adding the value of pointer INDEX to a pre-determined offset address that points to the starting address for sine values stored within the sine look up table, i.e. address $START_S$ which is the starting address of the table. Thereafter, execution proceeds to block 1060 which, when executed, updates the calculation for the imaginary component using the present sampled value. In particular, the value, S, of the current sample is multiplied by a corresponding sine value, i.e. [TABLE ($INDEX_S$)]. The product is added to the prior value of the imaginary component, $Im_1$. The result is then stored as the current value of the imaginary component of the left velocity sensor waveform, $Im_1$, for subsequent use. Once this occurs, execution of routine 1000 is complete. Execution then exits from this routine.

As soon as routine 1000 has been successively executed "64" times to process all "64" samples that form one cycle of the left velocity sensor waveform, then the 7 contents of variables $Re_1$ and $Im_1$ will store the actual values of the real and imaginary components of the discrete fourier transform of this waveform evaluated at a given frequency (n) and sampling interval (T).

7. Channel 2 Real-Imag Compute Routine 1100

A flowchart of Channel 2 Real-Imag Compute Routine 1100 is shown in FIG. 11. As noted above, this routine calculates the discrete fourier transform real and imaginary components for the right velocity sensor waveform. This routine also evaluates equation (8) and, in fact, operates in substantially the same manner as that described above for Channel 1 Real-Imag compute routine 1000.

Specifically, routine 1100 is executed once for every sampled value of the right velocity waveform. Essentially, this routine provides a table look-up of a sine value, multiplies that value by the current sampled value to yield a product and accumulates the product with corresponding prior products. This operation is undertaken once to compute the real (cosine) component and again to compute the imaginary (sine) component. Consequently, routine 1100 is executed "64" times to update the calculations with each incoming sampled value that forms one cycle of the right velocity sensor waveform. At the conclusion of these "64" executions, the values produced by this routine equal the real and imaginary components of the right velocity waveform.

Specifically, upon entry into routine 1100, execution proceeds to block 1110 which tests whether the current value of pointer INDEX equals zero. If it does equal zero, then the first sample in a series of "64" samples is being processed. In this case, decision block 1110 routes execution, via its "YES" path, to block 1120. This latter block, when executed, initializes the values of two variables ($Re_2$ and $Im_2$), that will store the values of the real and imaginary components of the right velocity sensor waveform, to zero for use during subsequent processing. Thereafter, execution proceeds to block 1130. Alternatively, if the value of pointer INDEX is not zero, then decision block 1110 routes execution, via "NO" path 1115, directly to block 1130.

Block 1130, when executed, calculates an address to the "128" value sine look up table, TABLE, that has been stored within EPROM located within memory 355 (see FIG. 3). This address, $INDEX_C$, points to the appropriate cosine value, stored within this table, for use in processing the current sampled value to update the value of the real component. As shown in FIG. 11, the pointer, $INDEX_C$, is calculated by adding the value of pointer INDEX to a pre-determined offset address that points to the starting address for cosine values stored within the sine look up table, i.e. address $START_C$ which is the starting address of the table that has then been indexed to a location within the table corresponding to $\pi/2$ radians. Execution then proceeds to block 1140 which updates the calculation for the real component using the present sampled value. In particular, the value, S, of the current sample is multiplied by a corresponding cosine value, i.e. [TABLE ($INDEX_C$)]. The product is added to the prior value of the real component, $Re_2$. The result is then stored as the current value of the real component for the right velocity sensor waveform, i.e. $Re_2$, for subsequent use.

Next, execution proceeds to block 1150 which calculates an address, $INDEX_S$, to the sine look up table, (TABLE), which points to the appropriate sine value for use in processing the current sampled value to update the value of the imaginary component. The pointer, $INDEX_S$, is calculated by adding the value of pointer INDEX to a pre-determined offset address that points to the starting address for sine values stored within the sine look up table, i.e. address $START_S$ which is the starting address of the table. Thereafter, execution proceeds to block 1160 which, when executed, updates the calculation for the imaginary component using the present sampled value. In particular, the value, S, of the current sample is multiplied by a corresponding sine value [TABLE (INDEX$_S$)]. The product is added to the prior value of the imaginary component, Im$_2$. The result is then stored as the current value of the imaginary component of the right velocity sensor waveform, Im$_2$, for subsequent use. Once this occurs, execution of routine 1100 is complete. Execution then exits from this routine.

As soon as routine 1100 has been successively executed "64" times to process all "64" samples that form one cycle of the right velocity sensor waveform, then the contents of variables Re$_2$ and Im$_2$ will store the actual values of the real and imaginary components of the discrete fourier transform of this waveform evaluated at a given frequency (n) and sampling interval (T).

8. Phase Angle Calculation Routine 1200

A flowchart of Phase Angle Calculation Routine 1200 appears in FIG. 12. This routine, as noted above, determines the phase difference occurring between the left and right velocity sensor waveforms and then appropriately filters the result using a two pole digital filter to produce the filtered phase difference measurement value, PHASE$_2$. This phase measurement value, as discussed above, is used by block 530 located within time interval measurement circuit main program 500 (see FIG. 5) to calculate the value of time interval $\Delta t$ that is supplied by time interval measurement circuit 30 (see FIG. 3) to host microprocessor 205 (see FIG. 2).

Specifically, upon entry into this routine, as shown in FIG. 11, execution proceeds to block 1210 which sets the value of the frequency index, n, to the measured value of the fundamental frequency, n$_{max}$, at which both flow tubes resonantly vibrate. Thereafter, block 1220 is executed to invoke Real-Imag Component Routine 900 to determine the real and imaginary components of both the left and right velocity sensor waveforms evaluated at the fundamental flow tube driving frequency.

Once routine 900 has fully executed, execution proceeds from block 1220 to block 1230 to compute the phase difference between these waveforms at the fundamental flow tube driving frequency using the values of the real and imaginary components. Equation (7), as discussed above, forms the basis of the phase difference calculation. Now, inasmuch as the phase difference is usually very small, the values of imaginary components of both the left and right velocity sensors will also be small. As a result, the small angle approximation will hold and the value of an arc-tangent can be very accurately approximated by the value of its argument. Consequently, the phase difference, $\Delta\Phi$, can be very accurately calculated using the following equation:

$$\Delta\Phi = \frac{[Im_1 \, Re_2 - Re_1 \, Im_2]}{[Re_1 \, Re_2 + Im_1 \, Im_2]} \quad (9)$$

Block 1230, when executed, evaluates equation (9) using the current values of the real and imaginary components for the left and right velocity sensor waveforms, i.e. (Re$_1$, Im$_1$) and (Re$_2$, Im$_2$). Now, after the value, PHASE, of the phase difference has been determined, execution proceeds to block 1240 to digitally filter this value using a common single pole filter that is recursively used to provide two stages of filtering. The filter constant that is used is the value of variable F CONSTANT that has been provided to time interval measurement circuit 30 by the host microprocessor and was initially programmed into input switches.

Thereafter, block 1240 stores the resulting filtered phase value within variable PHASE$_2$ for subsequent use by time interval measurement circuit main program 500. Inasmuch as execution of phase angle calculation routine 1200 is now complete, execution then exits from this routine and returns to time interval measurement circuit main program 500.

9. Frequency Tracking Routine 1300

A flowchart of Frequency Tracking Routine 1300 is shown in FIG. 13. As noted above, routine 1300, when executed, determines whether the fundamental frequency at which the flow tubes are vibrating has changed due to, for example, changes in density of the fluid passing through meter assembly 10 (see FIG. 1), and the magnitude of any such change. This routine then adjusts the frequency of the sampling pulses produced by timer 340 on lead 342 (see FIG. 3) to compensate for any such changes.

Specifically, as shown in FIG. 13, execution first proceeds to block 1310 to read the sampled value for the left velocity sensor waveform appearing on Channel 1 of multiplexer 302 (see FIG. 2). Frequency changes are proportional to the phase difference between the real and imaginary components of either one of the velocity sensor waveforms measured with respect to the zero crossing of that waveform. Illustratively, the left velocity sensor waveform is used for these calculations. Next, as shown in FIG. 13, decision block 1320 is executed to determine whether the value of this sample equals zero. In the event the present sample of the left velocity waveform is non-zero, then decision block 1320 merely loops execution back to block 1310 to obtain the next sampled value for the left velocity sensor waveform. These phase calculations can begin as soon as the sampled value for the left velocity sensor waveform approximately equals zero. Therefore, as soon as these sampled values reach approximately zero, decision block 1320 routes execution to block 1330. This latter block, when executed, invokes Real-Imag Component Routine 900 to determine the values of the real and imaginary components of the left velocity sensor waveform evaluated at the current sampling frequency, i.e. "128" times the measured fundamental frequency, n$_{max}$, at which the flow tubes are resonantly vibrating. Once these values have been determined, execution proceeds to block 1340 which, through application of the small angle approximation, calculates the value, PHASE, of the phase difference of the left velocity sensor waveform referenced to its zero crossing point as being the ratio between the value of the imaginary component and that of the real component of that waveform and occurring at the fundamental frequency at which the flow tubes vibrate.

Thereafter, block 1350 is executed to digitally filter this phase difference value, PHASE, using a common single pole filter that is recursively used to provide two stages of filtering. The filter constant that is used is the value of variable F CONSTANT that has been provided to time interval measurement circuit 30 by the host microprocessor and was initially programmed into the input switches. The resulting filtered value is then stored as variable PHASE$_1$. At this point, execution passes to block 1360 which, when executed, multiplies the filtered phase difference value, PHASE$_1$, by an appropriate pre-defined scaling factor, a. This scaling factor specifies the incremental change in the divisor stored within timer 340 (see FIG. 3) for a one degree phase difference value. Thereafter, as shown in FIG. 13, block 1370 is executed to update the value of the divisor, $D_{max}$, stored within timer 340 given the measured value of the phase difference, $PHASE_1$. Now, once a new value of the divisor, $D_{max}$, for timer 340 (see FIG. 3) has been determined, block 1380 executes to load this value into the timer such that the sampling frequency is set to substantially equal, within a small resolution, exactly "128" times the fundamental frequency at which the flow tubes are actually vibrating. Execution then proceeds to block 1390 to calculate and display the density of the fluid. As noted, the phase difference of either velocity sensor waveform, when referenced to the zero crossing of that waveform, will be proportional to and track density changes in the fluid flowing through meter assembly 10 (see FIG. 1). Consequently, by monitoring the value of the phase difference for either one of the sensor velocity waveforms, a very accurate measurement of fluid density changes can be obtained. Specifically, during initialization, a base-line density value for the fluid being measured, i.e. calibrated density value $DENSITY_0$, is supplied to the time interval measurement circuit, such as through a thumbwheel entry. Thereafter, during execution of block 1390, the phase difference, i.e. $PHASE_1$, for one of the velocity sensor waveforms, e.g. the left velocity waveform, is multiplied by a pre-determined proportionality constant, b, with the resultant product being added to the base-line density value, $DENSITY_0$, to yield a current density measurement. This measurement, if selected, can then be locally displayed on LCD display 383 (see FIG. 3) through execution of block 1390 shown in FIG. 13. Since the discrete fourier transform provides a highly selective filter, phase measurements calculated using these transforms will advantageously be highly accurate and substantially immune to noise. Consequently, any densimeter that incorporates this method of determining density changes will likewise and advantageously be very accurate and substantially immune to noise. Once block 1390 has completely executed, execution exits from routine 1300 and returns to time interval measurement circuit main program 500 (see FIG. 5).

B. Host Microprocessor Software

The discussion will now turn to the software executed by host microprocessor 205 contained within meter electronics 20 (see FIG. 2). This software consists of Host Microprocessor ($\mu$P) Main Program 1400, shown in FIGS. 14A-14D, and various routines called thereby, all of which will now be discussed.

Host microprocessor main program 1400 performs functions related to power-up or recovery from a fault condition, such as initializing the host system, executing various system diagnostics, accessing parameters from NOVRAM memory, validating accessed parameters, obtaining user parameters and enabling the drive circuit. In addition, once interrupts are enabled (unmasked), host microprocessor main program 1400 continuously executes various system diagnostics whenever neither of the two interrupt service routines (100 msec interrupt routine 1900 and time interval measurement routine 2300 both of which are discussed in detail below) is executing.

When executed, 100 msec interrupt routine 1900 calculates the latest value of mass flow rate, updates the flow totals and output values, displays new results, and performs various diagnostics.

Time interval measurement interrupt routine 2300, when executed, reads a current value of a time difference, $\Delta t$, provided by phase difference measurement circuit 30 (see FIG. 2), then subtracts a previously measured time difference that is associated with zero flow from the current value and finally executes various diagnostics. The resulting time difference sum value, $\Delta t$, is subsequently used by 100 msec interrupt routine 1900 to update the mass flow rate.

1. Host Microprocessor Main Program 1400

Figure 14C:
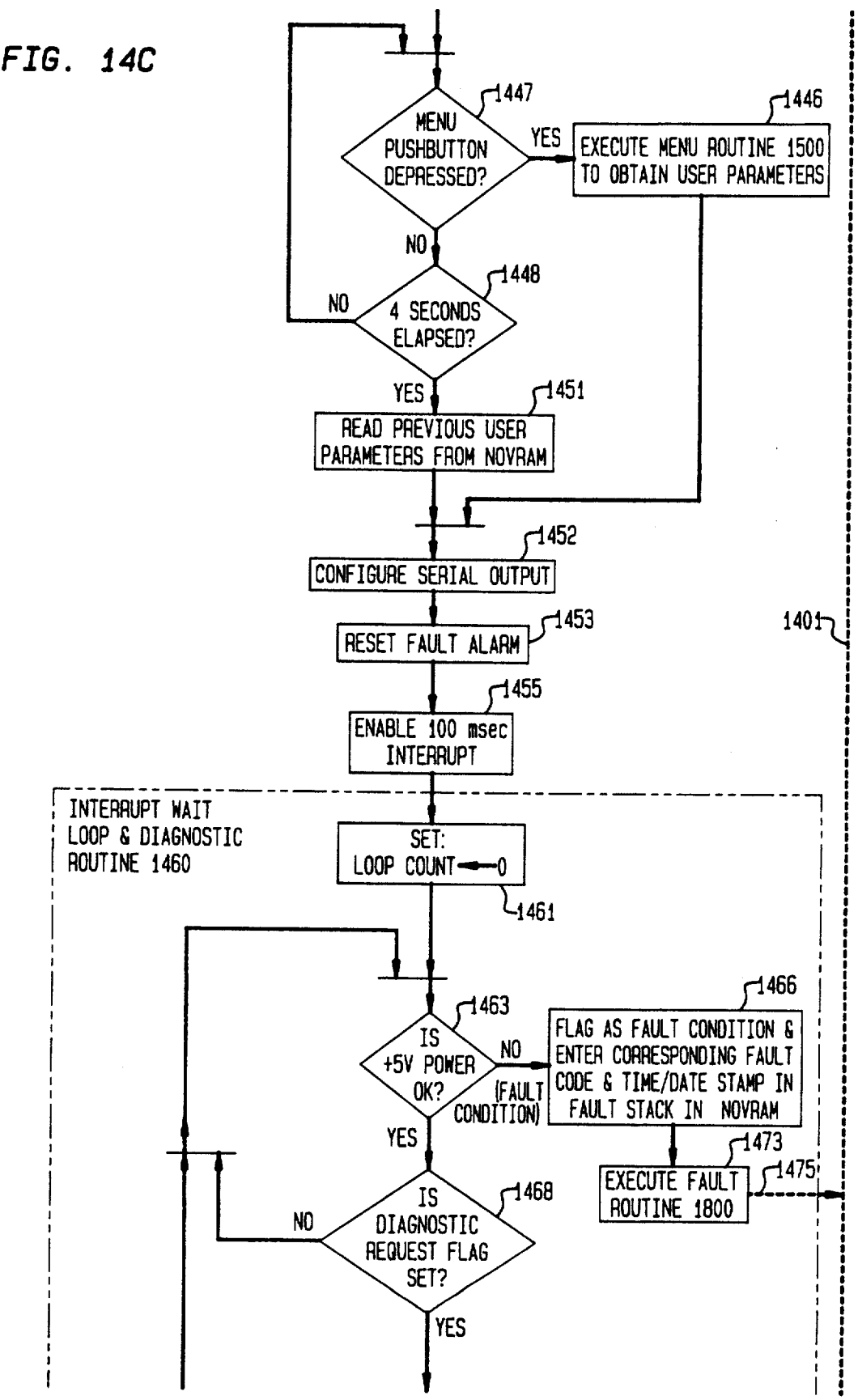

A flowchart of host microprocessor main program 1400 is shown in FIGS. 14A-14D; for which the correct alignment of the drawing sheets for these figures is depicted in FIG. 14.

As shown, upon a power on reset condition or recovery from a fault condition through path 1401 (as discussed below), execution is first routed to block 1402. This block initializes the system by setting various temporary memory locations (such as those that store various parameters used by the digital filter implemented within Filter Routine 2100, as discussed below) to zero and also disables the drive circuit. In addition, this block also configures host microprocessor 205 (see FIG. 2) by first enabling it to read from EPROM memory and second establishing a software map which maps all the other bus devices (such as A/D converter 220 and real time clock 215) into appropriate NOVRAM memory locations. At this point, the fault alarm is set inasmuch as relay 265 has not been energized to open its normally closed contact and de-energize the fault alarm. Next, block 1403, as shown in FIGS. 14A-14D, is executed to reset the LCD display and thereafter cause an initial message, such as "INITIALIZING", to be displayed thereon.

Execution then proceeds to block 1404 which performs various diagnostics. These diagnostics include a display test, a check of the power supply levels, an EPROM test (typically a read checksum test), microprocessor RAM tests and an A/D test. During the A/D test, host microprocessor 205 selects ground as the input signal to the A/D converter and measures both the conversion time, using a software timing loop (not shown), and the digitized output voltage produced by the converter. If the conversion time is too long or the digitized voltage exceeds a certain pre-defined noise value, then a fault condition occurs. In fact, if any of these diagnostics fail as indicated by decision block 1405, then a fault condition occurs and execution proceeds, via the "YES" path emanating from this decision block, to block 1406. This latter block, when executed, displays a code on the LCD display that corresponds to the particular fault condition that has occurred. In addition, the time/date and fault code are stored in a 25 level (last in - first out) fault stack situated in NOVRAM memory for subsequent retrieval and analysis. Thereafter, execution proceeds to block 1407 which executes fault routine 1800, which will be discussed below in conjunction with FIG. 18. Once the user intervenes to reset the system (i.e. clear the fault condition), execution returns to block 1402 (entry point A) via paths 1408 and 1401. Alternatively, if all the diagnostics are satisfactorily completed, then execution proceeds, via the "NO" path emanating from decision block 1405, to block 1409. This latter block, when executed, retrieves various system parameters (such as alarm limit values and the time constant of the input digital filter all as discussed in detail below) from NOVRAM.

At this point, execution proceeds to parameter validation routine 1410 which checks each parameter that has been accessed from NOVRAM to determine whether the value of that parameter lies within acceptable bounds. Specifically, upon entry into this routine, block 1411 is executed to reset counter N to zero. Thereafter, execution passes to decision block 1415 which tests whether any accessed parameter lies outside the boundary values of a pre-determined range for that parameter. These boundary values are stored in EPROM for each parameter and are appropriately read during execution of this block. In the event an accessed parameter is found to lie outside its corresponding range, then execution proceeds, via the "YES" path from decision block 1415 to decision block 1417. Since a transient voltage pulse (commonly referred to as a "glitch") can occur which will obliterate the contents of a memory location, decision block 1417 determines whether such a glitch has occurred or whether the accessed value does indeed lie outside its range. Specifically, decision block 1417 determines whether the accessed parameter has only been read once; if so, then the contents of counter N will equal zero and execution will proceed, via the "NO" path from this block to execution block 1418. This latter block, when executed, will re-read the accessed parameter from NOVRAM. Thereafter, block 1413 is executed to set the value of counter N to one. Execution then loops back to decision block 1415 which determines whether all the accessed parameters lie within their corresponding ranges. If the accessed parameter again falls outside its range, then execution proceeds to decision block 1417. In this case, the parameter will have been accessed twice and will have failed on both occasions to lie within its range. As such, a failure rather than a glitch has occurred. The microprocessor will now notify the user of this failure. Specifically, at this time, the value of counter N will equal one. Consequently, execution will proceed, via the "YES" path from decision block 1417, to execution block 1419. This latter block, when executed, will record the fault condition in terms of a corresponding fault code and the time and date that the fault condition has occurred. This information will then be stored in the fault stack in NOVRAM. This stack can subsequently be read by the user for diagnostic and analysis purposes, as described below in conjunction with menu routine 1500, shown in FIGS. 15A and 15B. Once block 1419 has been executed, as shown in FIGS. 14A-14D, execution proceeds to block 1420 which invokes fault routine 1800. Execution proceeds from this routine, as discussed below in conjunction with FIG. 18, via dotted path 1401 to entry point A only after the user has intervened to reset the system. Now, alternatively if all the accessed parameters fall within their corresponding ranges, then execution proceeds from parameter validation routine 1410, via "NO" path 1416 from decision block 1415, to execution block 1421.

When executed, block 1421 enables drive circuit 40 (see FIG. 4) to place both flow tubes into vibration. Inasmuch as both flow tubes require a finite amount of time for their vibratory motion to reach a desired peak value, execution proceeds from block 1421, as shown in FIGS. 14A-14D, to decision block 1422. This block resets a software counter J to the value one. This counter will be incremented by one every second. The EXCESS DRIVE signal is also tested once per second.

If the EXCESS DRIVE signal is on after thirty seconds have elapsed, then a fault condition has occurred. Specifically, after the software counter has been reset by block 1422, decision block 1423 is executed to determine whether one second has elapsed. If not, execution loops back to the beginning of the decision block. Once one second has elapsed, then execution proceeds to decision block 1426, via the "YES" path emanating from decision block 1423. Decision block 1426, when executed, tests the status of the EXCESS DRIVE signal. In the event the EXCESS DRIVE signal is high, then execution is routed, via the "YES" path from decision block 1426, to decision block 1427. This latter decision block determines whether thirty seconds have elapsed by testing whether the contents of software counter J have been incremented to the decimal value "30". If the contents of this counter have not reached the value thirty, execution proceeds to block 1425, via the "NO" path emanating from decision block 1427. Block 1425 increments the contents of the software counter after which execution loops back to decision block 1423. In the event thirty seconds have elapsed, then execution proceeds, via the "YES" path emanating from decision block 1427, to decision block 1429 to test the status of the EXCESS DRIVE signal. Now, during the start of the thirty second period the EXCESS DRIVE signal is on which indicates that drive circuit 40 is applying a high valued drive signal to initially place the flow tubes in vibration. During normal operation, this signal will only remain high for a few seconds at most (typically 2 to 3 seconds) after which the peak amplitude of the flow tube vibration will have reached its proper steady state value. In the event the EXCESS DRIVE signal remains on after thirty seconds have elapsed, then a fault condition exists either in the flow tubes, which is inhibiting their vibration, or in the drive circuitry. Consequently, in the event of such a fault condition, execution proceeds, via the "YES" path from decision block 1429, to execution block 1428, to flag this fault condition and store the corresponding fault code and time/date stamp in the fault stack in NOVRAM. Thereafter, execution proceeds to block 1430 to invoke fault routine 1800. As with block 1420, the user must intervene to reset the system before execution will proceed from block 1430, via dotted paths 1433 and 1401, to entry point A. Alternatively, in the event the flow tubes are properly vibrating, execution will proceed to block 1435, either via the "NO" path from decision block 1426, if the EXCESS DRIVE signal goes low during the thirty second interval, or, via the "NO" path from decision block 1429, once this interval has elapsed.

Block 1435, when executed, sets up the interrupt mask, i.e. this block establishes the priority between the two incoming interrupts, namely the 100 msec interrupt and the time interval ($\Delta t$) measurement complete interrupt. Thereafter, execution proceeds to block 1437 which enables the time interval measurement complete interrupt, which when it occurs invokes time interval measurement interrupt routine 2300. After block 1437 has been executed, block 1439 is executed to establish two software timers. To do so, two software counters, S_COUNT$_1$ and S_COUNT$_2$, are set to pre-defined integer values, TIMEOUT$_1$ and TIMEOUT$_2$, which define the length of corresponding timing intervals. The value of TIMEOUT$_1$ is typically set to the decimal value "20" in order to define a two second interval. In particular, counter S_COUNT$_1$ is decremented and then tested during execution of 100 msec interrupt routine 1900 but is reset to the value TIMEOUT$_1$ during every execution of time interval measurement routine 2300 which occurs approximately every 20 milliseconds. In the event counter S_COUNT$_1$ has been decremented to zero, i.e. during a prior two second interval, then routine 1900, as discussed in detail below, will have detected a fault condition, i.e. no Δt measurement complete interrupts are being generated which are most likely caused by an operational failure in time interval measurement circuit 30 (see FIG. 2), and will respond accordingly. Counter S_COUNT$_2$ is decremented and then tested during execution of time interval measurement routine 2300 but is reset to the value TIMEOUT$_2$ during every execution of 100 msec interrupt routine 1900. In the event counter S_COUNT$_2$ has been decremented to zero, then routine 2300, as discussed in detail below, will have detected a fault condition, probably occurring in the real time clock, and will respond accordingly.

Now, after block 1439 has executed in main program 1400, control passes to block 1441 which performs sensor diagnostics. Here, host microprocessor 205 (see FIG. 2) instructs A/D converter 220 to successively sample and digitize the peak value of each of the velocity signals produced by peak detectors 232 and 234. Each digitized peak value is compared against predefined limits stored in EPROM. Thereafter, the host microprocessor instructs the A/D converter to sample and digitize the DRIVE SIGNAL CONTROL VOLTAGE. The resulting digitized value is also compared against pre-defined limits also stored in EPROM. In the event this diagnostic fails, then execution proceeds, as shown in FIGS. 14A-14D, through the "YES" path of decision block 1442, to execution block 1443. This latter block, when executed, flags the occurrence of a fault condition and stores the corresponding fault code for the failed diagnostic along with its time/date stamp in the fault stack in NOVRAM. Thereafter, block 1444 is executed which invokes fault routine 1800. At this point, the user must intervene to reset the system, before execution will proceed from block 1444, via dotted paths 1445 and 1401, to entry point A. Alternatively, in the event the sensor diagnostics were satisfactorily completed, then execution proceeds to decision block 1447.

Decision block 1447 detects whether the user has depressed the menu pushbutton. If this pushbutton has been depressed, then execution is passed, via the "YES" path from this decision block, to block 1446. When executed, block 1446 invokes menu routine 1500 (see FIGS. 15A and 15B) to successively display various user parameters on an input menu on the LCD display and, if a "secure" switch—as discussed in detail below—is in the "off" position, to permit the user to change the value of any of these parameters. Thereafter, as shown in FIGS. 14A-14D, execution proceeds to block 1452. If, on the other hand, the user has not depressed the menu pushbutton, then execution proceeds, via the "NO" path from decision block 1447, to decision block 1448. This latter decision block, when executed, implements a four second software timer. During an ensuing four second interval, block 1447 is continuously re-executed to determine if the user has depressed the menu pushbutton during this time. Once the timer reaches the end of the four second interval, then execution proceeds, via the "YES" path, from decision block 1448, to block 1451. This block, when executed, accesses the previously stored values of all the user parameters (such as output measurement units, alarm levels, baud rate, parity and serial communication type) from NOVRAM for subsequent use by the system. Execution now proceeds to block 1452 which appropriately configures a selected serial output (either RS-232C or RS-485—see FIG. 2) using appropriate user parameters either obtained from NOVRAM or supplied by the user. Thereafter, as shown in FIGS. 14A-14D, execution proceeds to block 1453 which resets (de-energizes) the fault alarm by energizing relay 265 (see FIG. 2) which, in turn, opens its normally closed contact. As noted, up to this point, relay 265 has not been energized and hence the fault alarm has remained on. Execution next proceeds to block 1455, as shown in FIGS. 14A-14D, to enable the 100 msec interrupt.

At this point, with the 100 msec interrupt having been enabled, execution enters interrupt wait loop and diagnostic routine 1460. While this routine executes, interrupts are allowed to occur and are then appropriately serviced. Whenever an interrupt is not being serviced, this routine, when executing, performs a pre-determined sequence of system diagnostics. Specifically, upon entry into this routine, block 1461 is executed to reset the value of a loop counter, LOOP COUNT, to zero. The value of this counter is incremented by one every time this loop is executed and rolls over at the value "24". The particular diagnostic that is to be executed during any pass through this routine is governed by the count then existing in this counter. In particular, once the loop counter has been reset, execution proceeds to decision block 1463. This decision block tests the status of the +5 volt supply by checking the level of the +5 VOLT STATUS signal appearing on lead 298 (see FIG. 2). In the event the level is low, which indicates an imminent collapse of the +5V supply voltage, then a fault condition occurs. In this case, execution proceeds, as shown in FIGS. 14A-14D, via the "NO" path emanating from decision block 1463, to block 1466. This latter block, when executed, flags the occurrence of a fault condition and then stores a corresponding fault code and time/date stamp in the fault stack in NOVRAM. Execution then proceeds to block 1473 which invokes fault routine 1800. After suitable user intervention, execution exits from block 1473 and proceeds, via dotted paths 1475 and 1401, to entry point A. Alternatively, if the level of the +5 STATUS signal indicates proper operation of the +5 volt supply, then execution proceeds, via the "YES" path emanating from decision block 1463, to decision block 1468. This latter decision block tests whether diagnostics are to be executed by checking the status of the DIAGNOSTIC REQUEST flag. This flag is set during execution of 100 msec interrupt routine 1900. Therefore, as long as this interrupt routine is being executed (the flow rate—even if it is zero—is being updated and the mass flow is being totalized), diagnostics are to be performed. If this interrupt routine is not executing—which indicates a fault condition, then the flag remains reset and diagnostics will not be performed. In the event the DIAGNOSTIC REQUEST flag is not set, then execution merely loops back to block 1463, via the "NO" path emanating from decision block 1468. In the event the DIAGNOSTIC REQUEST flag has been set, the execution proceeds to block 1471, via the "YES" path emanating from decision block 1468. Block 1471, when executed, resets the DIAGNOSTIC REQUEST flag.

Next, block 1477 is executed. This block executes any one of a variety of diagnostic tests depending upon the current value of the loop counter. These diagnostic tests include, as described above: an A/D test, a test of all the power levels, tests of both input channels, a host microprocessor RAM memory test (to save execution time, this test is performed on one quarter of the RAM capacity at a time) and NOVRAM test (again to save execution time, one fifth of the NOVRAM is tested at a time). Inasmuch as sensor errors (faulty tube or velocity sensor) are expected to occur more frequently in the inventive system than any other fault condition, a sensor diagnostic test, i.e. comparisons of both the peak velocity sensor amplitudes and the DRIVE SIGNAL CONTROL VOLTAGE against corresponding limit values—as described above, is interleaved between the execution of any two other diagnostics. Moreover, inasmuch as the DIAGNOSTIC REQUEST flag is reset every 100 milliseconds by 100 msec interrupt routine 1900, a new diagnostic is executed every 100 milliseconds. Twenty four iterations of routine 1460 (occurring over a period 2.4 seconds) are required to fully execute all these diagnostics once. During this period, the sensor diagnostics will have been executed during every other iteration for a total of twelve times and all the remaining diagnostics will execute once during the remaining twelve iterations: one iteration for the A/D test, one iteration for the test of the power levels, one iteration for the input channel test, four iterations for one complete host microprocessor RAM test and five iterations for one complete EPROM test. Now, in the event the diagnostic being executed during any iteration fails, decision block 1479 routes execution, via its "YES" path, to block 1482. This block flags the occurrence of a fault condition, and stores the corresponding fault code for the failed diagnostic along with the corresponding time/date stamp in the fault stack in NOVRAM. Execution then proceeds to block 1484 to invoke fault routine 1800. This routine is terminated only after user intervention, in which case, execution proceeds, via dotted paths 1485 and 1401, to entry point A. Alternatively, if the diagnostic currently being executed is then satisfactorily completed, execution proceeds, via the "NO" path from decision block 1479, to execution block 1487 to increment the value of the loop counter by one. Thereafter, decision block 1489 is executed to test the value of the loop counter (LOOP COUNT). If the value of the loop counter has not reached "24", then execution proceeds, via the "NO" path emanating from decision block 1489, to path 1493 and from there back to decision block 1463. If, however, the value of this counter has reached "24", then execution proceeds, via the "YES" path from decision block 1489, to block 1492 which resets the value of the loop counter to zero. Thereafter, execution is routed back to block 1463, via path 1493, to essentially re-execute interrupt wait loop and diagnostic routine 1460 while waiting for the next interrupt to occur.

2. Menu Routine 1500

A flowchart of Menu Routine 1500 is depicted in FIGS. 15A and 15B, with the correct alignment of the drawing sheets for these figures shown in FIG. 15. This routine, as noted, essentially displays a sequential menu of user parameters and selectively allows the user to change the values of these parameters. In addition, given various selections made by the user, this routine also calculates corresponding alarm limit values and output scaling constants for subsequent use.

Menu Routine 1500 is only executed when the current mass flow rate equals zero or, via block 1447 (see FIGS. 14A-14D) whenever the system is reset. Therefore, upon entry into this routine, as shown in FIGS. 15A and 15B, decision block 1501 is executed to determine whether the current value of the mass flow rate equals zero. Specifically, the value of the variable RATE is accessed from NOVRAM. This value, as discussed below in connection with 100 msec interrupt routine 1900, is the current measured value of the mass flow rate unless its value is below a zero flow cutoff value, in which case, the value of RATE is set to zero. If the value of RATE is not zero, then execution exits from menu routine 1500, via the "NO" path emanating from decision block 1501. Alternatively, if the value of RATE equals zero, then execution proceeds to block 1506, via the "YES" path emanating from decision block 1501, to execute the rest of menu routine 1500.

Next, execution proceeds to decision block 1506. This block determines whether the user has requested the system to print a ticket. Specifically, a ticket printer can be interfaced to the system, via the RS-232C port (see FIG. 2). When instructed to do so by the user, the system will print totalized flow information and a time/date stamp on a ticket. Immediately prior to the transfer of a product, the value of the resettable totalizer can be reset to zero and will thereafter totalize the mass flow of the product that will be then be transferred. After the custody transfer has taken place, the ticket can be given to the party receiving the product as documentary evidence of the contemporaneous transfer. Hence, if the user has instructed the system to print a ticket, execution proceeds, as shown in FIGS. 15A and 15B, via the "YES" path from decision block 1506 to block 1509. This latter block accesses the value of both totalizers (the resettable and inventory totalizers) stored in NOVRAM and the time/date values from the real time clock and appropriately instructs the ticket printer to print this information. Thereafter, execution proceeds to block 1512. Alternatively, if a ticket is not to be printed, then execution proceeds, via the "NO" path from this decision block, directly to block 1512. When the user pushes the menu pushbutton, block 1512 executes and displays the value of the inventory totalizer as the next menu item appearing on the LCD display.

Figure 16B:
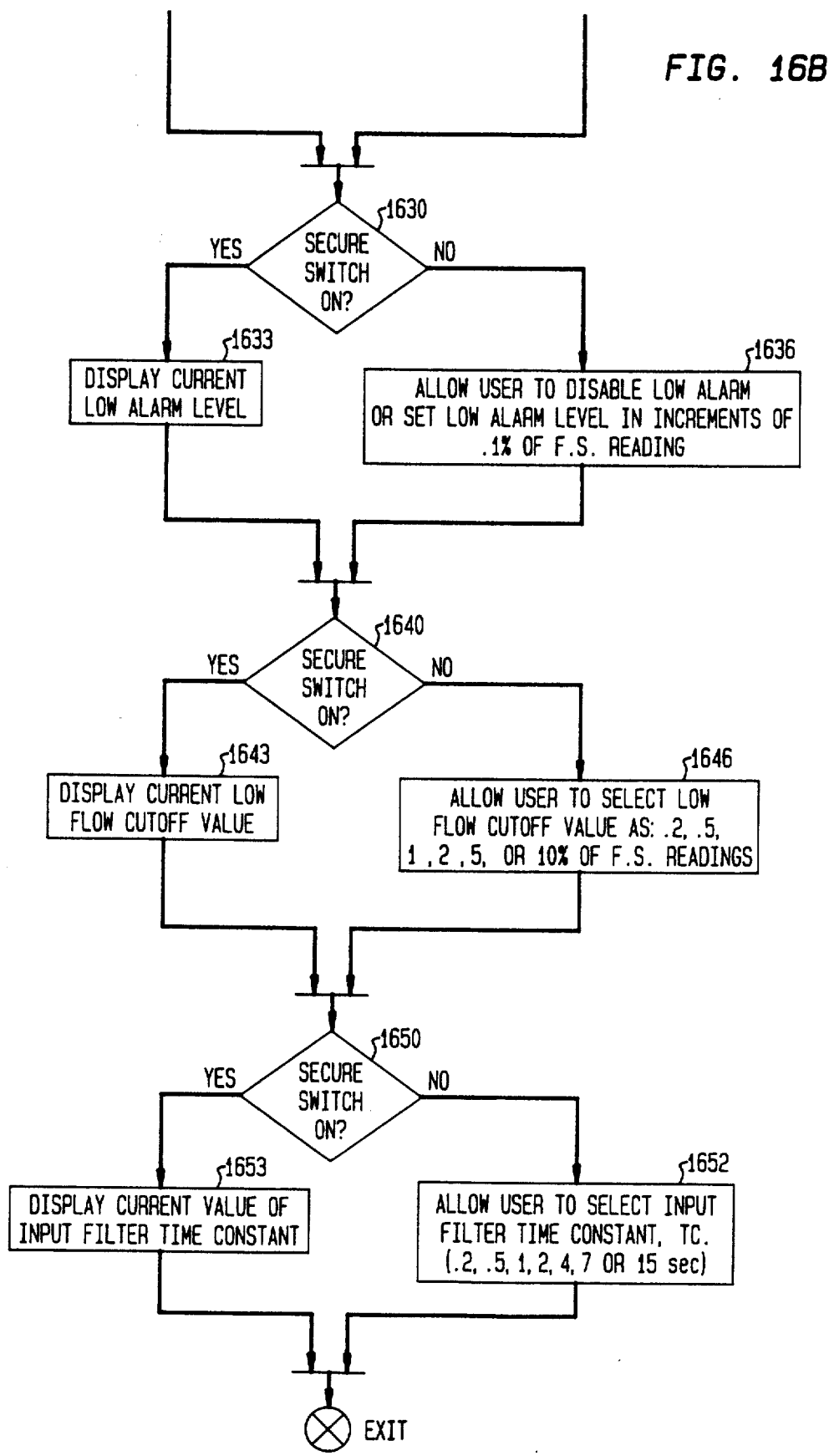

Thereafter, execution proceeds to block 1514 to execute scaling parameter input routine 1600 shown in detail in FIGS. 16A-16B. As discussed in detail below, this routine displays one of a succession of scaling parameters, i.e. mass flow and mass flow rate output measurement units and alarm level values, at each successive depression of the menu pushbutton. The user can change the value of any of these scaling parameters only if the secure switch is in an "off" position. Thereafter, once routine 1600 has fully executed, blocks 1521 and 1524, as shown in FIGS. 15A and 15B, are sequentially executed to allow the user to program the frequency output. In particular, block 1521, when executed, displays the current value of the span of the frequency output and permits the user to select any desired span (e.g. 500 Hz, 1 kHz, 5 kHz, 10 kHz), using the increase/decrease pushbuttons. Once the span has been selected, execution proceeds to block 1524. This block, after the menu pushbutton has been depressed again, displays the full scale percentage for the frequency output and permits the user to change the value of the percentage using the increase/decrease pushbuttons. This value of this percentage equals the percentage of the full scale flow that will produce the full scale output frequency. Once the frequency output has been fully programmed, execution proceeds to block 1527 to program the V/I analog output, i.e. V/I converter 273 shown in FIG. 2. As discussed, this converter is configured in hardware to provide either a current or a voltage output signal. The output modes for this converter are either 0-20 mA or 4-20 mA for current output and either 0-5 volts or 1-5 volts for voltage output. Specifically, as shown in FIGS. 15A and 15B, block 1527, executed after the user again presses the menu pushbutton, displays the current output mode of the converter and permits the user to select a desired mode using the increase/decrease pushbuttons. Thereafter, when the user again presses the menu pushbutton, execution proceeds to block 1530 which, when executed, displays the full scale percentage for the V/I output and permits the user to change the value of the percentage using the increase/decrease pushbuttons. This value of this percentage equals the percentage of the full scale flow that will produce a full scale output signal on the V/I output. Now, after the user again presses the menu pushbutton, execution proceeds to block 1533 which invokes serial communication parameter entry routine 1700 which is shown in FIG. 17 and discussed in detail below. This routine successively displays one of the following parameters at each depression of the menu pushbutton: the type (e.g. RS-232C, RS-485 or none), baud rate and parity for serial communication. The user can change the value of these parameters only if the secure switch has been placed in its "off" position. Thereafter, execution proceeds to block 1536 which permits the user to sequentially display the last 25 entries (fault code and associated time/date stamp) in the fault stack. The user can examine these entries both forward (the oldest entry to the most recent) and backward by appropriately depressing the increase or decrease pushbuttons.

Now, after the user again depresses the menu pushbutton, execution proceeds to decision block 1537 to determine if the secure switch is in its "on" position. If the secure switch is not in this position, execution passes to block 1539. This block reads the current time and date from real time clock 215 (see FIG. 2) and displays the resulting information on the LCD display. The user can change the date using the increase/decrease pushbuttons to increment or decrement the date and thereafter, once the menu pushbutton has been depressed, change the time in a similar fashion. After the menu pushbutton has been depressed, the new time and date values are loaded by host microprocessor 205 into real time clock 215 (see FIG. 2). Execution then proceeds, as shown in FIGS. 15A and 15B, to decision block 1540. Alternatively, if the secure switch is in its "on" position, then execution is routed, via the "YES" path from decision block 1537, to block 1538 which, when executed, merely displays the current time and date on the LCD display.

At this point, execution now proceeds to decision block 1540 which determines whether the user has changed the mass output units from those previously selected. If so, then execution proceeds, via the "YES" path emanating from decision block 1540, to block 1542 to reset the totals stored in both the inventory and resettable mass flow totalizers both situated in NOVRAM. If these totalizers were not reset, then the past and present output measurement units would not match and a conversion of the inventory total to the present units would be necessary to insure continued accurate historical totalization. To simplify processing, the contents of these totalizers are simply reset to zero at this point. This is the only point, in the software, at which the inventory totalizer is reset. Inasmuch as the output measurement unit can only be changed with the secure switch in the "off" position, the value of the totalizer will only be reset, if at all, during the time when the secure switch is in its "off" position. Execution then proceeds from block 1542 to block 1545. In the event the output measurement unit has not been changed, then execution simply proceeds, via the "NO" path emanating from decision block 1540, to block 1545.

Block 1545, when executed, calculates numerical values of high/low alarm limits, low flow cutoff, and the frequency and V/I scaling constants in terms of normalized mass units. Previously, the user has selected a percentage value in terms of a full scale reading for each of these two limits, as well as form the low flow cutoff value and the two scaling constants during execution of scaling parameter input routine 1600. As such, block 1545 simply multiplies each selected percentage by an appropriate factor, which has been previously stored in EPROM, to obtain an associated normalized numerical value.

Subsequently, execution proceeds to decision block 1548 which checks the status of the +5 volt supply by detecting the level of +5 VOLT STATUS signal on lead 298 (see FIG. 2). In the event the power supply is properly operating, execution proceeds, via the "YES" path emanating from decision block 1548 shown in FIGS. 15A and 15B, to block 1557 which, when executed, saves all the calculated parameters and user selections in NOVRAM for subsequent use. Thereafter, execution exits from menu routine 1500 and returns to main program 1400 in a normal fashion, i.e. to block 1452 (see FIGS. 14A-14D). Alternatively, in the event the level on lead 298 is low, a fault condition has occurred in the ±5 volt supply. In this case, as shown in FIGS. 15A and 15B, execution proceeds, via the "NO" path emanating from decision block 1548, to block 1551. Block 1551, when executed, flags the occurrence of a fault condition and stores the corresponding fault code and time/date stamp as the most recent entry in the fault stack in NOVRAM. Thereafter, block 1554 is executed to invoke fault routine 1800. After the user has intervened to clear the fault condition, execution passes from block 1554 to entry point A in host microprocessor main program 1400 to re-initialize the host system.

3. Scaling Parameter Input Routine 1600

A flowchart of Scaling Parameter Input Routine 1600 collectively appears in FIGS. 16A and 16B, with the correct alignment of the drawing sheets for these figures shown in FIG. 16. As previously discussed, this routine displays a sequence of output parameters and permits the user to change the value of any of these parameters only if the secure switch is in its "off" position.

Specifically, upon entry into this routine, decision block 1601 is first executed to determine whether the secure switch is in its "on" position. If this switch is in its "off" position, indicating that the user has access to change various output parameters, then execution proceeds, via the "NO" path emanating from decision block 1601, to block 1606 to permit the user to select desired output mass flow and mass flow rate measurement units for purposes of the LCD display, and for the scaled pulse output unit, the frequency output and the V/I analog output. In particular, block 1606 first reads the meter size parameter, filter time constant and the vernier index parameter from a set of input switches (typically various hex switches). The meter size parameter has been set at the factory to a particular value that corresponds to the size (maximum flow rate) of meter assembly 10 (see FIG. 1) that is to be connected to meter electronics 20. All possible values are stored in a measurement unit table in EPROM. The particular value of the meter size parameter read from these switches is used to sequentially access a set of permissible output measurement units for that meter from that table. For example, for a D600 size Coriolis mass flow meter manufactured by Micro Motion, Incorporated (the present assignee), the permissible mass units would be pounds, tons, and kilograms; and the permissible mass flow units would be pounds/second, tons/second, tons/minute, kilograms/second and kilograms/minute. For a relatively small meter, such as the D12 size meter also manufactured by Micro Motion, Incorporated, the permissible mass units would be pounds, ounces and kilograms, and the permissible mass flow units would be pounds/minute, pounds/hour, ounces/second, ounces/minute, ounces/hour, kilograms/minute, and kilograms/hour. The user can step through the accessed set of units using the increase/decrease pushbuttons to select appropriate output mass and mass flow units. The values of the filter time constant (F CONSTANT) and vernier index (V INDEX) are merely read from the input switches. Once block 1606 has fully executed, execution passes to block 1607. This latter block, when executed, causes host microprocessor 205 to download values of the filter time constant and vernier index, via bi-directional data lines 36 (see FIG. 2), into time interval measurement circuit 30, as discussed above. Thereafter, the user presses the menu pushbutton which advances execution to decision block 1610. Alternatively, if the secure switch is in its "on" position, then execution proceeds, via the "YES" path from decision block 1601, to block 1603 which, when executed, merely displays the current output mass and mass flow measurement units on the LCD display. Pressing the menu pushbutton causes execution to proceed to block 1610.

Decision block 1610 again tests the status of the secure switch. If the switch is in its "off" position, execution then proceeds, via the "NO" path from this decision block, to block 1616. This latter block, when executed, uses the previously read meter size value to sequentially access the measurement unit table stored in EPROM to provide a corresponding list of output measurement units for the scaled pulse output (such as one scaled pulse output per every 0.001, 0.01, 0.1, 1, 10, 100 or 1000 totalized units with a maximum scaled pulse output frequency of 10 Hz). The user can step through this list and select an appropriate measurement unit using the increase/decrease pushbuttons. Alternatively, if the secure switch is in its "on" position, then execution proceeds, via the "YES" path from decision block 1610, to block 1613 which, when executed, merely displays the current scaled pulse output measurement unit. Thereafter, at the next depression of the menu pushbutton, execution proceeds to decision block 1620 from either block 1613 or 1616. Decision block 1620 again tests the status of the secure switch. Depending upon the status of this switch, execution will proceed either to block 1626 or 1623 if the switch is respectively in its "off" or "on" position. If block 1626 is executed, the user can either selectively disable the high alarm, or set the high alarm level in increments of 0.1% from 5% to 150% of the full scale (F.S.) reading using the increase/decrease pushbuttons to incrementally raise or lower the high alarm level as desired. After the menu pushbutton is again depressed, execution then proceeds to decision block 1630. Alternatively, if block 1623 is executed, then the current value (percentage of full scale reading) of the high alarm level is merely displayed on the LCD display. Thereafter, the user depresses the menu pushbutton to pass execution to block 1630. Blocks 1630, 1633 and 1636 function in a similar manner to blocks 1620, 1623 and 1626 to either permit the user to either selectively disable the low alarm or select an appropriate value of the low alarm limit in increments of: 0.1% from 1 to 100% of full scale reading, or merely display the current value of the low alarm level.

Execution advances to decision block 1640 at the next depression of the menu pushbutton. This block again tests the status of the secure switch. If the switch is in its "off" position, execution then proceeds, via the "NO" path emanating from this decision block, to block 1646. This latter block, when executed, allows the user to set the low flow cutoff value to 0.2, 0.5, 1, 2, 5 or 10% of the full scale reading using the increase/decrease pushbuttons to respectively step up or down through the permitted low flow cutoff values as desired. In the event the measured mass flow rate falls below the selected low flow cutoff value, then, as discussed in detail below in conjunction with the 100 msec interrupt routine 1900, the displayed flow rate is set to zero and totalizing stops while the measured mass flow rate remains below the low flow cutoff value. In this case, the frequency and scaled pulse outputs are also set to zero. Only the analog V/I and flow direction outputs continue to provide an indication of the actual mass flow. All these outputs return to normal as soon as the measured flow exceeds the low flow cutoff value. Once block 1646 has executed and the user has again depressed the menu pushbutton, then execution proceeds to block 1650. Alternatively, if the secure switch is in its "on" position, then execution proceeds, via the "YES" path emanating from decision block 1640 to block 1643 which merely displays the current value of the low flow cutoff as a percentage of full scale reading. As soon as the user depresses the menu pushbutton, execution proceeds from block 1643 to decision block 1650.

Block 1650 again tests the status of the secure switch. If the switch is in its "off" position, execution then proceeds, via the "NO" path from this decision block, to block 1656. This latter block, when executed, allows the user to set the time constant (TC) of an input digital filter to 0.2, 0.5, 1, 2, 4, 7 or 15 seconds using the increase/decrease pushbuttons to incrementally select a larger or smaller time constant as desired. Alternatively, if the secure switch is in the "on" position, then execution proceeds, via the "YES" path from decision block 1650, to block 1653 which merely displays the current value of the input filter time constant. Once block 1653 or 1656 is executed, execution exits from this Scaling Parameter Input Routine 1600.

4. Serial Parameter Entry Routine 1700

A flowchart of Serial Parameter Entry Routine 1700 appears in FIG. 17. As previously discussed, this routine sequentially displays the type, baud rate and parity that defines the operation of serial interface 255 (see FIG. 2). This routine permits the user to change the value of any of these items only if the secure switch is in its "off" position.

In particular, upon entry into this routine as shown in FIG. 17, host microprocessor 205 (see FIG. 2) selectively displays or changes the values of three successive parameters used for serial communication: the type of serial communication, the baud rate and the parity. Specifically, as shown in FIG. 17, decision block 1710 is first executed to determine if the secure switch is in its "on" position. If the switch is not in this position, execution passes to block 1717. This block, when executed, allows the user to select the type of serial communication that will be provided by the inventive system through serial interface 255 (see FIG. 2), i.e. none for no serial communications, or either RS-232C for local communication or RS-485 for network communication. The user makes his choice by depressing either the increase or decrease pushbuttons to select among these three alternatives. Once this selection has been made, it is stored in NOVRAM by block 1717. After this has occurred and after the user again depresses the menu pushbutton, execution proceeds to decision block 1720. Alternatively, if the secure switch is in its "on" position, then execution is routed as shown in FIG. 17, via the "YES" path from decision block 1710, to block 1714 which merely displays the type of serial communication that is presently in use. Depressing the menu pushbutton advances execution to decision block 1720.

Decision block 1720, when executed, also determines if the secure switch is in its "on" position. If the switch is not in this position, execution passes, via the "NO" path from this decision block, to block 1727. This latter block, when executed, allows the user to set the baud rate to any standard value between 150 baud–19.2 kBaud inclusive (e.g. 150, 300, 1200, 2400, 4800, 9600 and 19.2 kBaud) using the increase/decrease pushbuttons to raise or lower the baud rate, as desired. Once this selection has been made, it is stored in NOVRAM by block 1727. After this has occurred and after the user again depresses the menu pushbutton, execution proceeds to decision block 1730. Alternatively, in the event the secure switch is in its "on" position, then execution proceeds to block 1724 via the "YES" path emanating from decision block 1720. Block 1724, when executed, merely displays the current baud rate on the LCD display. Thereafter, at the next depression of the menu pushbutton, execution advances to decision block 1730. Decision block 1730, when executed, also determines if the secure switch is in its "on" position. If the switch is not in this position, execution passes, via the "NO" path emanating from this decision block, to block 1737. This latter block, when executed, allows the user to set the parity to odd, even or none by depressing either the increase or decrease pushbutton to successively step through the permitted parity choices, as desired. Alternatively, in the event the secure switch is in its "on" position, then execution proceeds to block 1734 via the "YES" path emanating from decision block 1730. Block 1734, when executed, merely displays the current parity selection on the LCD display. Once block 1734 or block 1737 is executed, execution exits from Serial Parameter Entry Routine 1700.

5. Fault Routine 1800

A flow chart of Fault Routine 1800 is shown in FIG. 18. As discussed, this routine sets the fault alarm, disables drive circuit 40 (see FIG. 4) and then continuously displays the latest entry in the fault stack (fault code and corresponding time/date stamp) until the user intervenes to reset the system which clears the fault condition.

Specifically, as shown in FIG. 18, upon entry into routine 1800 execution first proceeds to block 1810. This block, when executed, sets the fault alarm by merely de-energizing fault relay 265 (see FIG. 2) through bus interface 261. Since the fault alarm is connected through the normally closed contacts of this relay, de-energizing this relay will activate the alarm. Thereafter, as shown in FIG. 18, execution passes to block 1815 to disable drive circuit 40 by applying a low level as the DRIVE ENABLE signal appearing on lead 242 (see FIG. 2). This, in turn, as noted above, allows the flow tubes to cease vibrating. This also advantageously prevents the tubes from being damaged throughout the remainder of the fault condition. Once block 1815 has executed, execution passes, as shown in FIG. 18, to block 1820 to display the latest entry in the fault stack (fault code and accompanying time/date stamp) on the LCD display. Thereafter, execution proceeds to decision block 1830 which tests whether the user has depressed the clear pushbutton. If the user has depressed this pushbutton, then execution proceeds, via the "YES" path emanating from decision block 1830, to exit routine 1800 and subsequently return to entry point A in host microprocessor main program 1400 to re-initialize the host system. Alternatively, in the event the user has not depressed the clear pushbutton, then execution proceeds, from the "NO" path of decision block 1830, to decision block 1840. This latter decision block tests whether a clear instruction has been received by serial interface 255 (see FIG. 2) over either a local (RS-232C) or a network (RS-485) connection. If, on the one hand, such an instruction has been serially received, then execution proceeds, via the "YES" path emanating from this decision block, to exit routine 1800. On the other hand, if a clear instruction has not been serially received, then execution loops back to block 1820, via "NO" path 1845 emanating from decision block 1840. As long as the system has not been reset, execution remains in a loop consisting of blocks 1820, 1830 and 1840.

6. 100 msec Interrupt Routine 1900

Figure 19B:
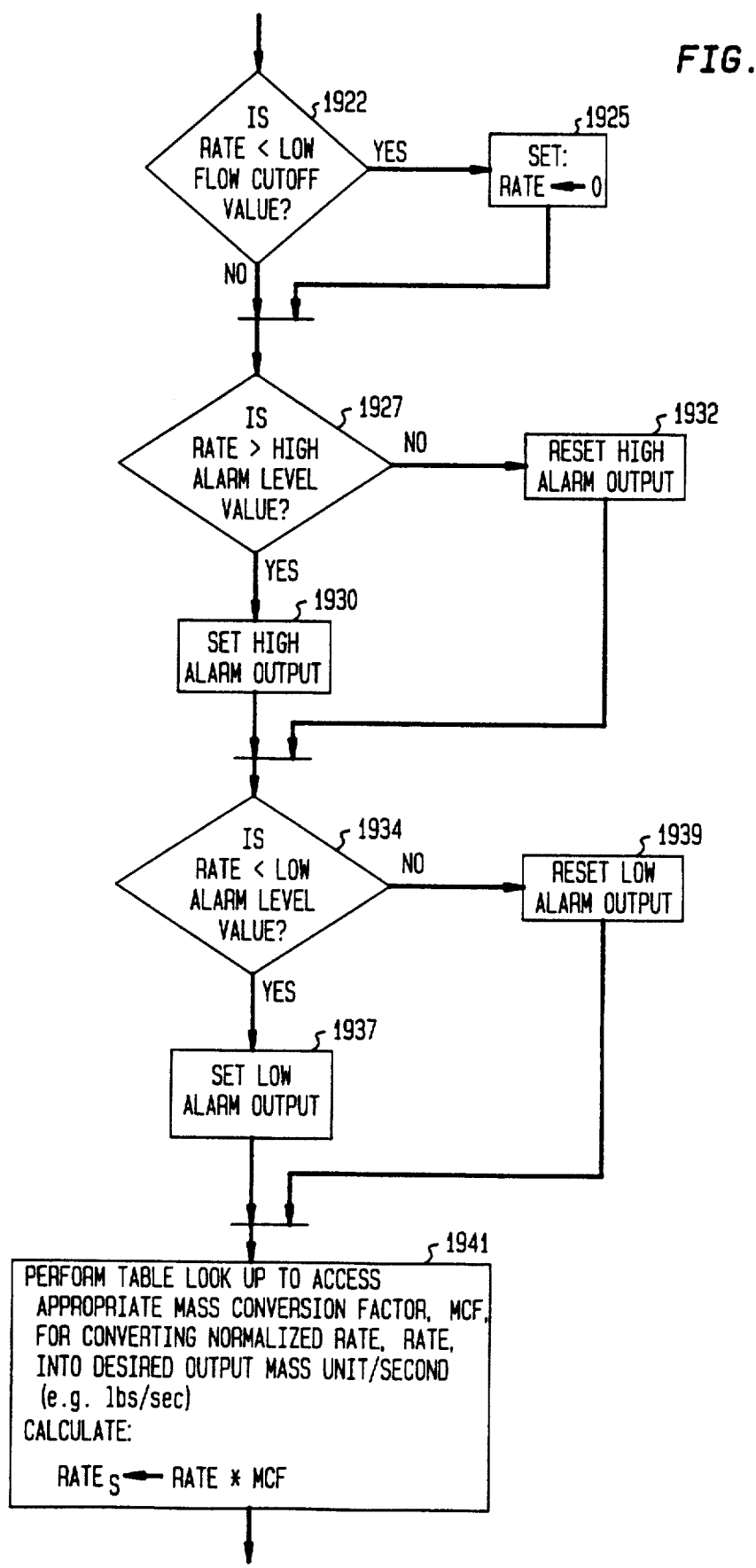
Figure 19C:
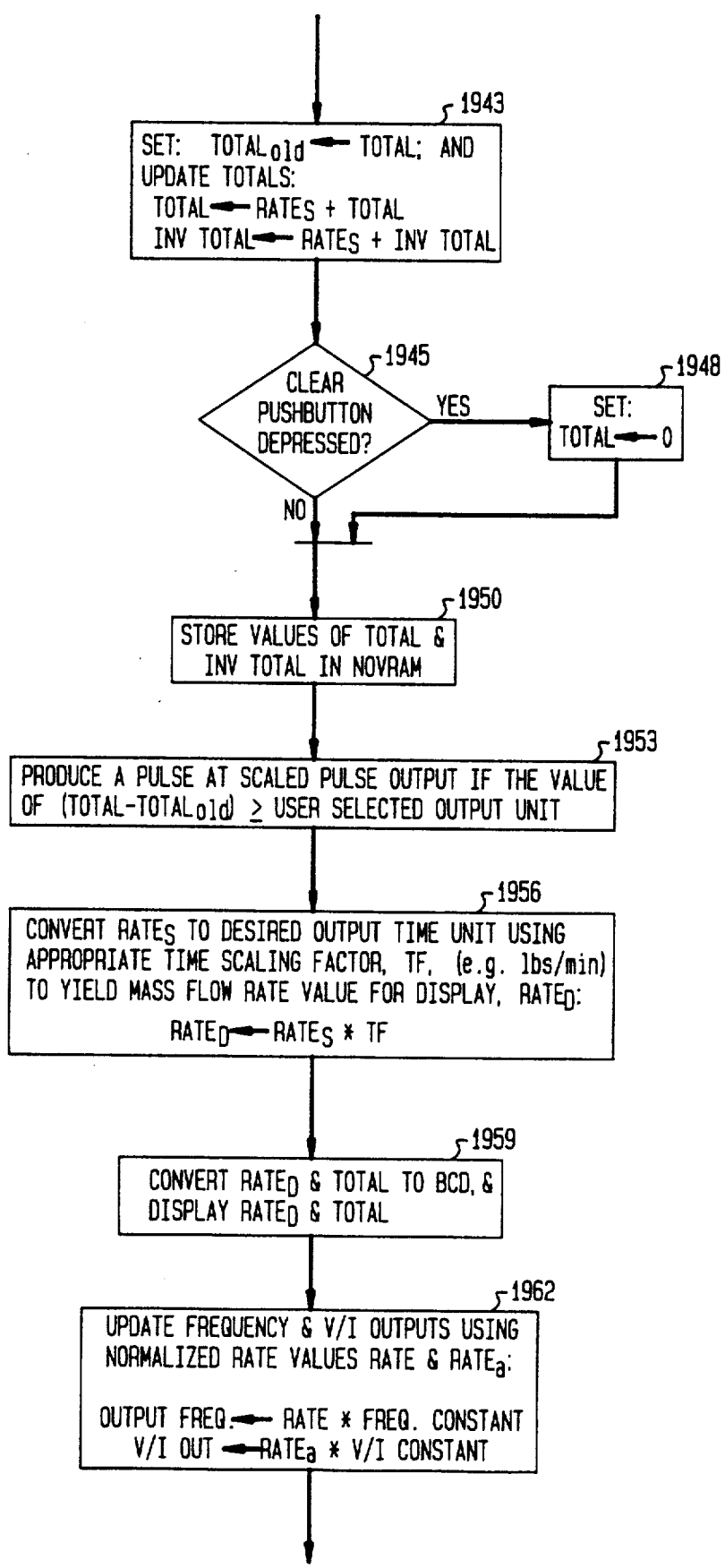
Figure 19D:
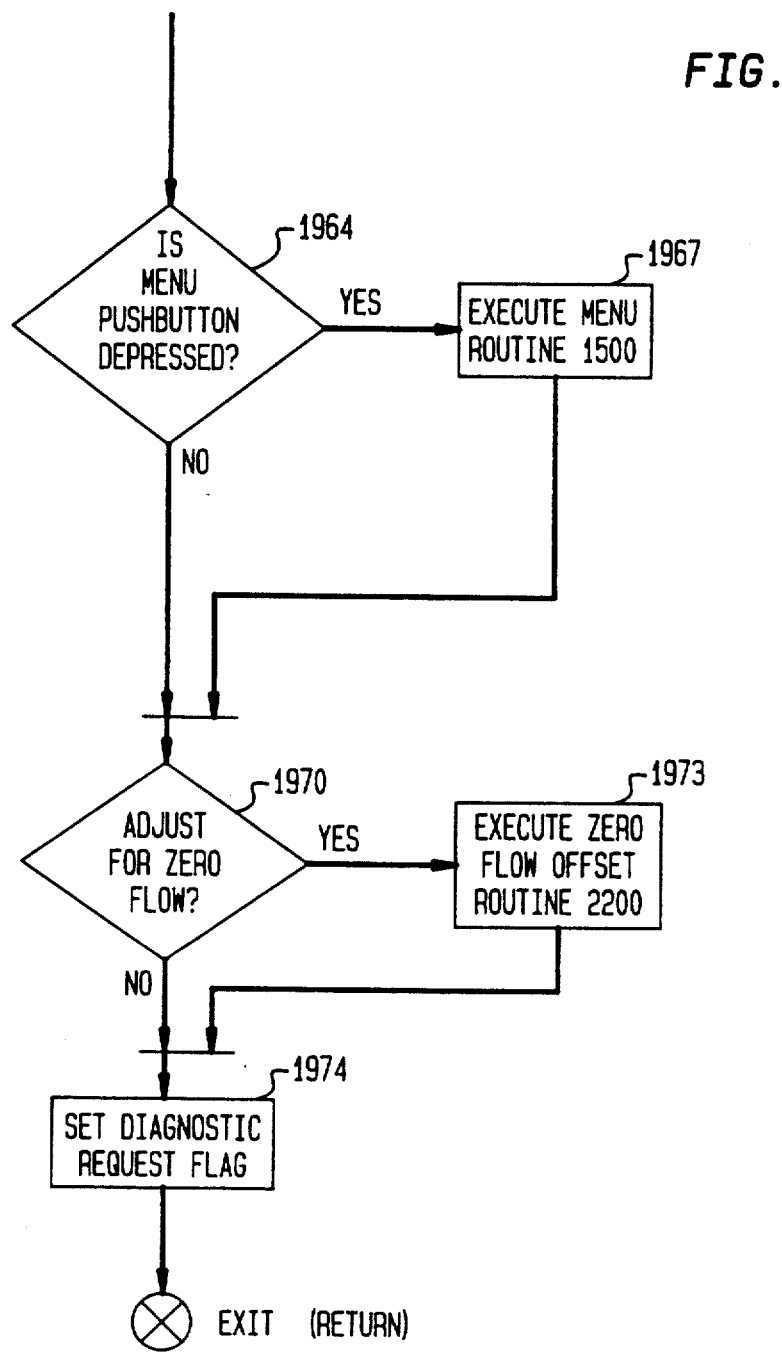

A flowchart of 100 msec Interrupt Routine 1900 is depicted in FIGS. 19A-19D, with the proper alignment of the drawing sheets shown in FIG 19. Execution of this routine is initiated every 100 milliseconds by the occurrence of a timing pulse from real time clock 215, as previously discussed below, and applied to an interrupt line of host microprocessor 205 (see FIG. 2). During is execution, this routine, as discussed, calculates the latest value of mass flow rate, updates the flow totals and displays the results, and performs various diagnostics.

Specifically, decision block 1901 is first executed upon entry into this routine as shown in FIGS. 19A-19D. This block checks the output of timer 290 (the watch dog timer—see FIG. 2) to determine whether the timer has reached the end of its 100 millisecond timing interval. This timer is reset to zero, approximately every 20 milliseconds, by each execution of time interval measurement routine 2300, as described in detail below. If the watch dog timer has timed out, this indicates that time interval measurement interrupt routine 2300 is not executing. Since this is a fault condition, execution proceeds as shown in FIGS. 19A-19D, via the "YES" path from decision block 1901, to block 1903. This latter block flags the fault condition and enters the corresponding fault code and time/date stamp as the latest entry in the fault stack in NOVRAM. Execution then proceeds to block 1905 which invokes fault routine 1800. After the user has intervened to clear the fault condition, execution is routed from block 1905 to entry point A in host microprocessor main program 1400 to re-initialize the host system. In addition, if watch dog timer 290 times out, this timer also causes a fault alarm by applying a low level to WATCH DOG TIMER OUTPUT line 292 which directly de-energizes relay 265 (see FIG. 2). This direct link to relay 265 from timer 290 is necessary to indicate a fault condition in the event the host microprocessor has ceased to operate. Alternatively, in the event the watch dog timer has not reached the end of its timing interval, then execution proceeds, via the "NO" path from decision block 1901, to block 1904.

Block 1904, when executed, resets the contents of software counter S_COUNT$_2$ to the value TIMEOUT$_2$. As discussed above, this counter is decremented and tested by time interval measurement routine 2300 to determine if the 100 msec interrupt routine has ceased executing which is a fault condition that is due most likely to an operational failure of the real time clock. Once block 1904 has executed, execution passes to block 1906 which decrements the current contents of software counter S_COUNT$_1$ by one. As discussed above, the contents of this counter are decremented by one each time the 100 msec interrupt routine executes but is reset by execution of time interval measurement interrupt routine 2300. Once this counter has been decremented, execution proceeds to decision block 1907. This decision block tests the current contents of counter S_COUNT$_1$ to determine if they equal zero in which case the associated software timer has timed out. In the event routine 2300 has not executed during a two second period, a fault condition has occurred, probably involving time interval measurement circuit 30 (see FIGS. 2 and 3). When this fault condition occurs, block 1906 during twenty successive iterations through 100 millisecond interrupt routine 1900 will eventually decrement the contents of counter S_COUNT$_1$ to zero. As such, once the contents of this counter equals zero, then execution proceeds, via the "YES" path from decision block 1907, to block 1908. This latter block, when executed, flags the fault condition and stores the corresponding fault code along with a time/date stamp as the latest entry in the fault stack in NOVRAM. Thereafter, block 1909 is executed to invoke fault routine 1800, as discussed above. Only after the user intervenes to reset the host system will execution proceed to exit routine 1900 and return to entry point A in the host microprocessor main program 1400 (see FIGS. 14A-14D) to re-initialize the host microprocessor.

Alternatively, if the contents of counter S_COUNT$_1$ have not reached zero, then decision block 1907 routes execution, via its "NO" path, to block 1911. Block 1911, when executed, invokes rate factor calculation routine 2000, shown in FIG. 20 and discussed in detail below. In essence, this routine determines the temperature compensated rate factor (RF) for the particular meter assembly in use. The rate factor is a linear factor that proportionally relates the measured time interval ($\Delta t$) produced by time interval measurement circuit 30 (discussed above in connection with FIG. 3) to the actual mass flow rate of a fluid passing through the meter assembly. To easily calculate mass flow rate for any one of a wide variety of meter sizes, each one of which can have a number of different permissible user selectable output measurement units associated therewith, the rate factor is calculated in normalized units so as to yield a normalized mass flow rate measurement of milligrams/second which is subsequently converted to the appropriate measurement unit just prior to totalization, as will be explained in detail below. Use of normalized calculations advantageously eliminates the need for any intermediate unit conversions of the mass flow rate which, in turn, saves processing time. In any event, the rate factor depends upon the spring constant of the flow tubes. Inasmuch as the value of this constant varies with temperature, rate factor calculation routine 2000 utilizes the tube temperature measurement provided by RTD temperature sensor 190 (see FIGS. 1 and 2) in calculating the rate factor. Once the rate factor calculation has been completed, then, as shown in FIGS. 19A-19D, execution proceeds to block 1914. This block, when executed, first accesses the latest time difference measurement, $\Delta t$, stored in NOVRAM and obtained from time interval measurement circuit 30, specifically through the most recent execution of time interval measurement interrupt routine 2300. At this point, block 1917 is executed to set the flow direction output corresponding to the sign of the current time interval measurement, $\Delta t$.

Now, execution proceeds to block 1920 which calculates the mass flow rate, RATE, normalized in units of milligrams/second, using the following formula:

$$\text{RATE} = \Delta t * \text{RF} \tag{10}$$

where: RF is the rate factor, and also sets the value of a temporary variable, RATE$_a$, equal to the calculated mass flow rate. Thereafter, the calculated mass flow rate is compared, through execution of decision block 1922, against the low flow cutoff value. If the magnitude of the calculated mass flow rate is less than or equal to the low flow cutoff value, then execution is routed, via the "YES" path emanating from decision block 1922, to block 1925 which sets the value of the variable RATE to zero. By contrast, the value of variable RATE$_a$ always remains equal to the actual value of the calculated mass flow rate, regardless of its magnitude. As noted below, the value of variable RATE is used to update all the system outputs (frequency, displayed mass flow and mass flow rate and totalized mass flow) with exception of the analog mass flow rate V/I output which is updated using the value of variable RATE$_a$. Execution then proceeds from block 1925 to decision block 1927. Alternatively, if the calculated value of the mass flow rate exceeds the low flow cutoff value, then execution proceeds, via the "NO" path from decision block 1922, directly to decision block 1927.

Decision blocks 1927 and 1934 determine whether the value of variable RATE falls between the values of the high and low alarm levels. If not, an appropriate alarm is energized. Specifically, decision block 1927 tests the value of the variable RATE against the value of the high alarm level. In the event the value of variable RATE exceeds the value of the high alarm level, then execution proceeds, via the "YES" path from decision block 1927, to block 1930 which sets the high alarm output, i.e. energizes one of solid states relays 263 (see FIG. 2) to activate the high level alarm. Alternatively, if the value of the variable RATE is less than the high level alarm value, then, as shown in FIGS. 19A–19D, execution proceeds to block 1932 which merely resets the high level alarm, i.e. de-energizes it. After either block 1930 or 1932 has been executed, decision block 1934 is executed to test whether the value of the variable RATE is less than the low alarm level value. In the event the value of RATE is less than the low alarm level value, then execution proceeds, via the "YES" path emanating from decision block 1934, to block 1937 which sets the low alarm output, i.e. energizes one of solid states relays 263 (see FIG. 2) to activate the low level alarm. Alternatively, if the value of the variable RATE is greater than the low level alarm value, as shown in FIGS. 19A–19D, then execution proceeds to block 1939 which merely resets the low level alarm, i.e. de-energizes it. At this point, execution proceeds from either block 1937 or 1939, to block 1941.

Block 1941 accesses an appropriate mass conversion factor, MCF, from a look up table given the output mass measurement unit that has been selected by the user. This mass conversion factor is multiplied by the value of the normalized flow rate variable RATE to provide the mass flow rate in the desired output mass units (e.g. pounds, tons, ounces, kilograms, metric tons) on a per second basis, i.e. RATE$_s$, for easy totalization. Thereafter block 1943 is executed to update the mass flow totals. As discussed previously, two mass flow totals are maintained: a user resettable total, TOTAL, and an inventory total, INV TOTAL. First, the previous value of the resettable total is saved in the variable TOTAL$_{old}$ for subsequent use. Then, the scaled mass flow rate is used to update both totals as follows:

$$\text{TOTAL} = \text{RATE}_s + \text{TOTAL} \quad (11)$$

$$\text{INV TOTAL} = \text{RATE}_s + \text{INV TOTAL} \quad (12)$$

At this point, execution proceeds to decision block 1945 to determine whether the user has depressed the clear pushbutton in order to reset the value of the resettable totalizer. If this pushbutton has been depressed, execution is routed, via the "YES" path emanating from decision block 1945, first to block 1948 to clear the value of the resettable totalizer to zero and thereafter to block 1950. As such, the user can reset the value of the resettable total at any time; however, as discussed, the value of the inventory totalizer is reset only in the event mass output unit has been changed. In the event the user has not depressed the clear pushbutton, then execution proceeds directly, via the "NO" path from decision block 1945, to block 1950. Block 1950, when executed, saves the current values of both totalizers in appropriate locations in NOVRAM. Thereafter, execution passes to block 1953 to update the scaled pulse output given the current value of mass flow. Specifically, the difference between the previous and current values of totalized mass flow is calculated to yield the current incremental mass flow that passed through the meter. In the event this incremental mass flow is greater than or equal to the scaled pulse output measurement unit selected by the user (i.e. one scaled pulse output per every 0.001, 0.01, 0.1, 1, 10, 100 or 1000 totalized units), then one pulse is provided at the scaled pulse output. In the event the incremental mass flow is less than the selected unit, then no pulse will be produced at this output; however, the value of the incremental mass flow will be stored and subsequently used in a well known fashion (not shown merely to simplify the figures) during the next iteration through routine 1900 in order to determine if a scaled pulse should be produced at that time. As noted, the maximum frequency of this output is limited to 10 Hz to permit mechanical totalizers to be driven by this output.

Now, at this point, the value of the scaled mass flow rate, RATE$_s$, which is measured in seconds, is now scaled to the appropriate time unit (e.g. minutes, hours) previously selected by the user to yield a mass flow rate measurement, RATE$_D$, scaled to both the mass and time units that have been selected by the user. This is accomplished within block 1956 which, when executed, multiplies the scaled mass flow rate, RATE$_s$, by an appropriate time conversion factor, TF. All the permitted values of conversion factor TF (e.g. 60 or 3600) are stored in a table. The appropriate value of this factor is accessed using the output unit that has been previously selected by the user during execution of menu routine 1500, as discussed above in conjunction with FIGS. 15A and 15B. Once these operations have been completed, then, as shown in FIGS. 19A–19D, execution proceeds to block 1959 which first converts the current values of RATE$_D$ and the mass flow total, TOTAL, stored in the resettable totalizer into binary coded decimal (BCD) values and then displays these values on LCD display 278 (see FIG. 2). Thereafter, as shown in FIGS. 19A–19D, block 1962 is executed to update the frequency and analog V/I outputs. These outputs are updated by multiplying normalized mass flow rate values RATE and RATE$_a$ by respective scaling constants, FREQ. CONSTANT and V/I CONSTANT, to yield values for the frequency output variable, OUTPUT FREQ, and V/I output variable, V/I OUT, respectively. The values of these constants have been previously calculated by execution of block 1545 in menu routine 1500 (see FIGS. 15A and 15B) and are now merely read from NOVRAM. Since the value of RATE$_a$ (which is not reset to zero if the mass flow rate is below the zero flow cutoff value) is multiplied by the V/I CONSTANT to generate the value of variable V/I OUT, the analog V/I output provides a proportional representation of the mass flow rate even if the mass flow rate is less than the zero flow cutoff value. In contrast, since the value of the variable RATE is used to generate variable OUTPUT FREQ, the frequency output becomes zero for any measured mass flow rate less than or equal to the low flow cutoff value. The value of variable OUTPUT FREQ is used by host microprocessor 205 (see FIG. 2) to set the output frequency of the frequency output.

Thereafter, as shown in FIGS. 19A–19D, execution proceeds to decision block 1964 which determines whether the user has depressed the menu pushbutton. In the event this pushbutton has been depressed, execution proceeds to block 1967 which, when executed, invokes menu routine 1500. This permits the user to sequence through the menu after host microprocessor 205 (see FIG. 2) has been initialized and while execution remains within interrupt wait loop and diagnostic routine 1460 (see FIGS. 14A–14F). Thereafter, as shown in FIGS. 19A–19D, execution proceeds to decision block 1970. In the event the menu pushbutton has not been depressed, then execution proceeds directly to decision block 1970, via the "NO" path emanating from decision block 1964. Block 1970, when executed, checks the status of a zero flow calibration switch, which as discussed is located within the enclosure of the meter electronics, to determine whether the meter electronics should initiate a zero flow calibration. If this switch is appropriately positioned, execution proceeds to block 1973, via the "YES" path emanating from decision block 1970, to invoke Zero Flow Offset Routine 2200, shown in FIGS. 22A and 22B and discussed in detail later. In essence, this routine measures the time difference associated with a zero mass flow through the meter and stores the resulting offset value (OFFSET) in NOVRAM. This offset value is subsequently used by time interval measurement interrupt routine 2300 in calculating the time difference value, Vt, that is attributable to actual mass flow through the meter. Once routine 2200 has fully executed, then, as shown in FIGS. 19A-19D, execution proceeds from block 1973 to block 1974. Alternatively, if a zero flow calibration is not to be performed, then execution directly proceeds to block 1974, via the "NO" path emanating from decision block 1970. Lastly, block 1974, when executed, sets the DIAGNOSTIC REQUEST flag so as to appropriately instruct the host microprocessor to execute diagnostics while it is subsequently waiting for interrupts to occur, i.e. during execution of interrupt wait loop and diagnostic routine 1460 within host microprocessor main program 1400 (see FIGS. 14A-14D). Once this flag has been set, execution exits from 100 msec Interrupt Routine 1900.

7. Rate Factor Calculation Routine 2000

A flowchart of Rate Factor Calculation Routine 2000 is depicted in FIG. 20. As discussed, this routine calculates a temperature compensated rate factor (RF) for the particular size meter assembly that is connected to the meter electronics 20 (see FIG. 1).

Upon entry into this routine, as shown in FIG. 20, block 2010 is executed which reads the tube temperature as measured by RTD 190 (see FIGS. 1 and 2) and digitized by A/D converter 220. The resulting measured temperature, t a/d, is then digitally filtered, as shown in FIG. 20, by block 2020 to yield filtered temperature value $T_f$. This block, when executed, invokes digital filter routine 2100, shown in FIG. 21 and discussed below. Thereafter, block 2030 is executed to read the meter factor (MF) which has been pre-programmed through a series of input switches (typically five BCD switches) located within the enclosure of the meter electronics. The meter factor is a gain factor which is determined during factory calibration of the particular meter assembly that will be used with the meter electronics. Specifically, this factor represents the gain required by the meter electronics to produce the minimum electrical output value at the minimum flow rate specified for the meter assembly and is specified in units of grams/microsecond/second. This factor will vary from between 0.12639 for a D6 size meter to 1262.5 for the D600 which are the smallest and largest meter manufactured by Micro Motion, Inc. which is the present assignee. In addition, given the meter type, block 2030 accesses, from a look up table stored within EPROM within memory 210 (see FIG. 2), the value of the spring constant, k, that is appropriate for the meter assembly in use, specifically the spring constant of the material used to construct the flow tubes. For example, if this meter assembly uses 316L type stainless steel flow tubes, the spring constant of stainless see, 0.000513, is accessed and used.

At this point, execution passes, as shown in FIG. 20, to decision block 2040 to calculate the rate factor, RF. This factor is a linear function of the meter factor, the spring constant and the filtered temperature value. Since the midpoint of the measured temperature range is referenced to 0 degrees Centigrade, the measured temperature and hence the filtered temperature values can be either positive or negative. To properly the calculate the rate factor which increases with decreasing temperature (the flow tubes increasingly stiffen at colder temperatures), execution first proceeds to decision block 2040 which tests the sign of the filtered temperature value, $T_f$. If the filtered temperature value is positive, then block 2050 is executed to calculate the rate factor as:

$$RF = MF * (1 - k\ T_f). \tag{13}$$

Alternatively if the measured temperature value, $T_f$, is negative, then block 2060 is executed to calculate the rate factor as:

$$RF = .F * (1 + L\ T_f). \tag{14}$$

Once the rate factor is calculated, its value is stored within internal RAM in host microprocessor 205 (see FIG. 2) for subsequent use. Thereafter, execution exits from Rate Factor Calculation Routine 2000 from either block 2050 or block 2060.

8 Filter Routine 2100

A flowchart of Filter Routine 2100 is depicted in FIG. 21. As discussed, this routine is used to digitally filter incoming flow tube temperature measurements. This routine implements a two pole critically damped digital filter.

Upon entry into this routine, bock 2110 is executed to access values of two filter parameters, $T_1$ and $T_2$, that have been previously stored within NOVRAM. The values of both of these filter parameters are initially set to zero during system initialization, as noted above. Once filter parameters $T_1$ and $T_2$ have been accessed, block 2120 is executed to set the value of variable R equal to the value of the current tube temperature measurement, t a/d. Thereafter, block 2130 is executed to update the value of variable R as being the difference between the current tube temperature measurement value, t a/d, and the current value of filter parameter $T_1$. Next, block 2140 is executed to access the value of the filter time constant (TC) that has been previously selected by the user and stored in NOVRAM. Once this occurs, block 2150 is executed to calculate the following equations, which together implement a two pole critically damped filter:

$$T_1 = T_1 + \frac{R}{2^{TC}} \tag{15}$$

and $$T_2 = T_2 + \frac{T_1 - T_2}{2^{TC}}. \tag{16}$$

Once these equations have both been calculated, block 2160 is executed to store the new values of filter parameters $T_1$ and $T_2$ in appropriate locations in NOVRAM for the use during the next iteration through the filter for the next successive flow tube temperature measurement. Finally, block 2170 is executed to appropriately store the filter output value, i.e. the value of filter parameter $T_2$, as the value of the filtered tube temperature, $T_f$, in NOVRAM. Thereafter, execution exits from Filter Routine 2100.

9. Zero Flow Offset Routine 2200

Figure 22B:
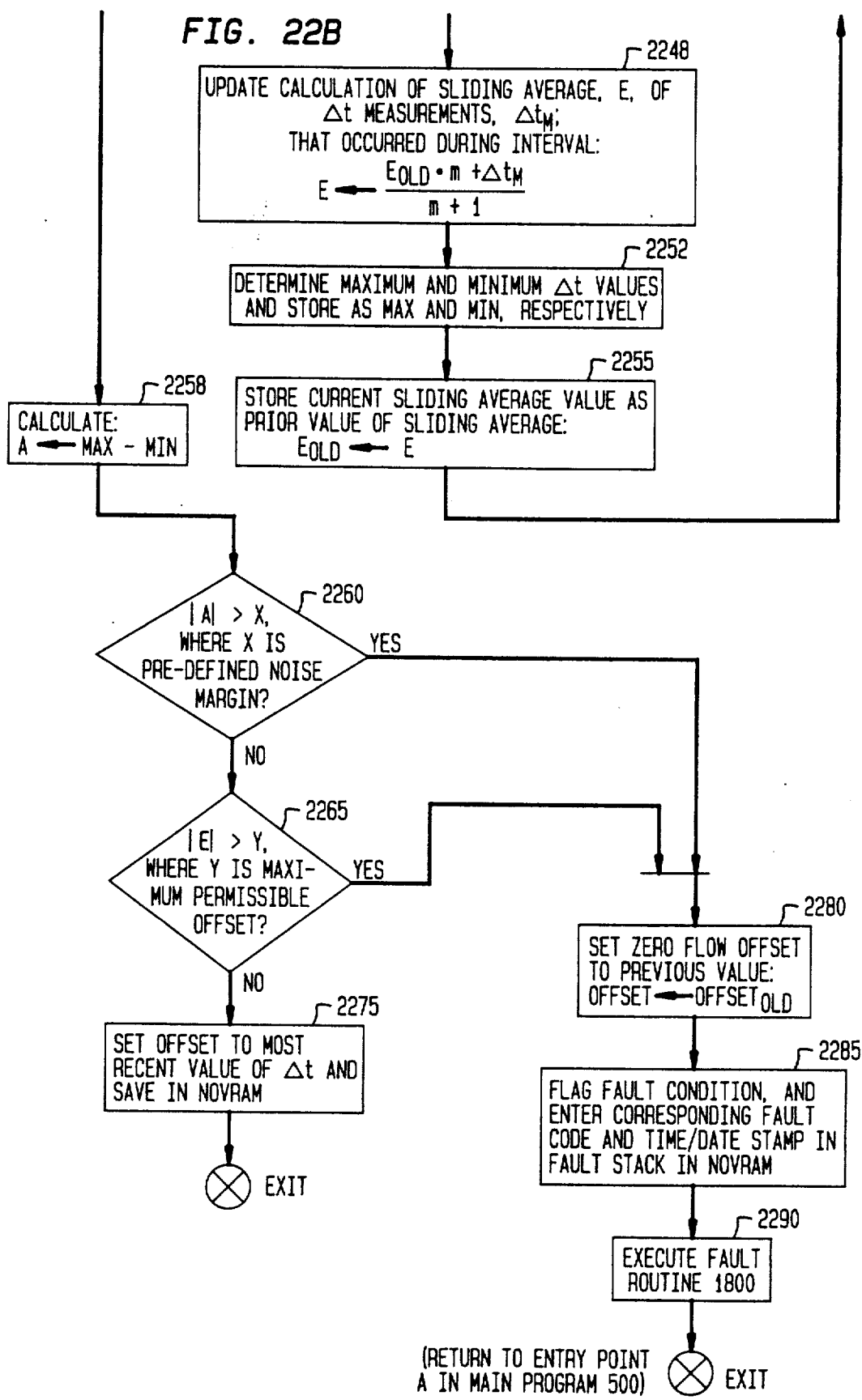

A flowchart of Zero Flow Offset Routine 2200 is depicted in FIGS. 22A and 22B, with the correct alignment of the drawing sheets for these figures shown in FIG. 22. As discussed, this routine measures time differences associated with zero flow through the meter assembly and thereafter generates an appropriate offset value, OFFSET, which is stored in NOVRAM for subsequent use. As discussed, this routine is invoked by setting the zero flow calibration switch, located within the enclosure of the meter electronics, to an appropriate position. No flow must be occurring through the meter during the entire interval of time that this routine is executing.

Upon entry into this routine, block 2205 is executed to display an appropriate banner, such as "ZERO FLOW CAL. IN PROGRESS" in order to indicate the status of the system to the user during execution of this routine. Thereafter, execution proceeds to block 2210 which, when executed, saves the previous values of the zero flow offset as OFFSET$_{old}$. This value is preserved for possible subsequent use as the current zero flow offset in the event a fault condition occurs, as described below. Next, block 2215 is executed to set the current value of the zero flow offset to zero. Thereafter, execution passes to block 2220 which, when executes, waits to a sufficiently long interval of time, e.g. thirty seconds, to elapse in order to assure that substantially all transients, if any, appearing in the Δt measurements provided by time interval measurement circuit 30 (see FIGS. 2 and 3) have since settled out.

At this point, a sliding average, E, is calculated of all time interval measurements that occur during a 45 second test measurement interval in order to obtain accurate zero flow offset values. With this in mind, block 2230, as shown in FIGS. 22A and 22B, is first executed to initialize both the prior value of the sliding average, E$_{OLD}$, and the value of a sample counter, m, to zero. Once this occurs, execution proceeds to decision block 2235. This decision block, when executed, determines whether the 45 second test interval has expired. In the event this interval has not expired, execution proceeds, via the "NO" path emanating from decision block 2235, to block 2240 which, when executed, increments the contents of the sample counter, m, by one. Thereafter, execution proceeds to block 2245 which obtains, via leads 36, the most recent time interval (Δt) measurement value from time interval measurement circuit 30 (see FIG. 2). Once this value is obtained, as shown in FIGS. 22A and 22B, block 2248 is executed to update the value of the sliding average with the latest time interval measurement value. Next, block 2252 is executed to determine the maximum and minimum time interval values that have thusfar occurred during the test measurement interval and then store these values in variables MAX and MIN, respectively. Once this has occurred, execution proceeds to block 2255 which, when executed, stores the current value of the sliding average as the prior value, E$_{OLD}$, for use during the next update of the sliding average during the current test measurement interval. Thereafter, execution loops back, via path 2256, to decision block 2235. Alternatively, if the 45 second test measurement interval has just expired, then decision block 2235 routes execution, via its "YES" path, to block 2258. This latter block calculates the difference between the values of variables MAX and MIN to determine the largest variation that occurred in the time interval measurements produced during the test interval and stores the result in temporary variable A.

Once the MAX-MIN difference has been calculated and stored, execution passes to decision block 2260 which tests whether the absolute value (magnitude) of variable A exceeds a pre-determined noise margin value, X, that has been previously stored as a constant in EPROM situated within memory 210 (see FIG. 2). If the magnitude (absolute value) of the MAX-MIN difference is larger than the value X, this indicates excess noise has occurred and has corrupted the time difference measurements that had been obtained through execution of blocks 2235-2255 shown in FIGS. 22A and 22B. This is another fault condition. As a result, execution passes, via the "YES" path emanating from decision block 2260, to block 2280. This latter block accesses the previous value of the zero flow offset, OFFSET$_{old}$, and sets the current value of the zero flow offset equal to the previous value. Thereafter, block 2285 is executed which flags the occurrence of a fault condition, and enters the corresponding fault code and its time/date stamp as the latest entry in the fault stack in NOVRAM. At this time, execution then passes to block 2290 which invokes fault routine 1800, as shown in FIG. 18 and previously discussed. After the user has intervened to appropriately clear the fault condition, execution exits from Zero Flow Offset Routine 2200 and returns to entry point A in main program 500.

Alternatively, if the absolute value of the MAX-MIN difference is less than or equal to the pre-defined noise margin, thereby indicating proper operation, execution proceeds, via the "NO" path from decision block 2260, to decision block 2265. This latter decision block, when executed, determines whether the magnitude (absolute value) of the sliding average, E, that occurred at the end of the most recent test measurement interval exceeds a pre-defined value, Y, i.e. whether the sliding average value is simply too large either positively or negatively. The value of Y has been previously stored as a constant in the EPROM situated within memory 210 (see FIG. 2). In the event the sliding average value of the offset is too large in either direction, then a fault condition has occurred. In this case, execution proceeds, as shown in FIGS. 22A and 22B, via the "YES" path from decision block 2265, to block 2280 which has been discussed above. Alternatively, if the magnitude of the sliding average offset value is sufficiently small, then execution proceeds, via the "NO" path from decision block 2265, to block 2275. This latter block, when executed, sets the value of the zero flow offset equal to the value of the most recent time interval measurement. This new zero flow offset value is then used to update the offset value, OFFSET, that is stored in NOVRAM for subsequent use. At this point, execution exits from Zero Flow Offset Routine 2200.

10. Time Interval Measurement Interrupt Routine 2300

A flowchart of Time Interval Measurement Interrupt Routine 2300 is collectively depicted in FIGS. 23A and 23B, with the correct alignment of the drawing sheets for these figures shown in FIG. 23.

Upon entry into this routine, block 2306 is first executed to reset the value of an INPUT OVERFLOW flag. The INPUT OVERFLOW flag is set by host microprocessor 205 (see FIG. 2) if it detects that the value of the incoming time interval measurement, supplied by time interval measurement circuit 40, has overflowed. As discussed above, the calculations used in evaluating the DFT rely on the assumption that the phase difference remains small such that the small angle approximation can be validly used to evaluate equation (7) above. In fact, during normal operation, the phase difference remains quite small. As such, an input overflow would indicate that an excessively large Δt value occurred which, due to the inapplicability of the small angle approximation, would be erroneous, thereby signifying that a fault condition occurred. In any event, once the INPUT OVERFLOW flag has been reset, execution then proceeds to decision block 2316.

Decision block 2316 tests the status of the EXCESS DRIVE signal produced by drive circuit 40, shown in FIG. 4 and discussed above. In the event the level of this signal is high, then execution proceeds, via the "YES" path from decision block 2316, to block 2319. Since the high level may have been caused by a "glitch", block 2319, when executed, merely consumes 27 microseconds of processing time, before passing execution to decision block 2321. This decision block re-tests the status of the EXCESS DRIVE signal. In the event the level of the EXCESS DRIVE signal still remains high, then a fault condition has occurred. In this case, decision block 2321 routes execution to block 2324. This block, when executed, flags the fault condition and enters the corresponding fault code along with the time/date stamp as the most recent entry into the fault stack stored in NOVRAM. Thereafter, block 2331 executes to invoke fault routine 1800. Only after the user has intervened to reset the host system will execution exit from routine 2300 and return to entry point A in host microprocessor main program 1400 (see FIGS. 14A-14D) to re-initialize the host microprocessor. Alternatively, in the event a glitch did indeed occur in this signal, then the glitch will most likely have vanished during the prior 27 microsecond interval. Hence, the level of the EXCESS DRIVE signal will now be low. In this case, decision block 2321 will route execution, via its "NO" path, to block 2335.

Block 2335 will read the latest data provided by time interval measurement circuit 30 through bus interface 240 and bi-directional data leads 36 (see FIG. 2). As discussed above, time interval measurement circuit 30 can produce a time interval (Δt) measurement or a fault message. Consequently, once this time interval measurement or fault message is read by host microprocessor 205 (see FIG. 2), decision block 2339, as shown in FIGS. 23A and 23B, executes to provide an appropriate response. In the event circuit 30 provided a message indicative of a fault condition, then execution is routed, via the "YES" path emanating from decision block 2339, to block 2343. This latter block, when executed, flags the fault condition and enters the corresponding fault code along with the time/date stamp as the most recent entry in the fault stack. Thereafter, block 2347 is executed to invoke fault routine 1800. Execution proceeds from this routine only after the user has intervened to reset the host microprocessor system. Once this occurs, execution proceeds to entry point A in host microprocessor main program 1400 (see FIGS. 14A-14D). Alternatively, in the event circuit 30 provided a message containing a Δt measurement, then execution proceeds, via the "NO" path from decision block 2339, to decision block 2349.

At this point, decision block 2349 tests whether the watch dog timer (timer 290 see FIG. 2) has reached the end of its timing interval (i.e. whether this timer has timed out). If this timer has timed out this indicates that this routine (time interval measurement interrupt routine 2300) has not executed within the past 100 milliseconds. This signifies erratic operation most likely caused by a fault condition. Consequently, execution proceeds as shown in FIGS. 23A and 23B, via the "YES" path emanating from decision block 2349, to block 2356. This latter block, when executed, flags the fault condition and enters the corresponding fault code along with the time/date stamp as the most recent entry in the fault stack. Thereafter, block 2358 is executed to invoke fault routine 1800 Execution proceeds from this routine only after the user has intervened to reset the host microprocessor system. Once this occurs, execution proceeds to entry point A in host microprocessor main program 1400 (see FIGS. 14A-14D). Alternatively, in the event the watch-dog timer has not timed out, execution proceeds, via the "NO" path from decision block 2349, to block 2352 which resets this timer to begin a 100 msec timing cycle. With the flow tubes vibrating at normal frequencies, routine 2300 will be executing sufficiently frequently to ensure the watch-dog timer never reaches the end of its 100 msec timing cycle before being reset. Once block 2352 has executed, execution passes to block 2353 which, when executed, resets the contents of software counter S_COUNT$_1$ to the value TIMEOUT$_1$ As discussed above, this counter is decremented and tested by 100 millisecond measurement routine 1900 to determine if the time interval measurement interrupt routine has ceased executing which is a fault condition that is due most likely to an operational failure of time interval measurement circuit 30 (see FIGS. 2 and 3). Once block 2353 has executed, execution passes, as shown in FIGS. 23A and 23B, to block 2354 which decrements the current contents of software counter S_COUNT$_2$ by one. As discussed above, the contents of this counter are decremented by one each time the time interval measurement interrupt routine executes but is reset by execution of 100 millisecond interrupt routine 1900. Once this counter has been decremented, execution proceeds to decision block 2360. This decision block tests the current contents of counter S_COUNT$_2$ to determine if they equal zero in which case the associated software timer has timed out. In the event routine 1900 has not executed over a sufficiently long period defined by the value of TIMEOUT$_2$, then a fault condition has occurred, probably involving real time clock 215 (see FIGS. 2 and 3). When this fault condition occurs, block 2360 will eventually, after successive iterations have occurred through time interval interrupt measurement routine 2300 decrement the contents of counter S_COUNT$_2$ to zero. As such, once the contents of this counter equals zero, then execution proceeds, via the "YES" path from decision block 2360, to block 2363. This latter block, when executed, flags the fault condition and stores the corresponding fault code along with a time/date stamp as the latest entry in the fault stack in NOVRAM. Thereafter, block 2367 is executed to invoke fault routine 1800, as discussed above. Only after the user intervenes to reset the host system will execution proceed to exit routine 2300 and return to entry point A in the host microprocessor main program 1400 (see FIGS. 14A-14D) to re-initialize the host microprocessor.

Now, alternatively, if the contents of counter S—COUNT$_2$ have not reached zero, then decision block 2360 routes execution, via its "NO" path, to decision block 2370. This latter decision block checks whether an input overflow has just occurred for the incoming time interval measurement. If an overflow has not occurred, then execution proceeds, via the "NO" path emanating from this decision block, to decision block 2372. This latter decision block checks the status of the +5 volt supply by testing the level of the +5 VOLT STATUS signal appearing on lead 298 (see FIG. 2). In the event this supply is properly operating, then execution proceeds, as shown in FIGS. 23A and 23B, via the "YES" path emanating from decision block 2372 to execution block 2384. This latter block, when executed, subtracts the zero flow offset determined through prior execution of Zero Flow Offset Routine 2200 from the current incoming time interval measurement, $\Delta t$. Block 2386 is then executed to store the resulting time difference measurement, $\Delta t$, in NOVRAM, located with the host microprocessor system, for subsequent use by 100 msec interrupt routine 1900 (see FIGS. 19A-19D). Thereafter, execution exits from routine 2300. Now, alternatively, in the event an input overflow has just occurred, then execution proceeds, via the "YES" path emanating from decision block 2370, to decision block 2374. Inasmuch as an overflow can occur in response to a transient condition, decision block 2374 determines whether an input overflow occurred during the previous time interval measurement. If such an overflow did not occur during the previous measurement, then decision block 2374 routes execution, via its "NO" path, to block 2376 which sets the INPUT OVERFLOW flag. Thereafter, execution exits routine 2300. Whenever an input overflow condition occurs, the current time interval measurement is ignored. Alternatively, if the INPUT OVERFLOW flag has been previously set and an input overflow condition is currently present, indicating that an overflow occurs during each of two successive time interval measurements, then a fault condition exists. In this case, decision block 2374 routes execution to block 2378. This block also executes, via the "NO" path from decision block 2372, in the event this decision block detects a failure in the +5 volt supply. Block 2378, when executed, flags the fault condition and enters the corresponding fault code along with the time/date stamp as the latest entry in the fault stack in NOVRAM. Thereafter, block 2380 executes to invoke fault routine 1800. This routine continuously re-executes until the user intervenes to reset the host system and cause execution to exit from time interval measurement interrupt routine 2300 and proceed to entry point A in host microprocessor main program 1400 (see FIGS. 14A-14D) to re-initialize the host microprocessor system. This now concludes the discussion of routine 2300.

As noted, the software executed by the host microprocessor utilizes several multiplication steps, particularly for scaling and unit conversion. To save execution time, this software performs non-integer multiplication using integer multiplication followed by shifting. In particular, a non-integer number can be accurately represented by an integer number (P) divided by two raised to a predetermined power (Q). For each non-integer number, several different P and Q values might exist. For example, to multiply a value in pounds/second to kilograms/second requires multiplying that value by a pounds to kilograms conversion factor of 2.2046. The value 2.2046 also equals $72240/2^{15}$, $36120/2^{14}$, or $18060/2^{13}$. Therefore, this conversion can be quickly computed by multiplying the value in kilograms/second by an integer, 72240, 36120 or 18060 and then shifting the result to the right by 15, 14 or 13 places, respectively. The microprocessor used in the preferred embodiment for host microprocessor 205 (see FIG. 2) is a ZS-8 manufactured by the Zilog Corporation which contains an internal 8-by-8 bit hardware multiplier. Inasmuch as this hardware multiplier is used in implementing a 16-by-16 bit software multiplier, the integer is chosen to be as large as possible up to a maximum value of 65535 ($2^{16}-1$), in order to provide maximal resolution, so long as the value, Q, of the exponent remains an integer Hence, corresponding P and Q values are stored for all pre-determined non-integer constants (e.g. scaling, conversion factors, spring constants and the like) in a table in EPROM. Whenever, the microprocessor is instructed to calculate a non-integer product of a number times any of these non-integer constants, the microprocessor accesses the table to determine the appropriate P and Q values and then performs the non-integer multiplication by first multiplying the constant by the integer P, using the hardware multiplier, and then shifting the result to the right Q places (or, if Q is negative, to the left Q places). A significant amount of execution time is advantageously saved in this fashion.

C. Network Description

Now, with the above understanding of the inventive metering system in mind, several such systems can be interconnected into a network to a single remote host computer as shown in FIG. 24.

As shown, the network contains individual metering systems $5_1, 5_2, \ldots, 5_n$, each consisting of a meter assembly and a ticket printer both connected to respective meter electronics. Meter assemblies $10_1, 10_2, \ldots, 10_n$ are all identical to meter assembly 10 shown in FIG. 1 and discussed in detail above, and are connected through leads $100_1, 100_2, \ldots, 100_n$ to meter electronics $20_1, 20_2, \ldots, 20_n$, respectively. Similarly, all the individual meter electronics are identical to meter electronics 20 which is also shown in FIG. 1 and discussed in detail above. As noted, each meter electronics provides two serial ports: an RS-232C port and an RS-485 port. The RS-232C port is used by each metering system to communicate to a local peripheral, such as a ticket printer, as discussed above. Here, ticket printers $15_1, 15_2, \ldots, 15_n$ are connected through leads $252_1, 252_2, \ldots, 252_n$ to meter electronics $20_1, 20_2, \ldots, 20_n$. The RS-485 ports are used for network communications and are all tied together to a common two wire differential line 83 (e.g. a suitable twisted pair). A remote host computer 80 containing processor 88 is also tied to differential communication line 83 through RS-485 port 85. In addition, ticket printer 90 is locally connected, via RS-232C serial interface 86, to processor 88 located within remote host computer 80. Through inclusion of appropriate software within each metering system and in the remote host computer, the remote host computer can advantageously communicate with each individual metering system on a bi-directional basis. In this manner, the remote host computer can first configure each metering system as desired by appropriately setting the user parameters for that meter (select appropriate scaling factors, high/low alarm levels, output measurement units) and thereafter receive flow data from each meter either by querying that meter or through a periodic transmission initiated by that meter. The remote host computer can also receive fault data from each meter and clear fault conditions. In this manner, the remote host computer can obtain all the totalized flow and mass flow rate measured by every meter for further analysis and plant wide process control applications. Moreover, the remote host computer can locally print totalized flow information for one or more metering systems using ticket printer 90.

This network capability finds particular use in many applications where multiple metering sites are necessary. One such illustrative application is a tank farm. Here, each metering system is connected in series with piping leading to a corresponding tank and is used to measure the amount of product (liquid or slurry) that flows into or from that tank. Through the network, one remote host computer can readily obtain flow data on a number of tanks in the farm. As tanks are filled with different products, the remote host computer can appropriately configure the meter for each tank to provide mass flow and mass flow rate data in suitable measurement units particular to the industry using that product. In the event a tank is to be filled with a different product than that which previously occurred, then the remote host computer can easily re-configure the metering system for that tank to suit the new product. This, in turn, advantageously eliminates the need for human operators to visit each metering site to configure the meter. Moreover, prior to a custody transfer, information could be downloaded, into remote host computer 80 from an upstream processor, situated at a source location, such as a pipeline, refinery or other tank farm, regarding the products to be subsequently transferred such that the ensuing custody transfer of all the products can be handled and metered on a totally automatic basis.

Clearly, those skilled in the art recognize that, although the disclosed embodiment utilizes U-shaped flow tubes, flow tubes or more generally flow conduits of almost any size and shape may be used as long as the tubes can be oscillated about an axis to establish a non-inertial frame of reference. For example, these tubes may include but are not limited to straight tubes, S-shaped tubes or looped tubes or tubes having a circular or other cross-sectional shape. Moreover, although the meter has been shown as containing only two parallel flow tubes, more than two parallel flow tubes—such as three, four or even more—may be used if desired. In addition, a meter, embodying the teachings of the present invention, could even utilize a single small diameter flow tube for measuring relatively low flow rates provided that, at these flow rates, any undesirable vibrations at the tube-manifold interface remains negligible. Furthermore, although the flow tubes have been described as being constructed from a material having a linear spring constant (such as 316L stainless steel), the flow tubes could alternatively be fabricated from a material having a non-linear spring constant as long as the spring constant can be accurately characterized as being linear throughout the range of movement in which the flow tubes are vibrated.

Although various embodiments of the present invention have been shown and described herein, many other varied embodiments incorporating the teachings of the present invention may be easily constructed by those skilled in the art.

I claim:

1. Apparatus for measuring density of a fluid passing through a Coriolis meter, wherein said meter utilizes a flow conduit having a sensor associated therewith for providing a sensor signal indicative of movement of said flow conduit, said apparatus comprising:
   means for driving the flow conduit in a sinusoidal vibratory pattern and at a resonant frequency thereof while said fluid flows therethrough;
   means for sampling said sensor signal at a sampling frequency to yield a sampled sensor signal;
   means for undertaking initialization comprising:
      means for setting the sampling frequency to an initial pre-defined value;
      means for producing, in response the sensor signal sampled at said initial value, a power spectrum for a pre-selected sequence of frequencies contained within said sampled sensor signal and selecting a particular one of said frequencies in said sequence at which said power spectrum reaches a maximum value as being a fundamental frequency at which said conduit is resonantly vibrating;
      means for setting the sampling frequency to a second sampling frequency value, equal to a pre-defined integer multiple of said one frequency, for initial use during density measurement; and
      means for obtaining a base-line density value for said fluid;
   means for undertaking a density measurement comprising:
      means for transforming said sensor signal using a pre-defined transformation from a time domain to a frequency domain so as to yield a frequency value, wherein said frequency value is produced by evaluating said transformation at the fundamental frequency for said sampled sensor signal;
      means for ascertaining in response to said frequency value a phase value associated therewith;
      means for providing a density value in response to the base-line density value and the ascertained phase value; and
      means for varying the sampling frequency, in response to the ascertained phase value, in order to compensate for a change in the fundamental frequency caused by a substantially simultaneously occurring variation in density of the fluid flowing through the meter, whereby the sampling frequency substantially remains at the pre-defined integer multiple of the fundamental frequency.

2. The apparatus in claim 1 wherein the transformation is a Fourier, Discrete Fourier, Fast Fourier, Hanning or Hilbert transform.

3. The apparatus in claim 2 wherein said density value providing means comprises means for generating the density value as being substantially equal to the sum of the base-line density value and a product of the ascertained phase value multiplied by a pre-defined constant.

4. The apparatus in claim 3 wherein said producing and selecting means comprises:
   means for transforming said sampled sensor signal using the pre-defined transformation into the frequency value;
   first means for determining a magnitude of the frequency value produced by the transformation at each successive frequency in a series of frequencies occurring at a first resolution within a pre-defined range and situated within said sequence;

means for locating, in response to said first determining means, a first frequency within said series and occurring at said first resolution at which the magnitude of the frequency value reaches a maximum value;

second means for determining the magnitude of the frequency value for each successive frequency in a second series of frequencies occurring at a second resolution and situated within a band of frequencies centered at said first located frequency and extending to corresponding limit frequencies situated on respective sides thereof as defined by said first resolution, wherein said second resolution is higher than said first resolution; and means for locating, in response to said second determining means, a second frequency occurring at said second resolution at which the magnitude of the frequency value reaches a maximum magnitude and selecting said second located frequency as said fundamental frequency.

5. The apparatus in claim 4 wherein said first magnitude determining means comprises:

means for successively varying a frequency index throughout the pre-defined range by an incremental value specified by said first resolution; and means for determining the magnitude of the frequency value at each successive value of the frequency index occurring at said first resolution within said pre-defined range while maintaining the sampling frequency at a constant value.

6. The apparatus in claim 4 wherein said second magnitude determining means comprises:

means for successively varying the sampling frequency by an incremental value specified by said second resolution from the first one of the limit frequencies in said second series to the second one of the limit frequencies in said second series; and means for determining the magnitude of the frequency value at each successive frequency in said second series.

7. A method for measuring density of a fluid passing through a Coriolis meter, wherein said meter utilizes a flow conduit having a sensor associated therewith for providing a sensor signal indicative of movement of said flow conduit, said method comprising the steps of:

driving the flow conduit in a sinusoidal vibratory pattern and at a resonant frequency thereof while said fluid flows therethrough;

sampling said sensor signal at a sampling frequency to yield a sampled sensor signal;

during initialization:

setting the sampling frequency to an initial pre-defined value;

producing, in response the sensor signal sampled at said initial value, a power spectrum for a pre-selected sequence of frequencies contained within said sampled sensor signal and selecting a particular one of said frequencies in said sequence at which said power spectrum reaches a maximum value as being a fundamental frequency at which said conduit is resonantly vibrating; multiple of said one frequency, for initial use during density measurement; and obtaining a base-line density value for said fluid;

during density measurement:

transforming said sensor signal using a pre-defined transformation from a time domain to a frequency domain so as to yield a frequency value, wherein said frequency value is produced by evaluating said transformation at the fundamental frequency for said sampled sensor signal;

ascertaining in response to said frequency value a phase value associated therewith;

providing a density value in response to the base-line density value and the ascertained phase value;

varying the sampling frequency, in response to the ascertained phase value, in order to compensate for a change in the fundamental frequency caused by a substantially simultaneously occurring variation in density of the fluid flowing through the meter, and iteratively repeating the sensor signal transforming, phase value ascertaining, density value providing, and sampling frequency varying steps so as to provide a succession of density measurement values, whereby the sampling frequency that is used to produce substantially all of these density measurement values substantially remains at the pre-defined integer multiple of the fundamental frequency.

8. The method in claim 7 wherein the transformation is a Fourier, Discrete Fourier, Fast Fourier, Hanning or Hilbert transform.

9. The method in claim 8 wherein said density value providing step comprises the step of generating the density value as being substantially equal to the sum of the base-line density value and a product of the ascertained phase value multiplied by a pre-defined constant.

10. The method in claim 9 wherein said producing and selecting step comprises the steps of:

transforming said sampled sensor signal using the pre-defined transformation into the frequency value;

first determining a magnitude of the frequency value produced by the transformation at each successive frequency in a series of frequencies occurring at a first resolution within a pre-defined range and situated within said sequence;

locating, in response to said first determining step, a first frequency within said series and occurring at said first resolution at which the magnitude of the frequency value reaches a maximum value;

second determining the magnitude of the frequency value for each successive frequency in a second series of frequencies occurring at a second resolution and situated within a band of frequencies centered at said first located frequency and extending to corresponding limit frequencies situated on respective sides thereof as defined by said first resolution, wherein said second resolution is higher than said first resolution; and locating, in response to said second determining step, a second frequency occurring at said second resolution at which the magnitude of the frequency value reaches a maximum magnitude and selecting said second located frequency as said fundamental frequency.

11. The method in claim 10 wherein said first magnitude determining step comprises the steps of:

successively varying a frequency index throughout the pre-defined range by an incremental value specified by said first resolution; and determining the magnitude of the frequency value at each successive value of the frequency index occurring at said first resolution within said predefined range while maintaining the sampling frequency at a constant value.

12. The method in claim 10 wherein said second magnitude determining step comprises the steps of:
  successively varying the sampling frequency by an incremental value specified by said second resolution from the first one of the limit frequencies in said second series to the second one of the limit frequencies in said second series; and
  determining the magnitude of the frequency value at each successive frequency in said second series.

* * * * *